United States Patent [19]

Miyashita et al.

[11] Patent Number: 5,237,438
[45] Date of Patent: Aug. 17, 1993

[54] LIQUID CRYSTAL DISPLAY DEVICE

[75] Inventors: Takashi Miyashita, Hachioji; Yoshinaga Miyazawa, Fussa, both of Japan

[73] Assignee: Casio Computer Co., Ltd., Tokyo, Japan

[21] Appl. No.: 876,585

[22] Filed: Apr. 30, 1992

[30] Foreign Application Priority Data

| May 2, 1991 | [JP] | Japan | 3-128217 |
| May 2, 1991 | [JP] | Japan | 3-128218 |
| Jul. 11, 1991 | [JP] | Japan | 3-196166 |
| Aug. 30, 1991 | [JP] | Japan | 3-245218 |
| Aug. 30, 1991 | [JP] | Japan | 3-245220 |

[51] Int. Cl.$^5$ ............................................. G02F 1/133
[52] U.S. Cl. ........................................... 359/73; 359/63
[58] Field of Search .................. 359/63, 73, 75, 77, 359/91, 93, 99, 102

[56] References Cited

U.S. PATENT DOCUMENTS

| 5,124,824 | 6/1992 | Kozaki et al. | 359/73 |
| 5,126,866 | 6/1992 | Yoshimizu et al. | 359/73 |
| 5,166,817 | 11/1992 | Ota et al. | 359/73 |

FOREIGN PATENT DOCUMENTS

| 0246842 | 11/1987 | European Pat. Off. |
| 0311339 | 4/1989 | European Pat. Off. |
| 0350063 | 1/1990 | European Pat. Off. |
| 0350075 | 1/1990 | European Pat. Off. |
| 0382460 | 8/1990 | European Pat. Off. |
| 0412844A1 | 2/1991 | European Pat. Off. |

*Primary Examiner*—William L. Sikes
*Assistant Examiner*—Huy K. Mai
*Attorney, Agent, or Firm*—Frishauf, Holtz, Goodman & Woodward

[57] ABSTRACT

In an STN type liquid crystal display device, two retardation plates are located one on each side of an STN liquid crystal cell. A twist angle $\phi_0$ of the liquid crystal cell is set to fall within the range of 200° to $\Delta n \cdot d$ value of the liquid crystal is set to 240°, and the $\Delta n \cdot d$ value of the liquid crystal is set to fall within the range of 700 nm to 900 nm (measurement wavelength: 589 nm). With respect to the direction of aligning treatment of an incident-side substrate, the light-transmitting axis of a polarizer is inclined at an angle falling within the range of 140° to 180°, the light-transmitting axis of an analyzer is inclined at an angle falling within the range of $(270° - |\phi_0|/2) \pm 10°$, the phase delay axis of the first retardation plate is inclined at an angle falling within the range of $(180° - |\phi_0|/2)$ to $(180° - |\phi_0|/2) + 30°$, and the phase delay axis of the second retardation plate is inclined at an angle falling within the range of $(180° - |\phi_0|/2)$ to $(180° - |\phi_0|/2) - 30°$. The $\Delta n \cdot d$ value of each of the first and second retardation plates is preferably set to be $\frac{1}{2}$ (i.e., 2 in $\frac{1}{2}$ represents the number of retardation plates) a value obtained by multiplying the $\Delta n \cdot d$ value of the liquid crystal with 0.80 to 0.95.

16 Claims, 50 Drawing Sheets

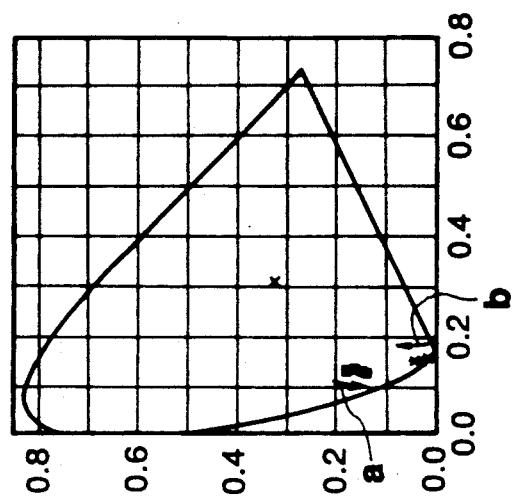
FIG.26B
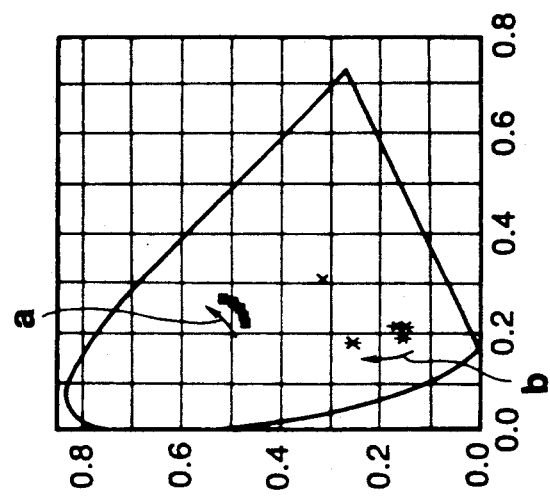
FIG.26G
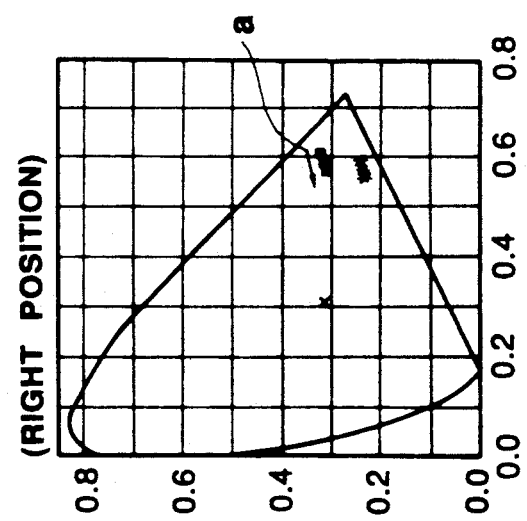
FIG.26R (RIGHT POSITION)

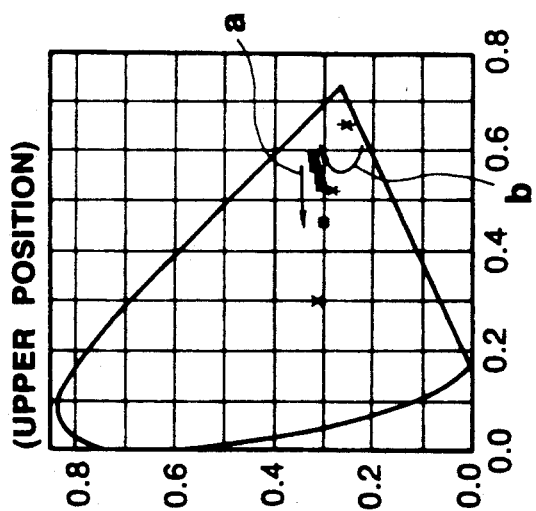
FIG.27R (COMPARATIVE EXAMPLE)
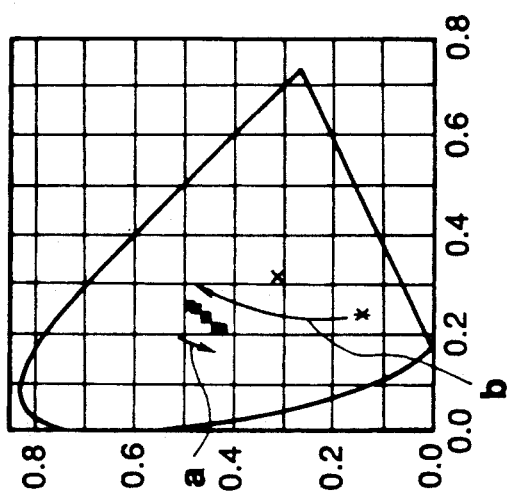
FIG.27G (COMPARATIVE EXAMPLE)
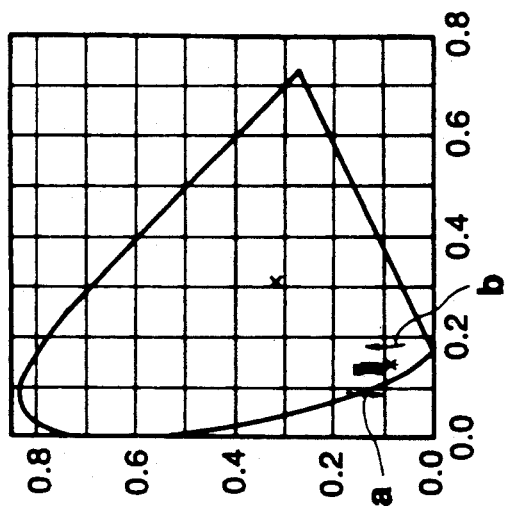
FIG.27B (COMPARATIVE EXAMPLE)

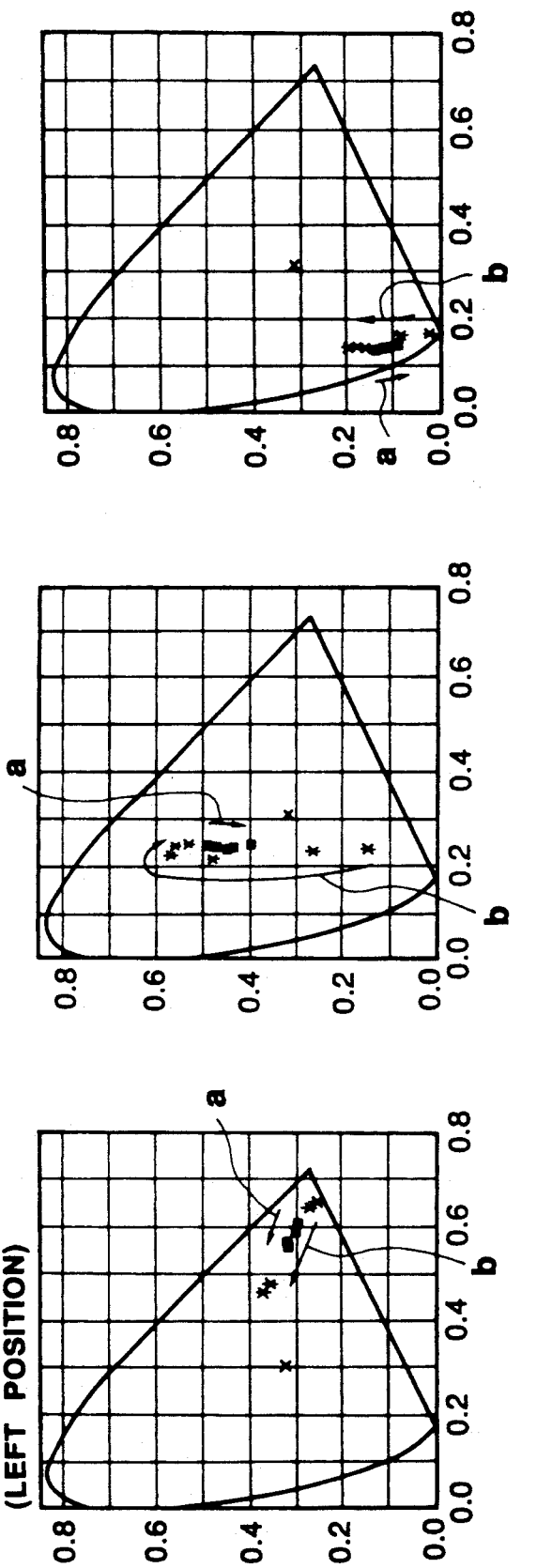

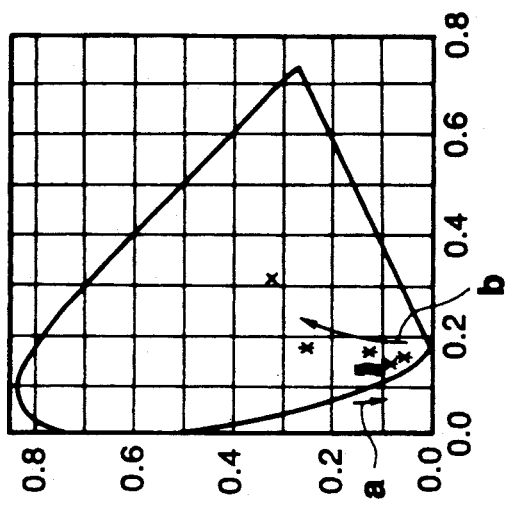
FIG.29B
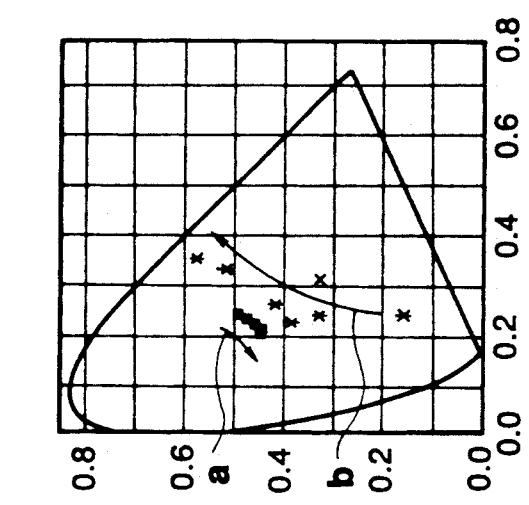
FIG.29G (COMPARATIVE EXAMPLE)
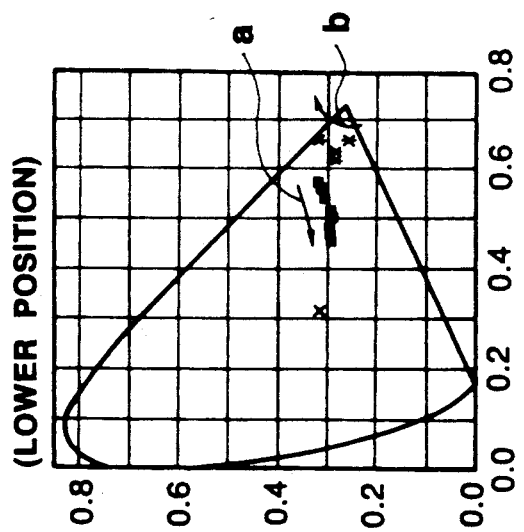
FIG.29R (COMPARATIVE EXAMPLE)
(LOWER POSITION)

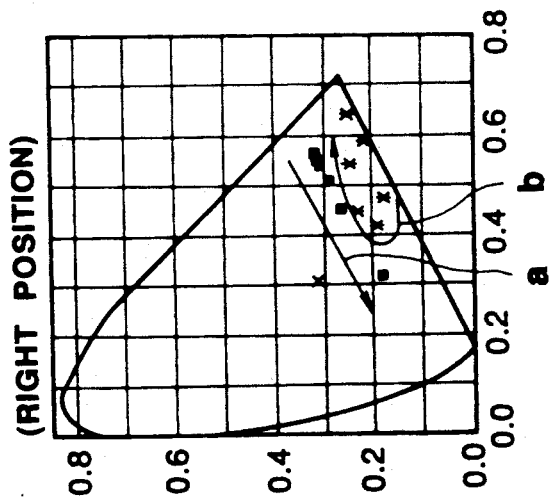
FIG.30R (COMPARATIVE EXAMPLE)
(RIGHT POSITION)
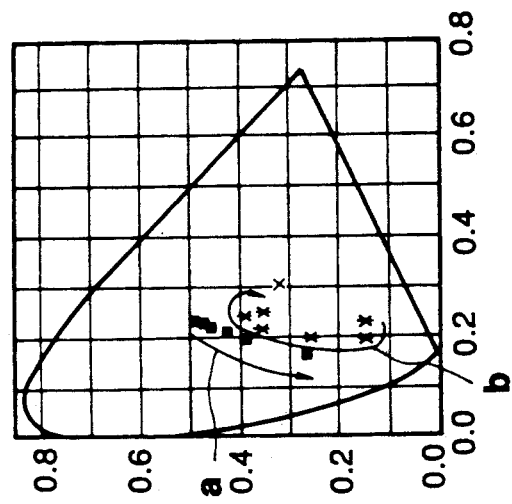
FIG.30G (COMPARATIVE EXAMPLE)
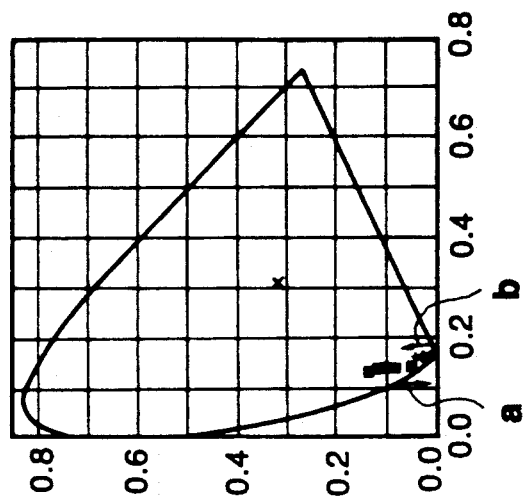
FIG.30B (COMPARATIVE EXAMPLE)

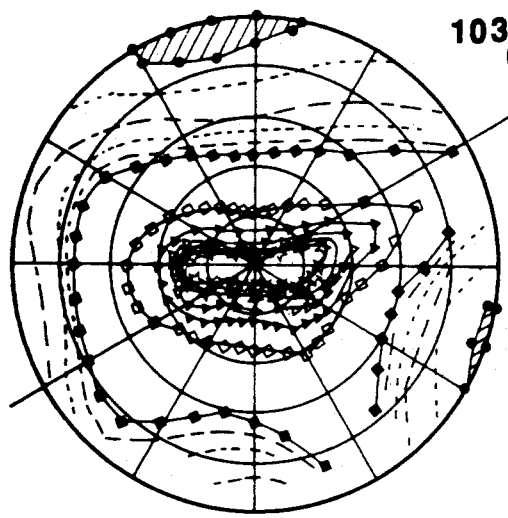
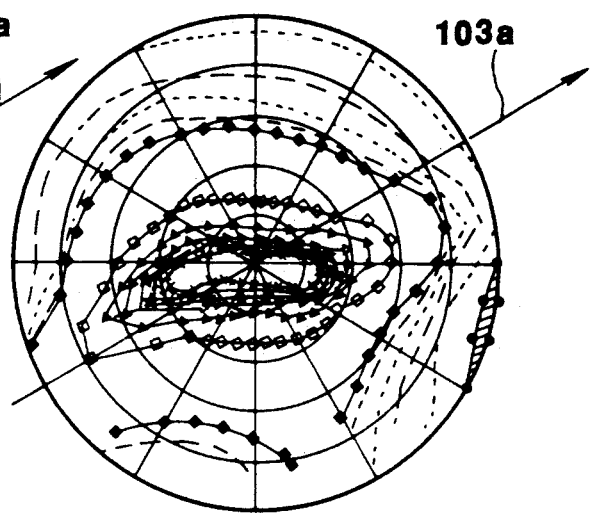
FIG. 57A  FIG. 57B
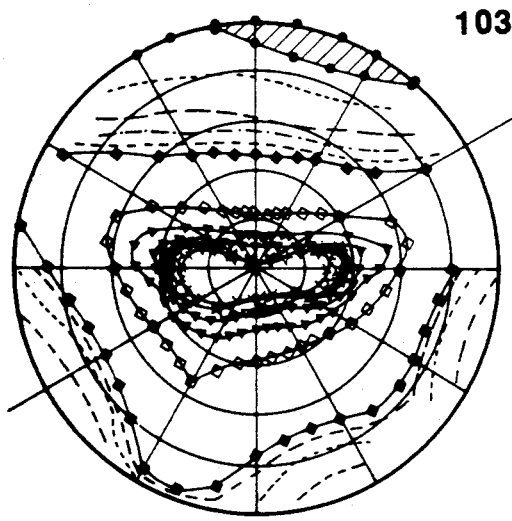
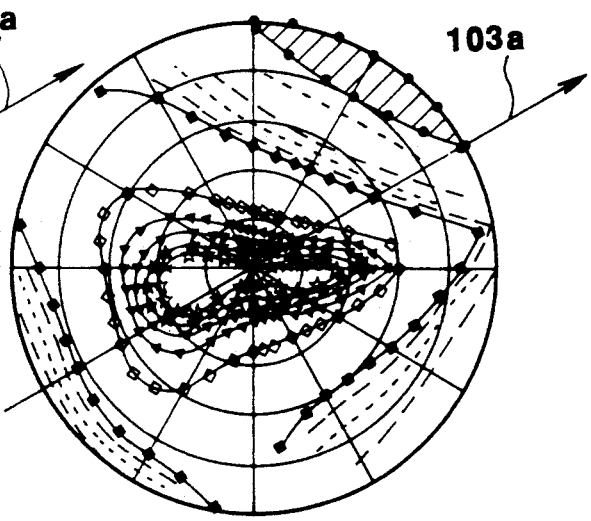
FIG. 57C  FIG. 57D

LIQUID CRYSTAL DISPLAY DEVICE

BACKGROUND OF THE INVENTION

1. Field of the Invention

The present invention relates to a super twisted nematic type simple matrix liquid crystal display device.

2. Description of the Related Art

Liquid crystal display devices have been used in a variety of applications as display devices for office automation equipment. Since a high-precision display is required in a display device of this type, the number of pixels is large, and highly time-divisional driving is required. In addition, a high contrast and a large view angle are also required. In order to satisfy these needs, of all the liquid crystal display devices, a super-twisted nematic type (to be referred to as an STN type hereinafter) simple matrix liquid crystal display device capable of performing highly time-divisional driving and exhibiting a relatively high contrast has been used as a display device for the office automation equipment.

This STN type simple matrix liquid crystal device comprises opposite substrates spaced apart from each other by a predetermined distance, electrodes formed on the inner surfaces of the opposite substrates in directions perpendicular to each other, aligning films formed to cover the electrode formation surfaces to align liquid crystal molecules in a predetermined direction, a liquid crystal material sealed between the aligning films, and a pair of polarizing plates arranged outside the pair of substrates so as to sandwich the pair of substrates. Liquid crystal molecules near the aligning films are aligned in a direction of aligning treatment by alignment regulating forces of the aligning films. The molecules are twisted at an angle of 180° to 270° from one substrate to the other substrate along the predetermined direction of aligning treatment by the alignment regulating forces.

The aligning state of the liquid crystal molecules is changed upon application of an electric field across the opposite electrodes. An optical change caused by a change in alignment is visualized by the pair of polarizing plates, thereby performing a desired display.

In order to operate the above liquid crystal display device in accordance with highly time-divisional driving, the twist angle of the liquid crystal material is increased, and to obtain a higher visual contrast, a birefringence effect of the liquid crystal is utilized to undesirably cause coloration of display contents. In addition, since the view angle is small, the display colors change depending on angles at which an observer observes the display.

In order to solve the coloration problem described above, a two-layered STN type liquid crystal device is proposed wherein a drive cell having drive electrodes formed on the opposite substrates and a compensation cell having a twist direction opposite to that of the liquid crystal molecules in the drive cell are stacked to form a two-layered structure.

In this two-layered STN type liquid crystal display device, differences in phase shifts caused by light components having different wavelengths in the drive cell can be compensated by the compensation cell. Coloration of the display contents can be suppressed to obtain an almost black-and-white display.

In the STN type liquid crystal display device described above, since a liquid crystal cell similar to the drive cell is used as the compensation cell, the manufacturing process of the compensation cell is complicated to result in high cost and a bulky display device. Coloring of the display contents cannot be sat satisfactorily eliminated, and the view angle is kept small, resulting in inconvenience. FIG. 1 shows equi-contrast curves in the conventional two layered STN type liquid crystal display device. These equi-contrast curves represent contrast values obtained when viewed from 10°, 20°, 30°, 40°, and 50° directions with respect to a normal to the substrates of the liquid crystal display device. A hollow triangle represents a point at which the contrast is 150; a black triangle represents a point which the contrast is 100; a hollow square represents a point at which the contrast is 50; a black square represents a point at which the contrast is 10; and a dot represents a point at which the contrast becomes negative, i.e., the black-and-white display color is reversed. An arrow X represents the direction of the aligning treatment of the aligning film on the light-incident side substrate. As is apparent from FIG. 1, the contrast is very high in the front surface of the liquid crystal display device, i.e., in the direction of the normal to the substrates. The contrast is greatly decreased when the view angle is increased with respect to the direction of the normal. Display color reverse regions appear at the upper left and lower right portions of the liquid crystal display device. I this case, the upper left reverse region is very large in area.

In this conventional liquid crystal display device, when the screen is observed from an upper left position inclined by 40° from the direction of the normal, the screen looks like a negative image, thus resulting in a decisive drawback.

FIGS. 2A, 2B, 2C, and 2D show CIE chromaticity diagrams representing changes in display colors in light-transmitting (ON:□) and light-shielding (OFF: *) states when the view angle is sequentially changed from the direction of the normal to the substrates to the 50° direction in units of 10° in an order of upper, left, lower, and right sides of the liquid crystal display device. In this case, an arrow b in each diagram indicates a direction of a change in chromaticity of transmitted light in the ON state, and an arrow a in each diagram indicates a change in chromaticity of transmitted light in the OFF state. As is apparent from FIGS. 2A, 2B, 2C, and 2D, the display colors in the ON and OFF states in the upper, lower, left, and right directions greatly change in accordance with the inclination angles with respect to the direction of the normal to the substrates. This indicates that the display colors are different depending on observation directions with respect to the liquid crystal display device, thus greatly degrading display quality.

SUMMARY OF THE INVENTION

The present invention has been made in consideration of the above situation, and has as its object to provide a liquid crystal display device which has a simple structure and in which display coloring is suppressed and view angle characteristics are improved.

In order to achieve the above object according to the present invention, there is provided a liquid crystal display device comprising: a pair of substrates having opposite surfaces on which electrodes arranged perpendicular to each other and aligning films subjected to an aligning treatment in a predetermined direction and formed to cover the electrodes are formed; a liquid crystal material sealed between the aligning films, twisted in a range of 200° to 240° from one of the pair of substrates to the other of the pair of substrates, and having a product Δn·d of a refractive index anisotropy Δn and a layer thickness d falling within a range of 700 nm to 900 nm; a polarizer located outside of and on a light incident side of the pair of substrates and having a direction of a light-transmitting axis falling within a range of 135° to 180° with respect to a first direction of alignment treatment performed on the aligning film of the incident-side substrate of the pair of substrates; an analyzer located outside of and on a light exit side of the pair of substrates and having a direction of a light-transmitting axis falling within a range of 50° to 105° with respect to the first direction of aligning treatment; a first retardation plate which is located between the polarizer and the analyzer, has a product Δn·d of a refractive index anisotropy Δn and a layer thickness d equal to ½ of a value obtained by multiplying the product Δn·d of the liquid crystal material with 0.8 to 0.95, and has a direction of a phase delay axis falling within a range of 15° to 110° with respect to the first direction of aligning treatment; and a second retardation plate which is located between the polarizer and the analyzer, has a product Δn·d of a refractive index anisotropy An and a layer thickness d substantially equal to that of the first retardation plate, and has a direction of a phase delay axis falling within a range of 30° to 80° with respect to the first direction of aligning treatment.

The first and second retardation plates may be located between the pair of substrates and one of the polarizer and the analyzer, or may be located to sandwich the pair of substrates. In the former layout, the polarizer is preferably located so that the direction of the light-transmitting axis intersects with the first direction of aligning treatment at an angle of about 140°. The analyzer is preferably located so that the direction of the light-transmitting axis intersects with the direction of light-transmitting axis of the polarizer at an angle of about 55°. At the same time, the light-transmitting axis of one of the first and second retardation plates preferably intersects with the first direction of aligning treatment at an angle of about 40°, and the light-transmitting axis of the other preferably intersects with the first direction of aligning treatment at an angle of about 5°. That is, when a twist angle of the liquid crystal material is defined as $\phi_0$, the pair of polarizing plates are set so that the light-transmitting axis of the polarizer falls within the range of 140° to 180°, the light-transmitting axis of the analyzer falls within the range of $(270° - |\phi_0|/2) + 10°$, the phase delay axis of the first retardation pate falls within the range of $(180° - |\phi_0|/2)$ to $(180° - |\phi_0|/2) + 30°$, and the phase delay axis of the second retardation plate falls within the range of $(180° - |\phi_0|/2)$ to $(180° - |\phi_0|/2) - 30°$, respectively, with respect to the first direction (direction of aligning treatment of the incident-side substrate).

In the latter layout, the polarizer is located so that the direction of the light-transmitting axis intersects with the first direction of aligning treatment at an angle falling within the range of 140° to 150°. The analyzer is located so that the direction of the light-transmitting axis intersects with that of the polarizer at an angle falling within the range of 75° to 90°. At the same time, the first retardation plate is preferably located so that its phase delay axis intersects with the first direction of aligning treatment at an angle of about 85°, and the second retardation plate is preferably located so that its phase delay axis intersects with the first direction of aligning treatment at an angle falling within the range of 30° to 40°.

According to the present invention, three or four retardation plates can be used in an STN type liquid crystal cell. When three retardation plates are used, they may all be located between the pair of substrates and one of the polarizer and the analyzer. Alternatively, one of the three retardation plates may be located between the pair of substrates and one of the polarizer and the analyzer, and the remaining two retardation plates may be located between the pair of substrates and the other of the polarizer and the analyzer.

When four retardation pates are used, they may all be located between the pair of substrates and one of the polarizer and the analyzer. Alternatively, two of the four retardation plates may be located between the pair of substrates and one of the polarizer and the analyzer, and the remaining two retardation plates may be located between the pair of substrates and the other of the polarizer and the analyzer.

When the three retardation plates are all located between the STN liquid crystal cell and the polarizer or analyzer, the pair of polarizing plates are located so that the direction of the light-transmitting axis of one plate is inclined an angle falling within the range of 35° to 55° with respect to the first direction of alignment treatment, and the light-transmitting axes of the polarizing plates intersect with each other at an angle of about 30°. The first retardation plate is located so that the direction of phase delay or advance axis is inclined at an angle falling within the range of 45° to 75° with respect to the first direction of aligning treatment, and the second and third retardation plates are located so that the phase delay axis of one plate is inclined at an angle falling within the range of 45° to 75° with respect to the first direction of aligning treatment, and the phase delay axes of the respective plates are perpendicular to each other. The pair of polarizing plates are located so that the light-transmitting axis of one plate intersects with the first direction of aligning treatment at an angle of about 140°, and the light-transmitting axes of the them intersect with each other at an angle of about 85°. At the same time, the first retardation plate is located so that the direction of its phase delay or advance axis is inclined at an angle falling within the range of 50° to 55° with respect to the first direction of aligning treatment, and the second and third retardation pates are located so that the phase delay axis of one plate intersects with the first direction of aligning treatment at an angle of about 40°, and the phase delay axes of the second and third retardation plates intersect with each other at an angle of about 35°. Alternatively, the layout of the polarizing plates is kept unchanged, the first retardation plate is located so that the direction of its phase delay axis is parallel or perpendicular to the first direction of aligning treatment. At the same time, the second and third retardation plates are located so that the phase delay axis of one plate intersects with the first direction of aligning treatment at an angle of about 40°, and the phase delay axes of the second and third retardation plates intersect with each other at an angle of about 35°.

When one retardation plate is located on one side of the STN liquid crystal cell, and two retardation plates are located on the other side thereof, the following setup is required. The pair of polarizing plates are located so that the light-transmitting axis of one plate intersects with the first direction of aligning treatment at an angle of about 55°, and the light-transmitting axes of the polarizing plates intersect with each other at an angle of about 85°. The first retardation plate is located so that the direction of its phase delay or advance axis intersects with the first direction of aligning treatment at an angle of 120°. At the same time, the second and third retardation plates are located so that the phase delay axis of one plate intersects with the first direction of aligning treatment at an angle of about 75° and the light-transmitting axes of the second and third retardation plates are perpendicular to each other.

Alternatively, the pair of polarizing plates are located so that the light-transmitting axis of one plate intersects with the first direction of aligning treatment at an angle of about 140°, and the light-transmitting axes of the polarizing plates intersect with each other at an angle of about 85°. The first phase plate is located so that the direction of its phase delay or advance axis is almost perpendicular to the first direction of aligning treatment. The second and third retardation plates are located so that the phase delay axis of one plate intersects with the first direction of aligning treatment at an angle of about 40°, and the phase delay axes of the second and third retardation plates intersect with each other at an angle of 35°.

When four retardation plates are all located between the STN liquid crystal cell and the polarizer or analyzer, the following setup is required. The pair of polarizing plates are located so that the direction of the light-transmitting axis of one plate is inclined at an angle falling within the range of 135° to 145° with respect to the first direction of aligning treatment, and the light-transmitting axes of the polarizing plates intersect with each other at an angle of about 85°. The first and second retardation plates are located so that the direction of the phase delay or advance axis of one plate is inclined at an angle falling within the range of 25° to 45° with respect to the first direction of aligning treatment, and the phase delay axes of the first and second retardation plates intersect with each other at an angle of about 25° to 45°. The second and fourth retardation plates are located so that the phase delay axis of one plate is inclined at an angle of 55° to 65° with respect to the first direction of aligning treatment, and the phase delay axes of the respective plates are almost perpendicular to each other.

When four retardation plates are located so that first two retardation plates and second two retardation plates are located on the respective sides of the STN liquid crystal cell, the following setup is required. The pair of polarizing plates are located so that the direction of the light-transmitting axis of one plate is inclined at an angle falling within the range of 135° to 145° with respect to the first direction of aligning treatment, and the light-transmitting axes of the respective plates intersect with each other at an angle of about 85°. The first and second retardation plates are located so that the direction of the phase delay or advance axis of one plate intersects with the first direction of aligning treatment at an angle of about 40°, and the phase delay axes of them intersect with each other at an angle of about 35°. The third and fourth retardation plates are located so that the phase delay axis of one plate intersects with the first direction of aligning treatment at an angle of about 30°, and the phase delay axes of the them are almost perpendicular to each other.

With the above arrangement, according to the present invention, at least two retardation plates are located between the polarizer and the analyzer in an STN type liquid crystal display device in which liquid crystal molecules are twisted at an angle of 200° to 240°. The relationships between the directions of the phase delay axes of these retardation plates and the optical axes of the polarizer and the analyzer are set to satisfy optimal conditions. Therefore, differences in phase shifts caused by light components having different wavelengths upon their transmission through the liquid crystal cell can be almost corrected by the retardation plates, thus eliminating coloring of display colors.

In addition, since these retardation plates are arranged, phase shifts from directions inclined from the direction of the normal to the substrates can also be corrected. The reverse area is reduced, and the area having a higher contrast can be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the genera description given above and the detailed description of the preferred embodiments given below, serve to explain the principles of the invention.

FIGS. 10A, 10B, and 10C are views of the second embodiment in which the $\Delta n \cdot d$ value of each retardation plate, and optical axes of a pair of polarizing plates and a pair of retardation plates are changed respectively, in which FIG. 10A shows equi-brightness curves in a light-shielding state, FIG. 10B shows equi-brightness curves in a light-transmitting state, and FIG. 10C shows equi-contrast curves;

FIGS. 11A, 11B, and 11C are views showing changes in colors of transmitted light components in the layout of the polarizing plates and the retardation plates of the second embodiment from which the characteristics shown in FIGS. 10A, 10B and 10C are obtained, in which FIG. 11A shows equi-color difference curves, FIG. 11B shows equi-lightness index difference curves, and FIG. 11C show equi-chroma difference curves;

FIGS. 26R, 26G, and 26B are respectively CIE chromaticity diagrams showing changes in hues of light components passing through the R, G, and B color filters at view angles at the right position in the liquid crystal in the fourth embodiment shown in FIG. 21;

FIGS. 27R, 27G, and 27B are CIE chromaticity diagrams showing changes in hues of light components passing through the R, G, and B color filters at view angles at the upper position in the liquid crystal cell of the comparative example;

FIGS. 28R, 28G, and 28B are CIE chromaticity diagrams showing changes in hues of light components passing through the R, G, and B color filters at view angles at the left position in the liquid crystal cell of the comparative example;

FIGS. 29R, 29G, and 29B are CIE chromaticity diagrams showing changes in hues of light components passing through the R, G, and B color filters at view angles at the lower position in the liquid crystal cell of the comparative example;

FIGS. 30R, 30G, and 30B are CIE chromaticity diagrams showing changes in hues of light components passing through the R, G, and B color filters at view angles at the right position in the liquid crystal cell of the comparative example;

FIGS. 57A to 57D are views showing equi-contrast curves when the directions of the phase delay axes of the third and fourth retardation plates in the seventh embodiment shown in FIG. 56 are changed;

DETAILED DESCRIPTION OF THE PREFERRED EMBODIMENTS

Figure 61A:
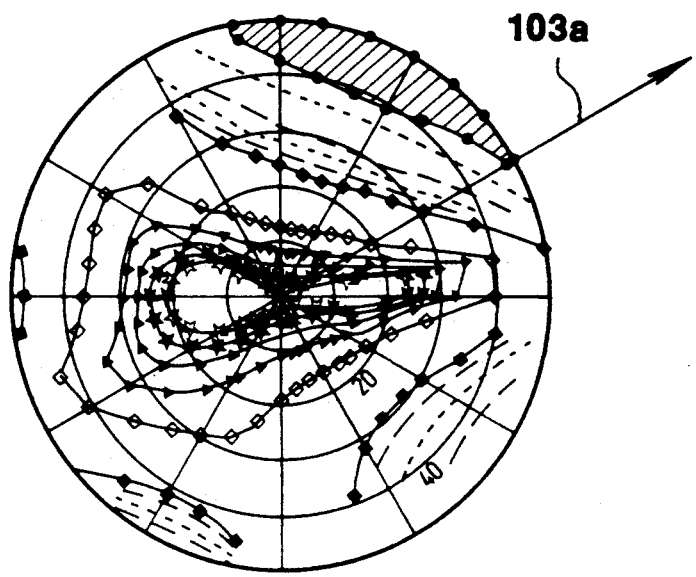
FIGS. 61A and 61B are a view showing equi-contrast curves of the eighth embodiment shown in FIG. 58 and its CIE chromaticity diagram.
Figure 61B:
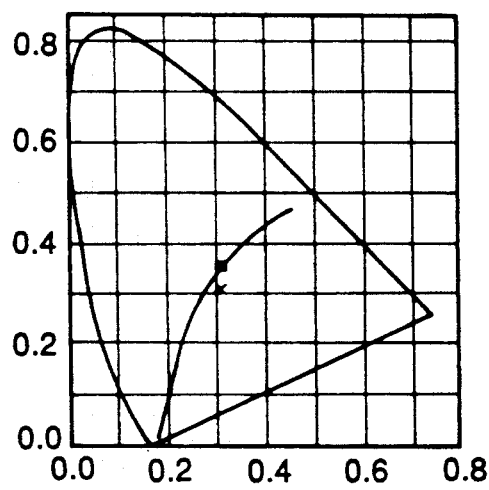

Preferred embodiments of the present invention will be described below with reference to FIGS. 3 to 61B.

First Embodiment

Figure 3:
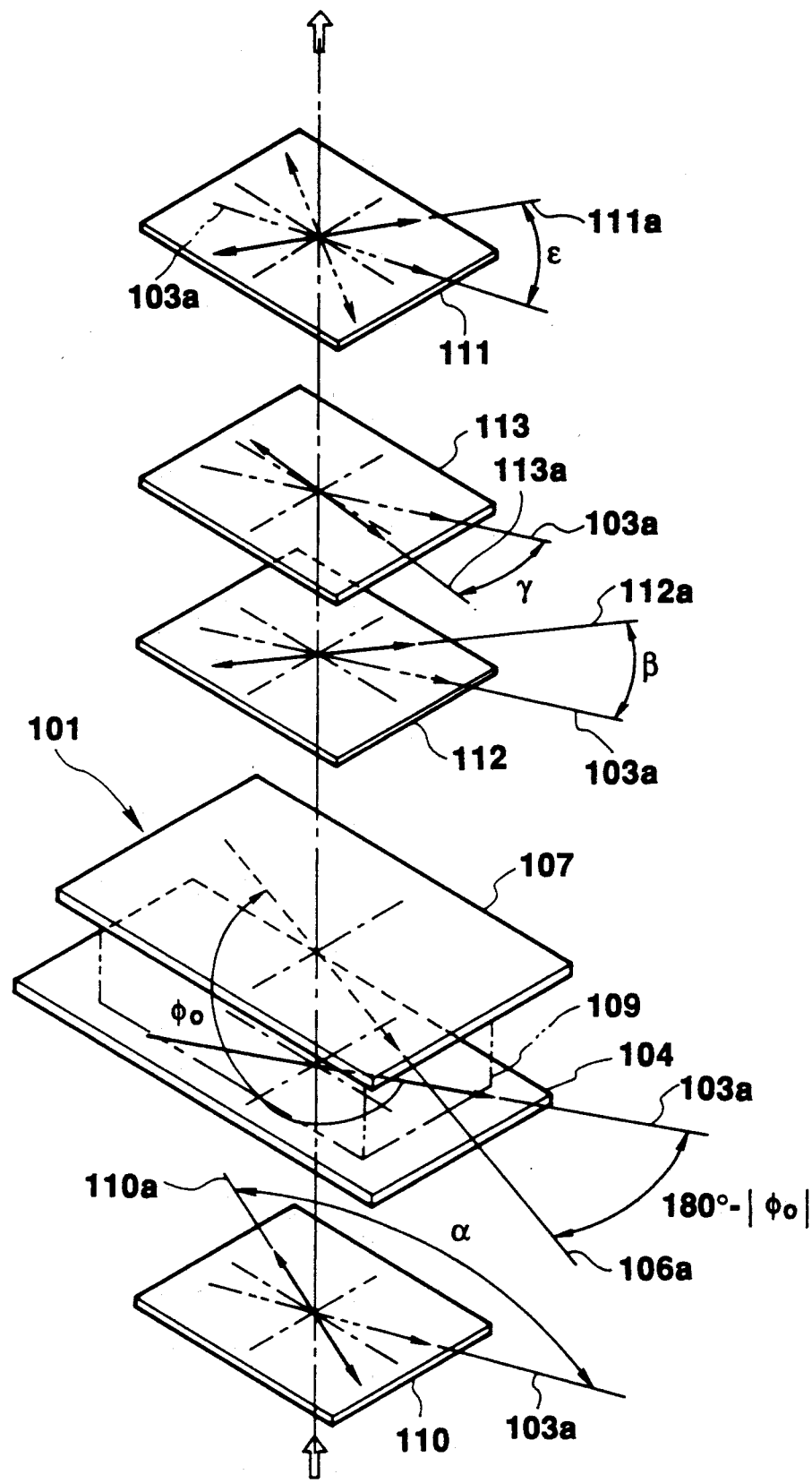
FIG. 3 is an exploded perspective view showing a schematic arrangement of the first embodiment according to the present invention.
Figure 4:
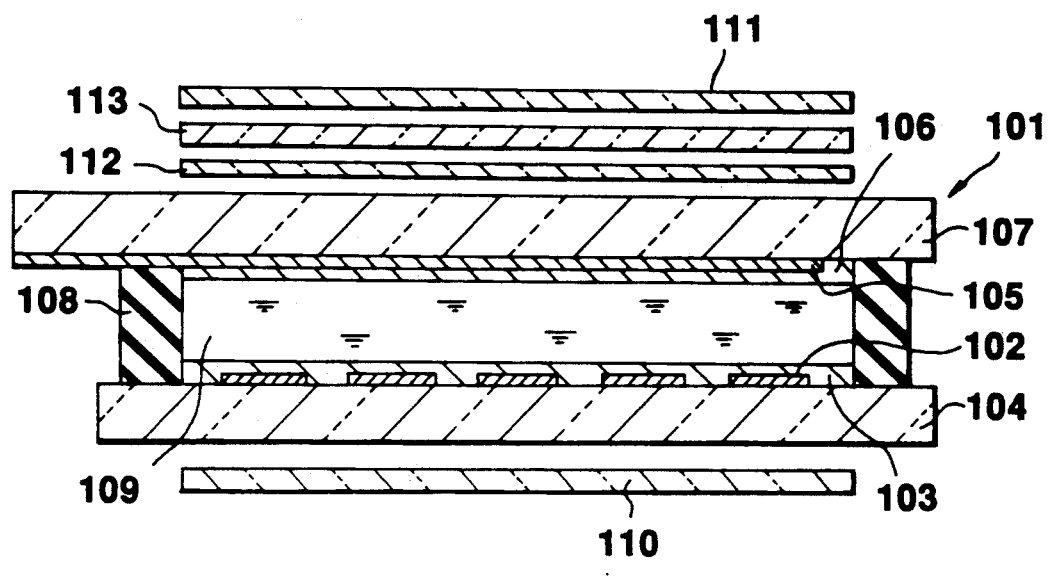
FIG. 4 is a sectional view of the first embodiment according to the present invention.

The first embodiment shows an arrangement in which two retardation plates are located on one side of a liquid crystal cell, and FIGS. 3 and 4 are an exploded perspective view and a sectional view, respectively, showing this arrangement.

Referring to FIGS. 3 and 4, a liquid crystal cell 101 comprises a lower substrate 104 having electrodes 102 and an aligning film 103 formed to cover the electrodes 102, an upper substrate 107 having electrodes 105 formed perpendicular to the electrodes 102 and an aligning film 106 formed to cover the electrodes 105, a seal member 108 for sealing the upper and lower substrates 107 and 104 with a predetermined distance therebetween, and a liquid crystal material 109 sealed in the space defined by the upper and lower substrates 107 and 104 and the seal member 108. A dielectric constant ratio $\Delta\epsilon/\epsilon-$ of the liquid crystal material 109 is set to be 1.90, and its elastic constant ratios K3/K1 and K3/K2 are set to be 1.83 and 2.40. A ratio d/p of a gap d to a natural pitch p of the liquid crystal material 109 is set to be 0.5.

Light is incident on the liquid crystal cell 101 from the lower direction in FIGS. 3 and 4. The lower substrate will be referred to as an incident-side substrate 104, and the upper substrate will be referred to as an exit-side substrate 107 hereinafter.

A polarizer 110 comprising a linearly polarizing plate is located outside the incident-side substrate 10 of the liquid crystal cell 101, and an analyzer 111 similarly comprising a linearly polarizing plate is located above the exit-side substrate 107 of the cell 101. Two retardation plates 112 and 113 are located between the exit-side substrate 107 of the liquid crystal cell 101 and the analyzer 111.

The aligning films 103 and 106 respectively formed on the opposite surfaces of the incident- and exit-side substrates 104 and 107 are subjected to an aligning treatment such as rubbing. The direction 103a of the aligning treatment for the aligning film 103 on the incident-side substrate 104 inclines at an angle of about 30° from the lower left direction to the upper right direction with respect to a horizontal line when the liquid crystal cell 101 is observed from the front, as shown in FIG. 3. The direction 106a of the aligning treatment for the aligning film 106 of the exit-side substrate 107 rotated through 60° clockwise (to be referred to as negative or minus hereinafter) with respect to the direction 103a of aligning treatment for the incident-side substrate 104 (the direction 103a will be referred to as an incident side direction of aligning treatment hereinafter). By this aligning treatment, the liquid crystal molecules are aligned at a pretilt angle of about 8°. At the same time, the liquid crystal molecules are aligned at a negative twist angle of 240° ($\phi_0$) from the incident-side substrate 104 to the exit-side substrate 107. A product $\Delta n \cdot d$ of a gap d and a refractive index anisotropy $\Delta n$ of the liquid crystal cell 101 is set to be 864 nm (measurement wavelength: 589 nm).

The polarizer 110 is located so that its light-transmitting axis 110a is rotated through 140° ($\alpha$) counterclockwise (to be referred to as positive or plus hereinafter) with respect to the incident-side direction 103a of aligning treatment. The analyzer 111 is located so that its light-transmitting axis 111a intersects with the light-transmitting axis 110a of the polarizer at an angle of 55° ($\epsilon$).

The first and second retardation plates 112 and 113 are retardation plates obtained by monoaxially stretching polycarbonate and having a product Δn·d of 400 nm (measurement wavelength: 589 nm). Each retardation plate has a product Δn·d smaller by a decrease in Δn·d upon application of a bias voltage to the liquid crystal cell 101 than that of the cell 101 (i.e; the product Δn·d of the retardation plate is a value obtained by multiplying the product Δn·d of the liquid crystal cell 101 with 0.80 to 0.95). The first retardation plate 112 is located so that its phase delay axis 112a is rotated through about +40° (β) with respect to the incident-side direction 103a of aligning treatment. The second retardation plate 113 is located so that its phase delay axis 113a is rotated through about 5° (γ) with respect to the incident-side direction 103a of aligning treatment.

In the STN type liquid crystal display device having the above arrangement, the differences in phase shifts of light components having different wavelengths caused when these light components pass through the liquid crystal cell 101 can be minimized by the two retardation plates 112 and 113, and coloring of the display colors can be eliminated or reduced. The changer in Δn·d of the liquid crystal cell 101 is compensated by the change in Δn·d of the retardation plates 112, 113 when the incident light is inclined from the direction of the normal to the cell 101 and two retardation plates 112 and 113. The reverse area can be reduced, and the area having a higher contrast is increased.

Figure 5:
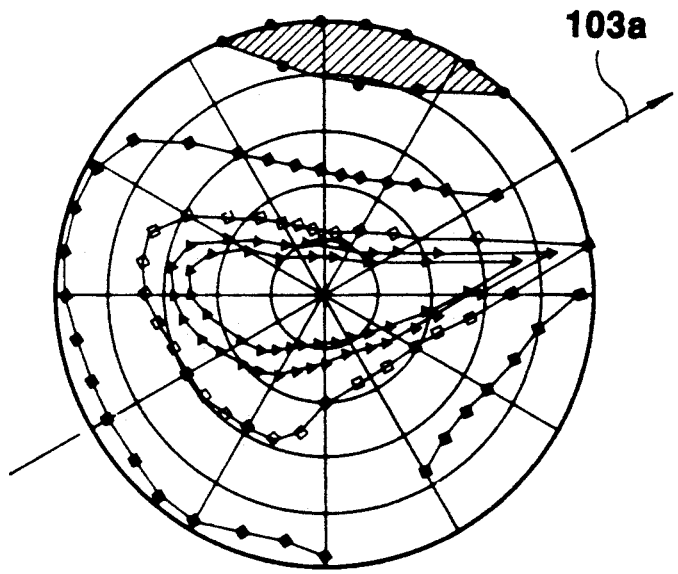
FIG. 5 is a graph showing equi-contrast curves in a liquid crystal display device of the first embodiment
Figure 6A:
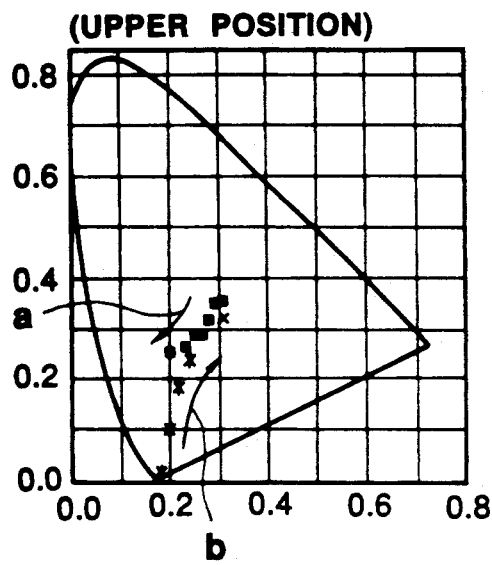
FIGS. 6A, 6B, 6C, and 6D are CIE chromaticity diagrams showing changes in display colors in the liquid crystal display device of the first embodiment.
Figure 6B:
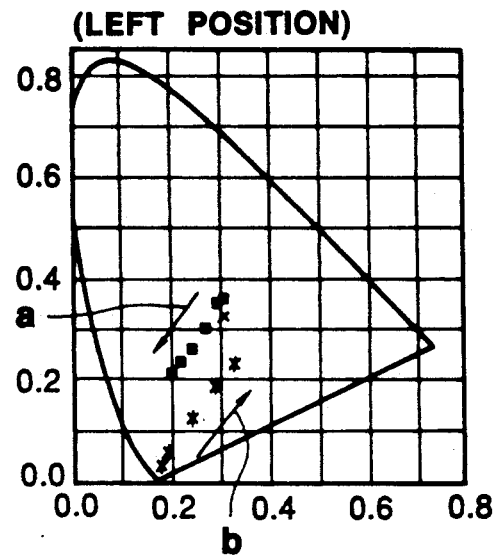
Figure 6C:
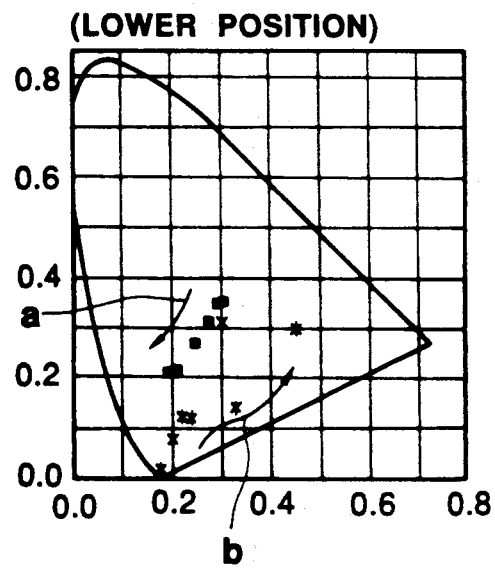
Figure 6D:
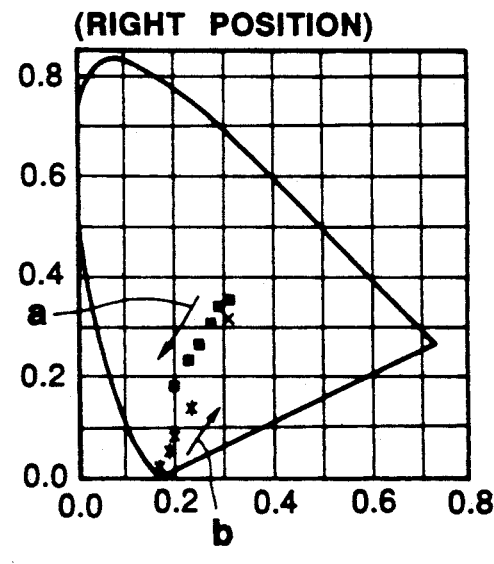

FIG. 5 shows equi-contrast curves of this embodiment. These curves represent contrast values when the display device is observed from 10°, 20°, 30°, 40°, and 50° directions from the direction of the normal to the substrates of the liquid crystal display device. A hollow triangle represents a point at which the contrast is 150; a black triangle represents a point which the contrast is 100; a hollow square represents a point at which the contrast is 50; a black square represents point at which the contrast is 10; and a dot represents a point at which the contrast becomes negative, i.e; the black-and-white display color is reversed. The reverse area is a hatched portion in FIG. 5. In FIG. 5, an allow X indicates the direction 103 of aligning treatment for the indecent-side substrate 104.

Figure 1:
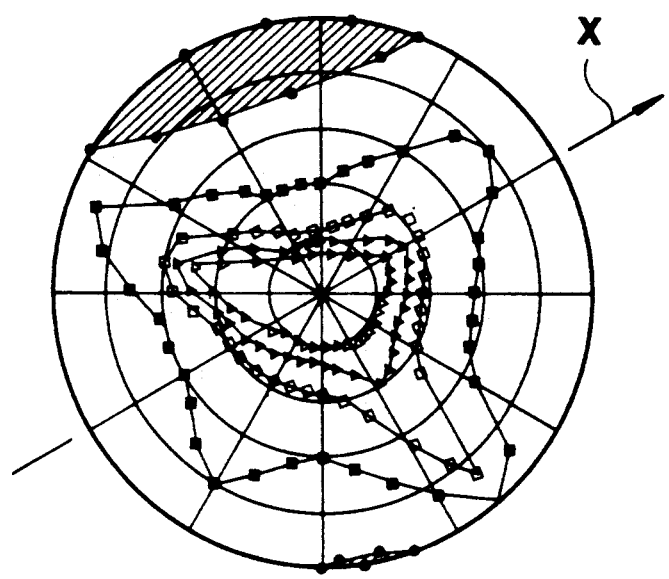
FIG. 1 is a graph showing equi-contrast curves in a conventional liquid crystal display device.
Figure 2A:
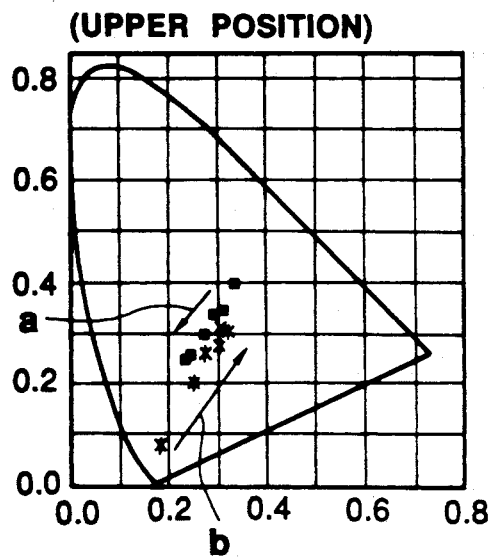
FIGS. 2A, 2B, 2C, and 2D are CIE chromaticity diagrams showing changes in display colors in the conventional liquid crystal display device.
Figure 2B:
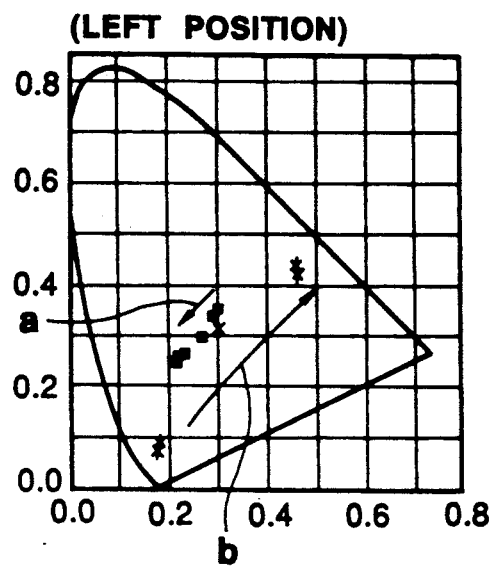
Figure 2C:
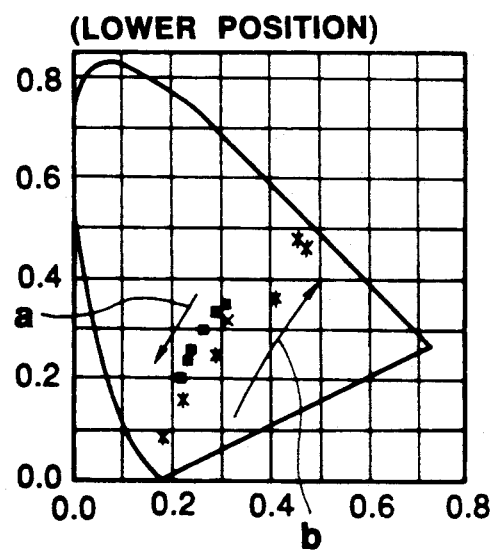
Figure 2D:
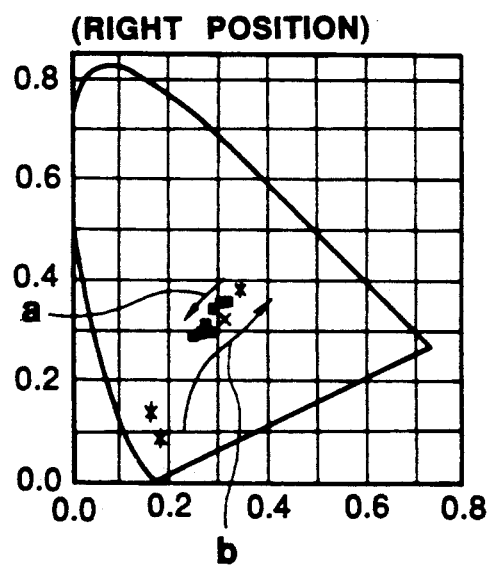

Referring to FIG. 5, as compared with the conventional liquid crystal display device shown in FIG. 1, the area having a contrast of 10 is increased, and the reverse area appearing at the upper portion of the liquid crystal display device can be reduced. At the same time, no reverse area appears at the lower portion of the liquid crystal display device. According to this embodiment, the view angle is increased, and the view angle characteristics can be apparently improved.

FIGS. 6A, 6B, 6C, and 6D show CIE chromaticity diagrams representing changes in display colors in light-transmitting (ON: ■) and light-shielding (OFF: *) states when the view angle is sequentially changed from the direction of the normal to the substrates to the 50° direction in units of 10° in an order of upper, left, lower, and right sides of the liquid crystal display device. In this case, an arrow a in each diagram indicates a direction of a change in chromaticity of transmitted light in the ON state, and an arrow b in each diagram indicates a change in chromaticity of transmitted light in the OFF state. As is apparent from FIGS. 6A, 6B, 6C, and 6D, changes in display colors in the respective directions are smaller than those in the conventional liquid crystal display device shown in FIGS. 2A to 2D.

When the two retardation pates 112 and 113 are located adjacent to each other, the twist angle $\phi_0$ of the liquid crystal of the liquid crystal cell 101 falls within the range of 200° to 240°, and the Δn·d value falls within the range of 700 nm to 900 nm (measurement wavelength: 589 nm) as in this embodiment, with respect to the incident-side direction 103a of aligning treatment, the angle α of light-transmitting axis 110a of the polarizer 110 preferably falls within the range of 135° to 180°, the angle ε of the light-transmitting axis 111a of the analyzer 111 preferably falls within the range of 40° to 105°, the angle of the phase delay axis 112a of the first retardation plate 112 preferably falls within the range of $(270° - |\phi_0|) + 15°$, and the angle of the phase delay axis 113a of the second retardation plate 113 preferably falls within the range of $(270° - |\phi_0|/2) + 15°$. At the same time, the product Δn·d of each of the first and second retardation plates 112 and 113 is preferably set to be ½ (i.e; 2 in ½ represents the number of retardation plates) of a value obtained by multiplying the Δn·d value of the liquid crystal cell 101 with 0.80 to 0.95 and, preferably 0.90 to 0.95.

Second Embodiment

The second embodiment exemplifies an arrangement in which one retardation plate is arranged on each side of a liquid crystal cell. The second embodiment will be described with reference to FIGS. 7 to 9D. The same reference numerals as in the first embodiment.

Figure 7:
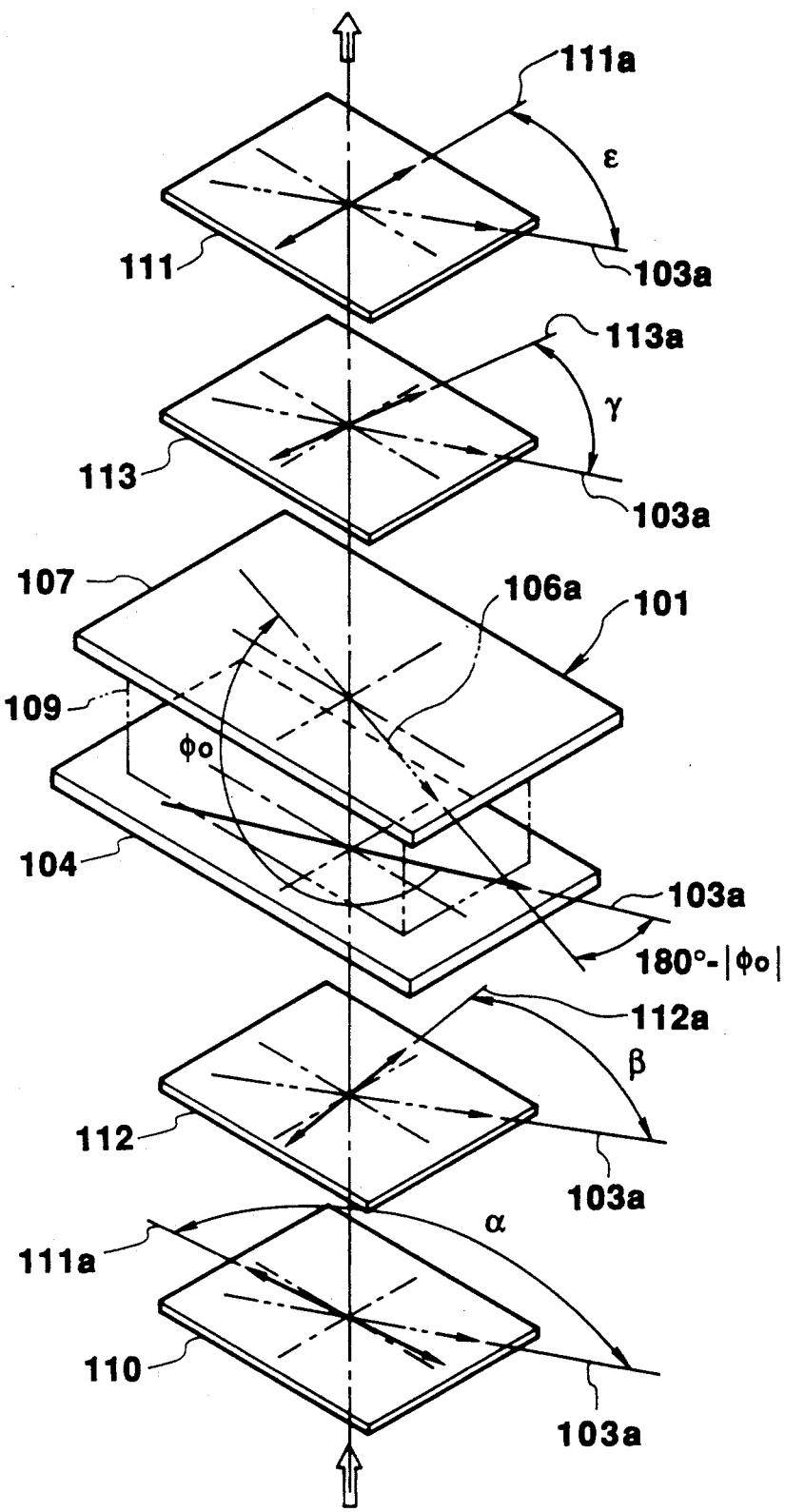
FIG. 7 is an exploded perspective view showing a schematic arrangement of the second embodiment according to the present invention.

Referring to FIG. 7, a polarizer 110 comprising a linearly polarizing plate is located outside or below an incident-side substrate 104 of a liquid crystal cell 101, and an analyzer 111 similarly comprising a linearly polarizing plate is located above an exit-side substrate 107 of the cell 101. A first retardation plate 112 is located between the incident-side substrate 104 of the liquid crystal cell 101 and the polarizer 110. A second retardation plate 113 is located between the exit-side substrate 107 of the cell 101 and the analyzer 111.

The aligning directions of aligning films of the liquid crystal cell 101 and the aligning state of a liquid crystal material are the same as those in the first embodiment. A light-transmitting axis 110a of the polarizer 110 is rotated through +145° (α) counterclockwise (positive or plus hereinafter) with respect to an incident-side direction 103a of aligning treatment. A light-transmitting axis 111a of the analyzer 111 is rotated through about +70° (ε) with respect to the incident-side direction 103a of aligning treatment.

A phase delay axis 112a of the first retardation plate 112 is rotated through about +85° (β) with respect to the incident-side direction 103a of aligning treatment, and a phase delay axis 113a of the second retardation plate 113 is rotated through about 40° (γ) with respect to the incident-side direction 103a of aligning treatment.

As in the first embodiment, the differences in phase shifts of light components having different wavelengths caused when these light components pass through the liquid crystal cell 101 can be minimized by the two retardation plates 112 and 113, and coloring of the display colors can be eliminated or reduced. The change in Δn·d of the liquid crystal cell 101 is compensated by the change in Δn·d of the retardation plater 112, 113 when the indecent light is inclined from the direction of the normal to the cell 101 and two retardation plater 112 and 113, and the area having a higher contrast is increased.

Figure 8:
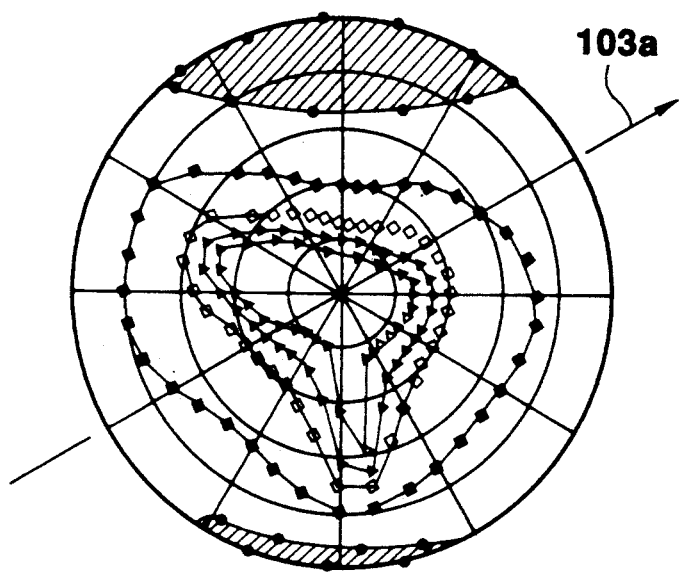
FIG. 8 is a graph showing equi-contrast curves of a liquid crystal display device of the second embodiment.
Figure 9A:
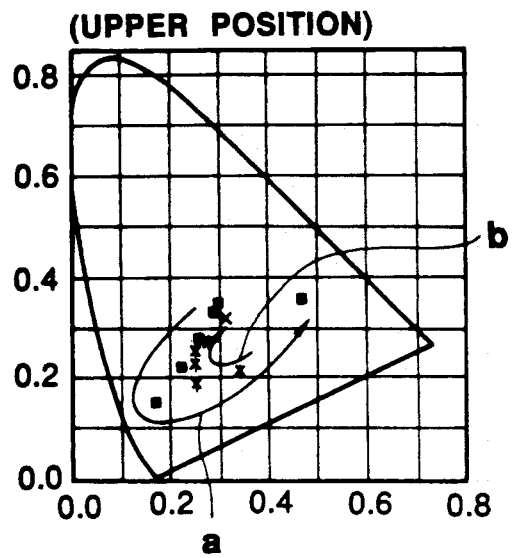
FIGS. 9A, 9B, 9C, and 9D are CIE chromaticity diagrams showing changes in display colors in the liquid crystal display device of the second embodiment.
Figure 9B:
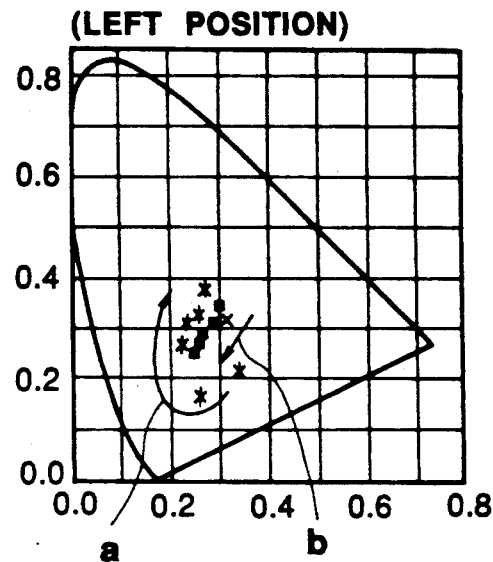
Figure 9C:
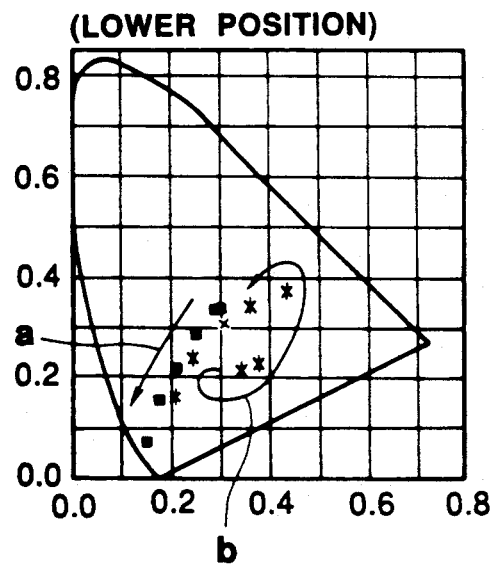
Figure 9D:
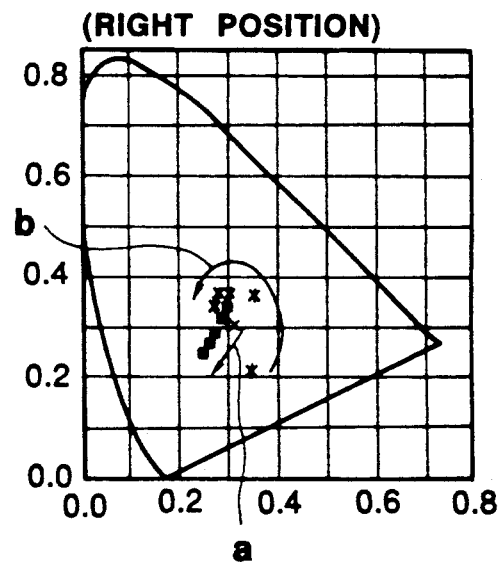

FIG. 8 shows equi-contrast curves of this embodiment. These curves are formed in the same manner as in the first embodiment described above. Referring to FIG. 8, as compared with the conventional liquid crystal display device shown in FIG. 1, the area having a contrast of 10 is increased in the lateral direction. Therefore, the view angle characteristics can be improved in the second embodiment.

FIGS. 9A, 9B, 9C, and 9D show CIE chromaticity diagrams representing changes in display colors in light-transmitting (ON: ■) and light-shielding (OFF: *) states when the view angle is sequentially changed from the direction of the normal to the substrates to the 50° direction in units of 10° in an order of upper, left, lower, and right sides of the liquid crystal display device, as in the CIE chromaticity diagrams of FIGS. 6A to 6D. In this case, as is apparent from FIGS. 9A, 9B, 9C, and 9D, changes in display colors in the respective directions in the OFF state are smaller than those in the conventional liquid crystal display device shown in FIGS. 2A to 2D.

When the two retardation plates 112 and 113 are located one on each side of the liquid crystal cell 101, the twist angle $\phi_0$ of the liquid crystal of the liquid crystal cell 101 falls within the range of 200° to 240°, and the $\Delta n \cdot d$ value falls within the range of 700 nm to 900 nm (measurement wavelength: 589 nm) as in this embodiment, with respect to the incident-side direction 103a of aligning treatment, the angle α of the light-transmitting axis 110a of the polarizer 110 preferably falls within the range of 135° to 180°, the angle ε of the light-transmitting axis 111a of the analyzer 111 preferably falls within the range of $(270° - |\phi_0|/2) + 10°$, the angle β of the phase delay axis 112a of the first retardation plate 112 preferably falls within the range of $(180° - |\phi_0|/2)$ to $(180° - |\phi_0|/2) + 30°$, and the angle γ of the phase delay axis 113a of the second retardation plate 113 preferably falls within the range of $(180° - |\phi_0|/2)$ to $(180° - |\phi_0|/2) - 30°$. At the same time, the product $\Delta n \cdot d$ of each of the first and second retardation plates is preferably set to be ½ (i.e; 2 in ½ represents the number of retardation plates) of a value obtained by multiplying the $\Delta n \cdot d$ value of the liquid crystal cell with 0.80 to 0.95. The angles α, β, γ, and ε preferably fall within the ranges of 140° to 180°, 60° to 110°, 30° to 80°, and 50° to 90°, respectively.

According to the second embodiment, as described above, with respect to the incident-side direction 103a of aligning treatment of the STN liquid crystal cell 101, the angles α and ε of the light-transmitting axes 110a and 111a of the polarizer 110 and the analyzer 111 and the angles β and γ of the phase delay axes 112a and 113a of the first and second retardation plates 112 and 113 fall within the ranges of 135° to 180°, 40° to 105°, 15° to 110°, and −30° to 80°, respectively, thereby improving view angle characteristics and reducing display coloring.

Note that the first and second retardation plates 112 and 113 are made of polycarbonate. However, the material of the retardation plate is not limited to this. For example, a retardation plate obtained by sandwiching a polyvinyl alcohol film covered by a protective film may be used.

In the second embodiment, characteristics obtained when the $\Delta n \cdot d$ value of each retardation plate and the inclination angles of a pair of polarizing plates and a pair of retardation plates are changed will be described below.

The same liquid crystal cell as in the second embodiment is used, and the $\Delta n \cdot d$ value of each retardation plate is set to be 356 nm. Of the pair of polarizing plates, the light-transmitting axis 110a of the polarizer 110 is almost aligned with a 150° direction with reference to the incident-side direction 103a of aligning treatment, and the direction of the light-transmitting axis 111a of the analyzer 111 is set in a direction of about 60°. At the same time, the phase delay axis 112a of the first retardation plate 112 is inclined at an angle falling within the range of 85°±5°, and the phase delay axis 113a of the second retardation plate 113 is inclined at an angle falling within the range of 35°±5°.

Figure 10A:
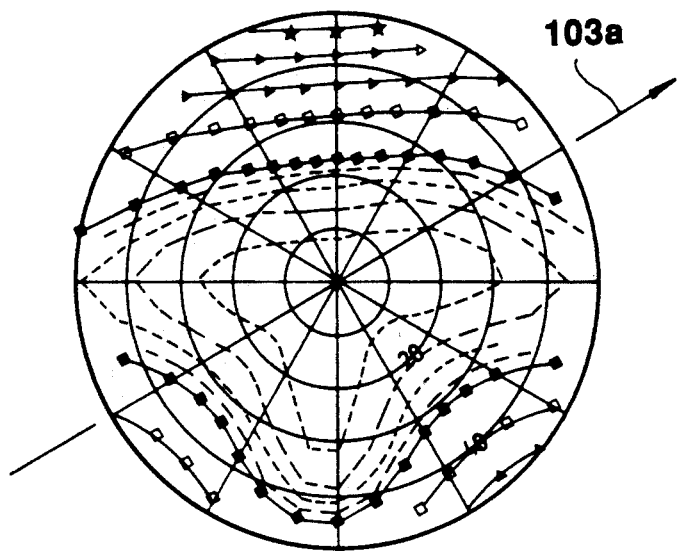
Figure 10B:
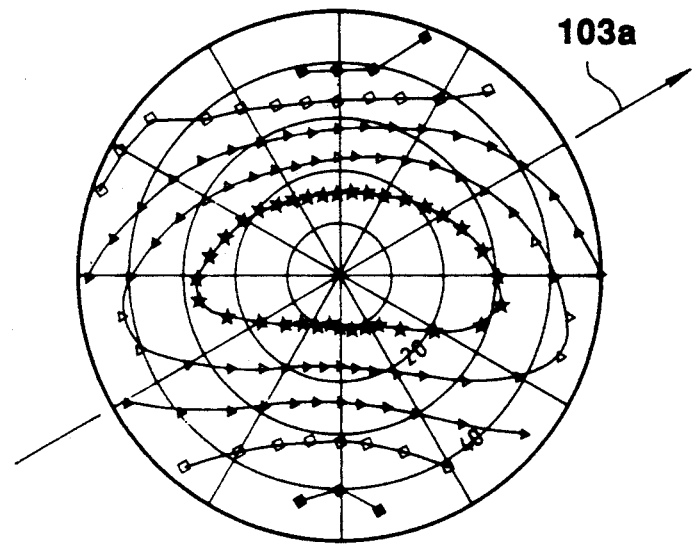
Figure 10C:
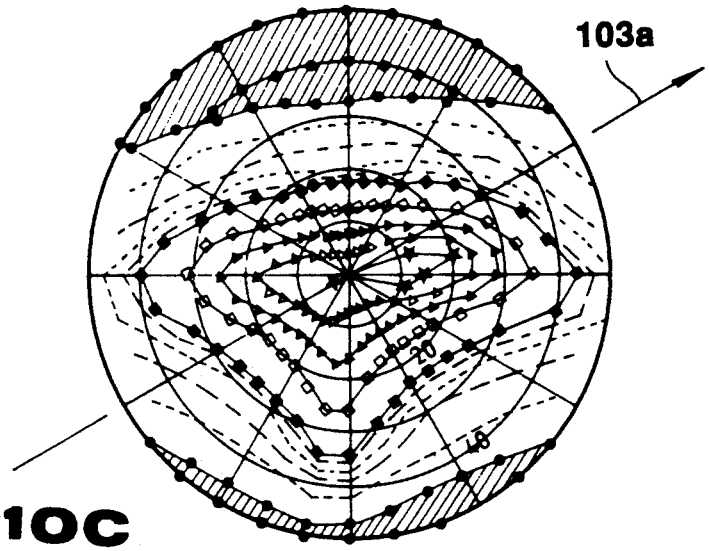

Equi-brightness characteristics obtained by measuring a transmittance distribution in a light-shielding state by means of Y values, equi-brightness characteristics obtained by measuring a transmittance distribution in a light-transmitting state by means of Y values, and equi-contrast curves as in the second embodiments in this liquid crystal display device are respectively shown in FIGS. 10A, 10B, and 10C.

As shown in FIGS. 10A, 10B, and 10C, this liquid crystal display device is excellent in symmetry of view angle characteristics. As compared with an arrangement in which retardation plates are located on one side of the liquid crystal cell of the first embodiment as shown in FIG. 5, this liquid crystal display device is apparently excellent in symmetry of view angle characteristics.

In order to evaluate the states of changes in colors by a visual sense in the liquid crystal display device, a color difference $\Delta E^*$, a lightness index difference $\Delta L^*$, and a chroma difference $\Delta C^*$ were measured. The color difference $\Delta E^*$, the lightness index difference $\Delta L^*$, and the chroma difference $\Delta C^*$ are defined in the CIE 1966 $(L^*, u^*, v^*)$ color space as follows:

$\Delta E_{uv}^* = \sqrt{(\Delta L^*)^2 + (\Delta C^*)^2}$ : Lightness Index $\Delta L^* = \text{abs}(L_2^* - L_1^*)$: Lightness Index Difference $\Delta C = \sqrt{(\Delta u^*)^2 + (\Delta v^*)^2}$ : Chromaticness Index $\Delta u^* = \text{abs}(u_2^* - U_1^*)$: Chromaticness Index Difference $\Delta v^* = \text{abs}(v_2^* - v_1^*)$: Chromaticness Index Difference $L_i^* = 116 \cdot (Y_i/Y0)^{1/3} - 16$ (i=0, 1, 2, if $(Y_i/Y0)$ is equal to or less than 0.008856, then $L_i^* = 903.29 \cdot (Y_i/Y0))$ $u_i^* = 13 \cdot L_i^* \cdot (u_i - u_0')$ $v_i^* = 13 \cdot L_i^* \cdot (v_i - v_0')$ $u_i' = 4 \cdot X_i/(X_i + 15 \cdot Y_i + 3 \cdot Z_i)$ $v_i' = 9 \cdot Y_i/(X_i + 15 \cdot Y_i + 3 \cdot Z_i)$ (where $X_i$, $Y_i$, and $Z_i$ are values in an XYZ colorimetric system)

Figure 11A:
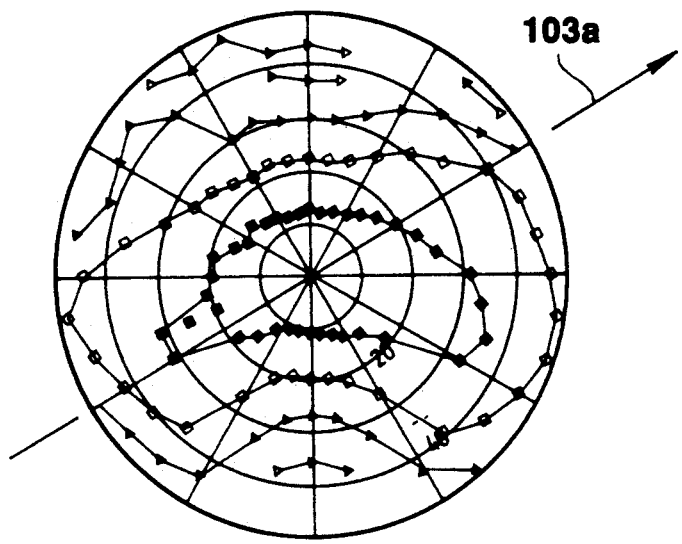
Figure 11B:
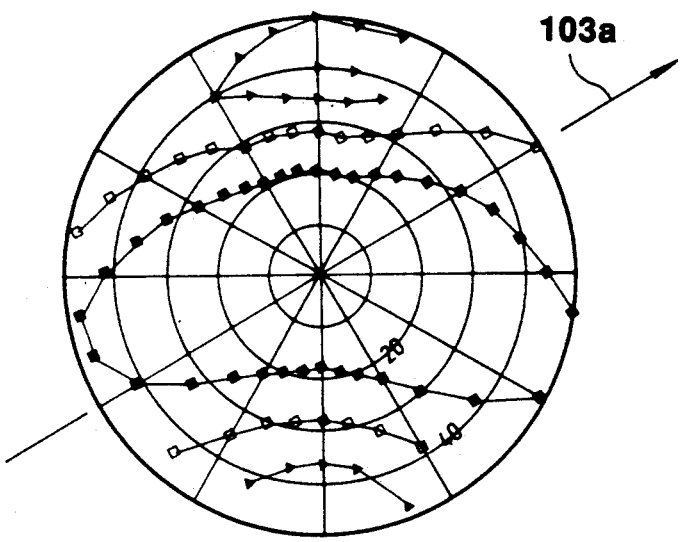
Figure 11C:
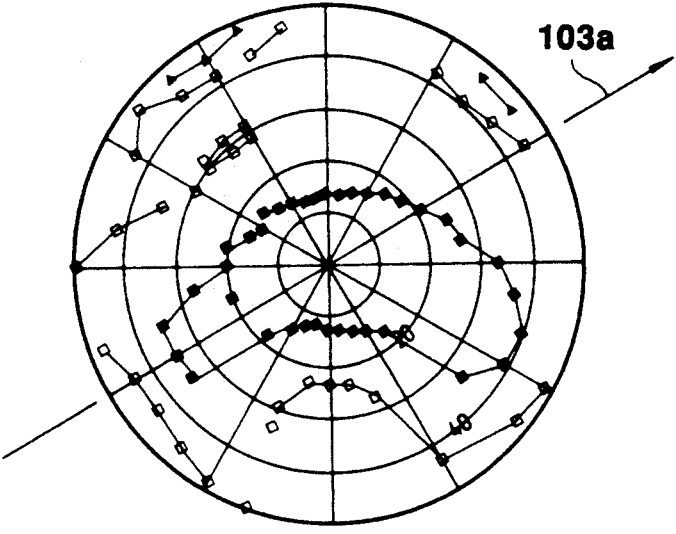

The equi-color difference curves, equi-lightness index difference curves, and equi-chroma difference curves of color difference $\Delta E^*$, the lightness index difference $\Delta L^*$, and the chroma difference $\Delta C^*$ are shown in FIGS. 11A, 11B, and 11C, respectively. As shown in FIGS. 11A to 11C, a change in chroma difference $\Delta C^*$ is very small, and visual dependency of the color difference ΔE* can be improved. In this embodiment, therefore, a change in color difference by the visual sense in a light-transmitting state can be minimized, and symmetry of view angles about the vertical axis can be improved.

Third Embodiment

Figure 12:
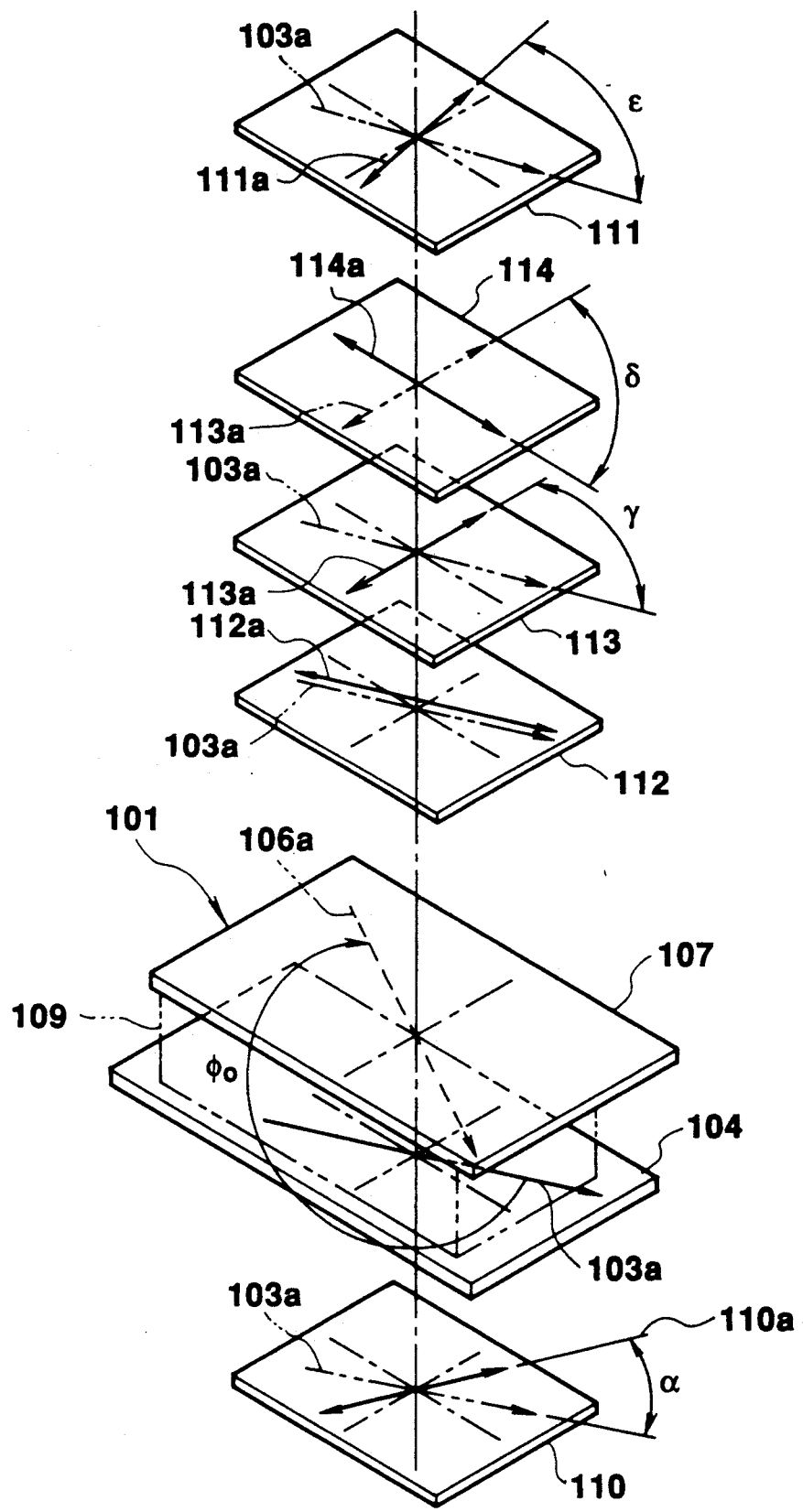
FIG. 12 is an exploded perspective view showing a schematic arrangement of the third embodiment of the present invention.
Figure 13:
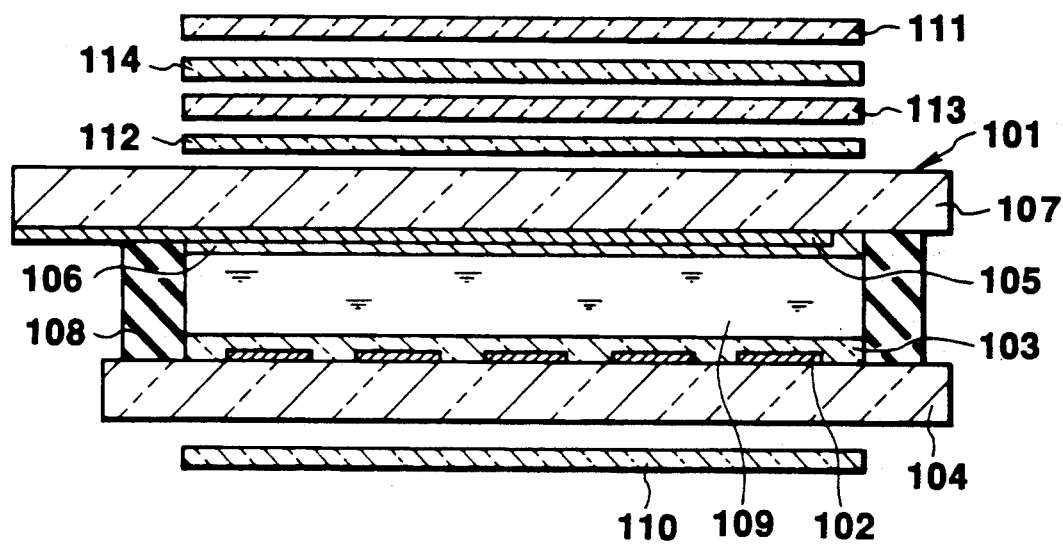
FIG. 13 is a sectional view of the third embodiment shown in FIG. 12.

By using three retardation plates, the third embodiment aims at compensating for a change in color difference. The third embodiment will be described with reference to FIGS. 12 and 13. FIGS. 12 and 13 are an exploded perspective view and a sectional view, respectively, of the third embodiment. The same reference numerals as in the first embodiment denote the same parts in the third embodiment, and a detailed description thereof will be omitted.

Referring to FIGS. 12 and 13, a liquid crystal material 109 is sealed in a liquid crystal cell 101. This liquid crystal material 109 has a dielectric constant ratio Δε/ε⊥ − of 1.93, an elastic constant ratio K3/K1 of 1.83, an elastic constant ratio K3/K2 of 3.12, and a ratio d/p of a gap d to a natural pitch of 0.5. A product Δn·d of the gap d and a refractive index anisotropy Δn of the liquid crystal cell 101 is 864 nm (measurement wavelength: 589 nm).

Light is incident on the liquid crystal cell 101 from the lower direction in FIGS. 12 and 13. A polarizer 110 comprising a linearly polarizing plate is located outside or below an incident-side substrate 104. An analyzer 111 similarly comprising a linearly polarizing plate is located above an exit-side substrate 107. Three retardation plates 112, 113, and 114 are located between the exit-side substrate 107 and the analyzer 111.

The polarizer 110 is located so that its light-transmitting axis 110a is rotated through +35° (α) counterclockwise (positive or plus) with respect to an incident-side direction 103a of aligning treatment. The analyzer 111 is located so that its light-transmitting axis 111a intersects with the incident-side direction 103a of aligning treatment at an angle of 65° (ε).

The first, second, and third retardation plates 112, 113, and 114 are retardation plates obtained by monoaxially stretching polycarbonate and having a Δn·d value of 400 nm to 600 nm (measurement wavelength: 589 nm). The first retardation plate 112 is located so that its phase delay axis 112a is almost parallel to the incident side direction 103a of aligning treatment. The second retardation plate 113 is located so that its phase delay axis 113a is inclined at an angle of about 60° or 150° (γ) with respect to the incident-side direction 103a of aligning treatment. The third retardation plate 114 is located so that its phase delay axis 114a is almost perpendicular (δ) to the phase delay axis 113a of the second retardation plate 113.

Figure 14:
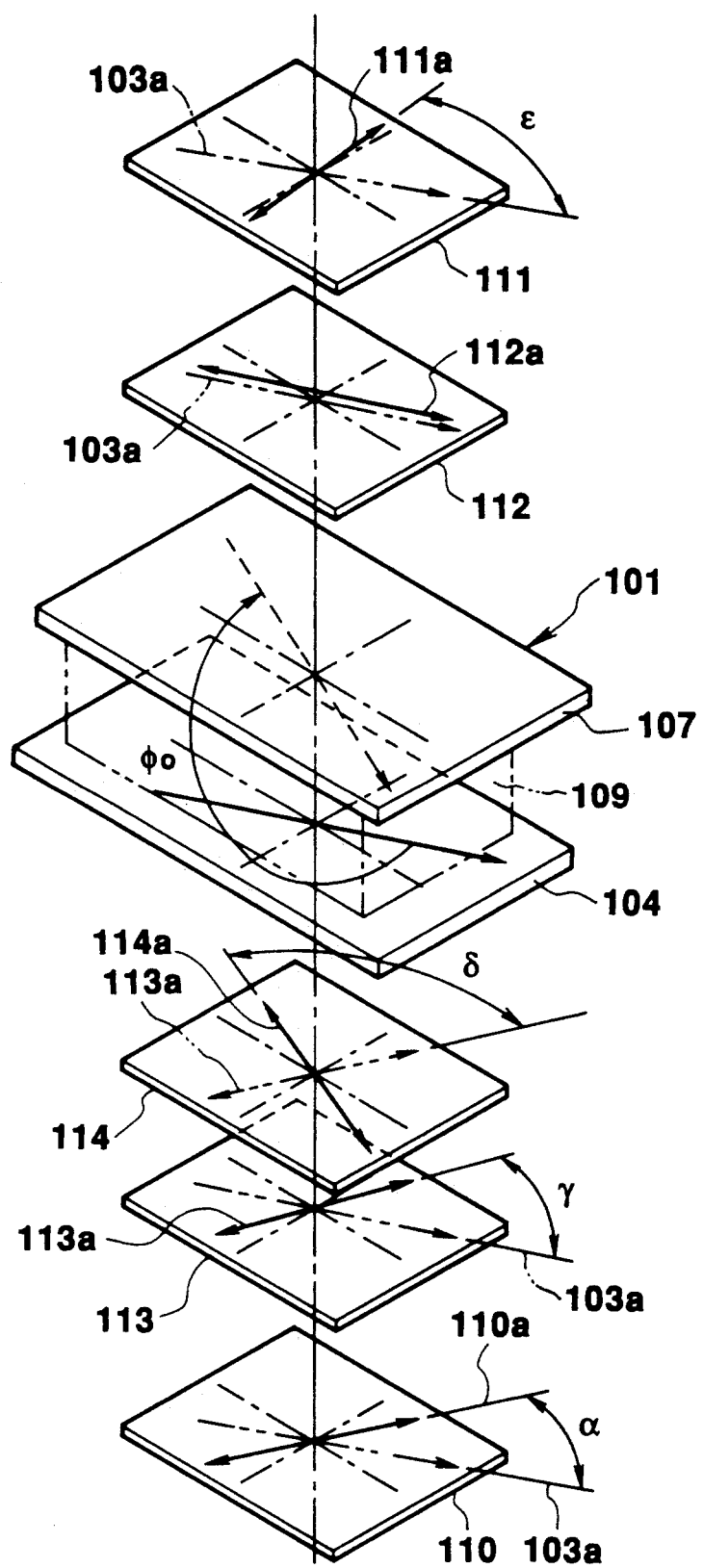
FIG. 14 is an exploded perspective view of the third embodiment in which the $\Delta n \cdot d$ value and the optical axes and layout of a pair of polarizing plates and a pair of retardation plates are changed.

The positions of the first, second, and third retardation pates 112, 113, and 114 may be variously changed. For example, as shown in FIG. 14, the second and third retardation plates 113 and 114 may be arranged between the liquid crystal cell 101 and the polarizer 110 in the order named, and the first retardation plate 112 may be located between the liquid crystal cell 101 and the analyzer 111. In this case, the second retardation plate 113 is located in FIG. 12 so that its phase delay axis 113a is inclined at an angle of about 45° or 135° (γ) with respect to the incident-side direction 103a of aligning treatment.

Figure 15:
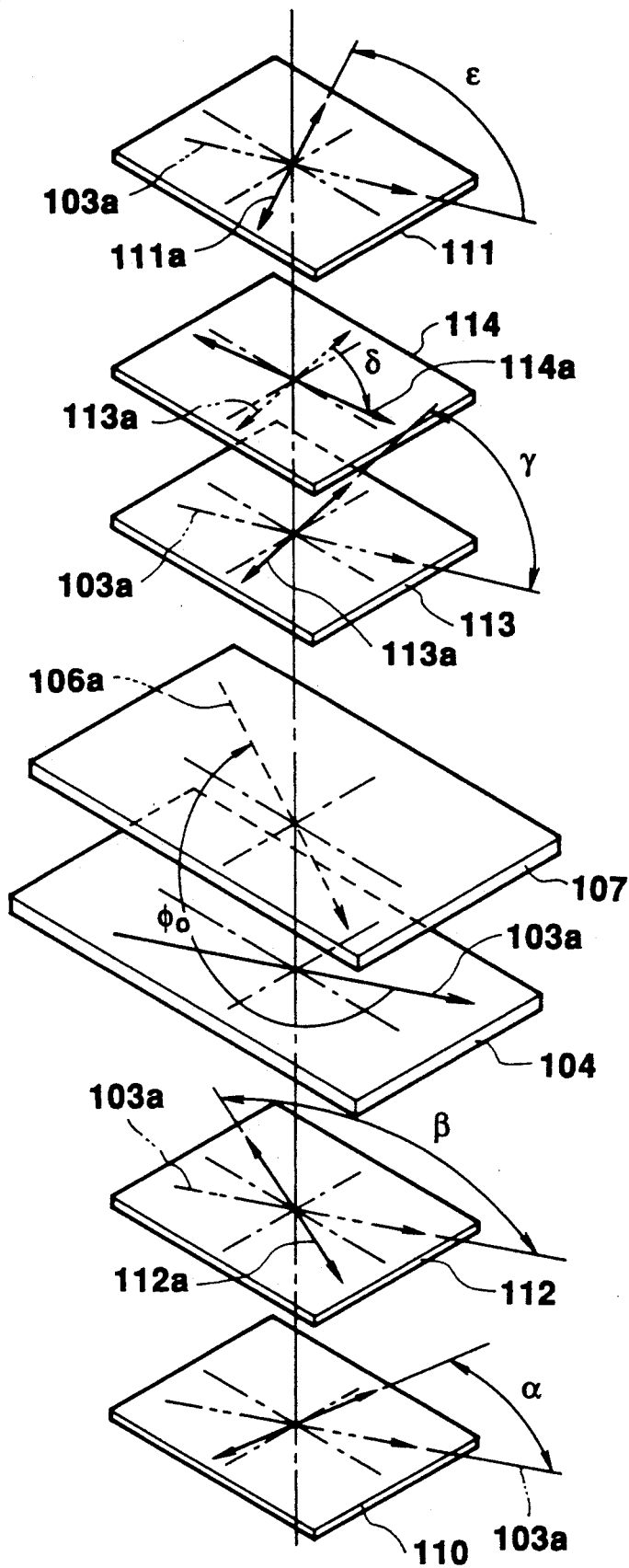
FIG. 15 is an exploded perspective view of the third embodiment in which the $\Delta n \cdot d$ value and the optical axes and layout of the pair of polarizing plates and the pair of retardation plates are further changed.

Alternatively, as shown in FIG. 15, the first retardation plate 112 may be located between the liquid crystal cell 101 and the polarizer 110, and the second and third retardation plates 113 and 114 may be located between the liquid crystal cell 101 and the analyzer 111 in the order named. In this case, the polarizer 110 is located so that its light-transmitting axis 110a is inclined at an angle of +55° (α) with respect to the incident-side direction 103a of aligning treatment, and the analyzer 111 is located so that its light-transmitting axis 111a intersects with the incident-side direction 103a of aligning treatment at an angle of 85° (ε). The first retardation plate 112 is located so that its phase delay axis 112a is inclined at an angle of about 120° with respect to the incident-side direction 103a of aligning treatment. The second retardation plate 113 is located so that its phase delay axis 113a is inclined at an angle of about 75° or 165° (γ) with respect to the incident-side direction 103a of aligning treatment. The third retardation plate 114 is located so that its phase delay axis 114a is almost perpendicular (δ) to the incident-side direction 103a of aligning treatment.

Figure 16:
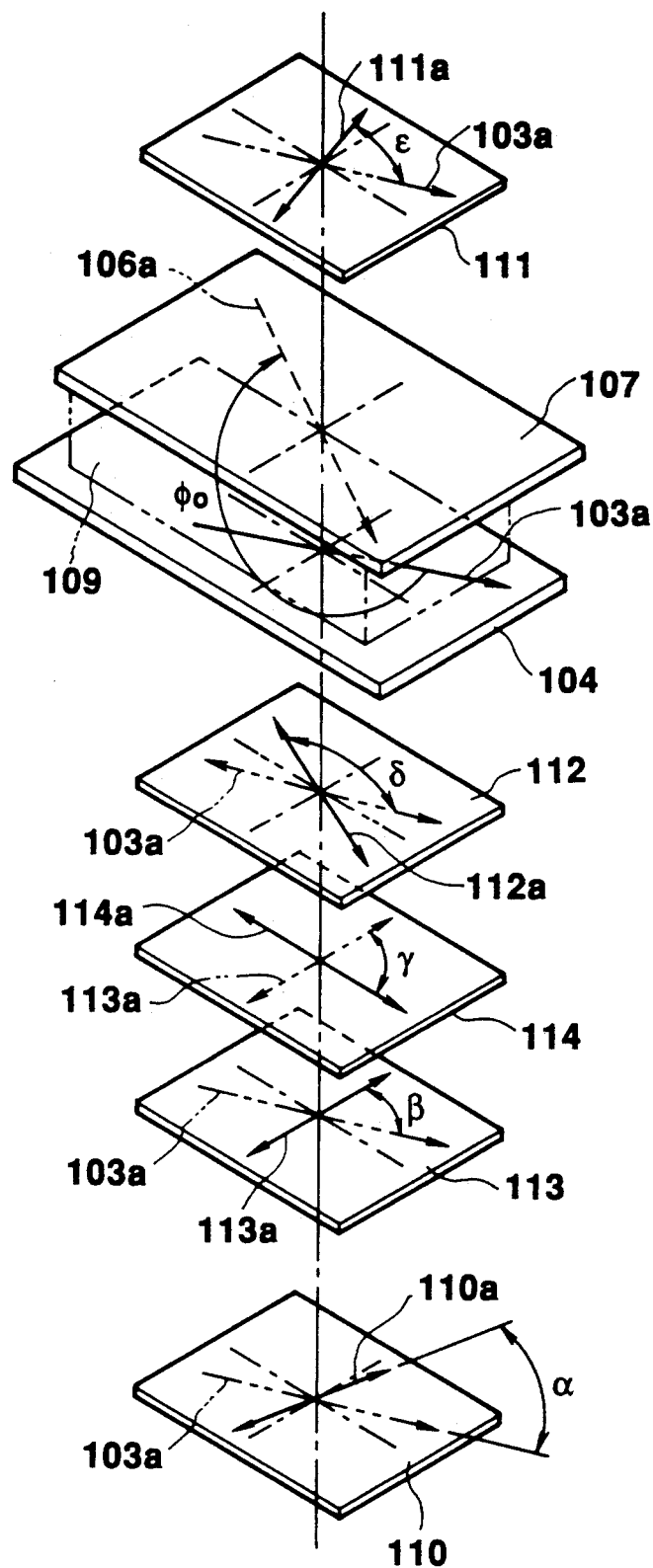
FIG. 16 is an exploded perspective view of the third embodiment in which the $\Delta n \cdot d$ value and the optical axes and layout of the pair of polarizing plates and the pair of retardation plates are further changed.

Furthermore, as shown in FIG. 16, the second, third, and first retardation plates 113, 114, and 112 may be located between the liquid crystal cell 101 and the polarizer 110 from the polarizer 110 side in the order named. In this case, in the layout of FIG. 15, the second retardation plate 113 is located so that its phase delay axis 113a is inclined at an angle of about 60° or 150° (γ) with respect to the incident-side direction 103a of aligning treatment. Alternatively, the second retardation plate 113 may be located so that its phase advance axis normal to the phase delay axis 113a may be set at 60 or 150° to the incident-side direction 103a of aligning treatment.

In this embodiment, the view angle characteristics can be improved by the second and third retardation plates whose phase delay axes are almost perpendicular to each other. Display coloring can be reduced by a combination of the first to third retardation plates.

Figure 17A:
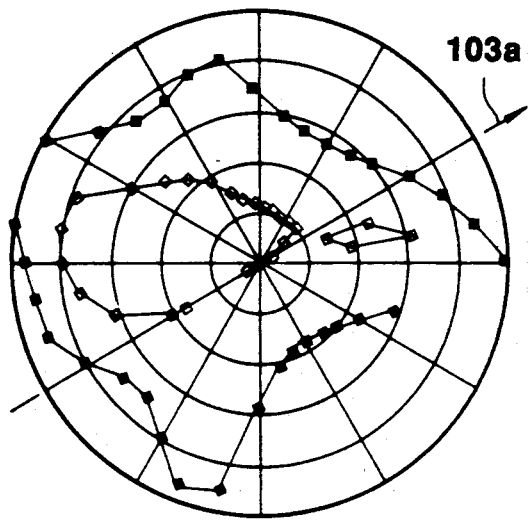
FIGS. 17A and 17B are views showing equi-contrast curves when the directions of the optical axes of retardation plates in the layout of FIG. 12 are different, respectively.
Figure 17B:
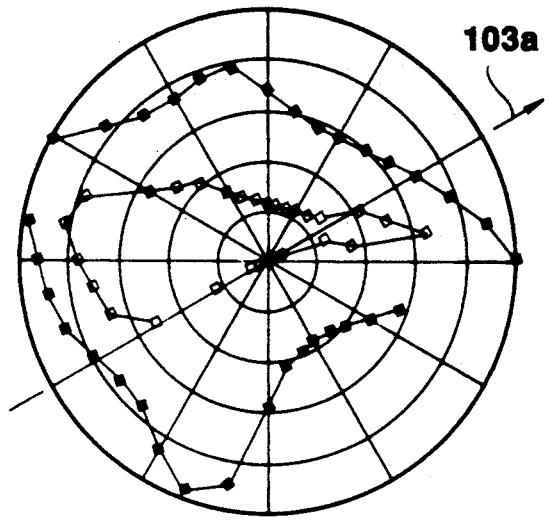
Figure 18A:
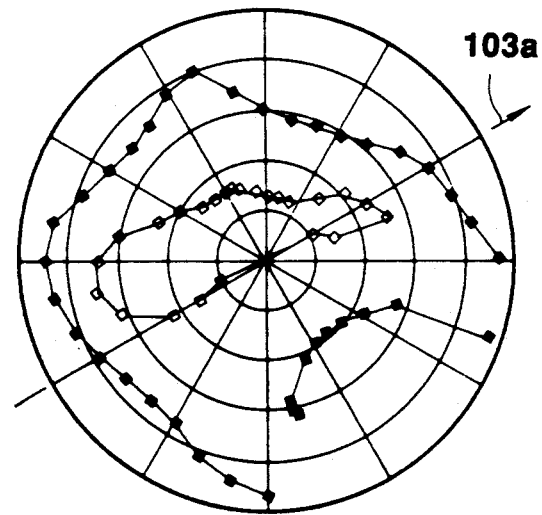
FIGS. 18A and 18B are views showing equi-contrast curves when the directions of the optical axes of retardation plates in the layout of FIG. 14 are different, respectively.
Figure 18B:
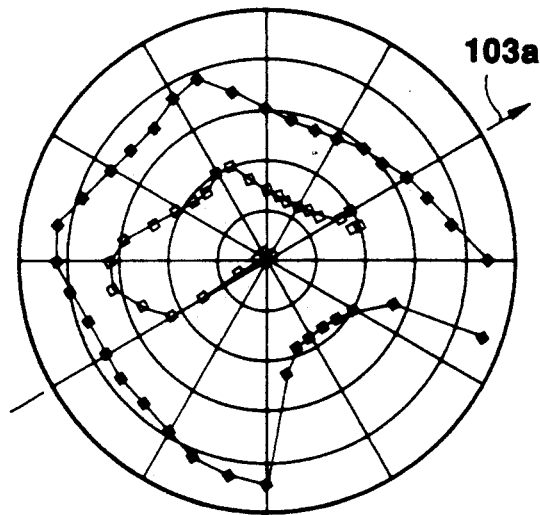
Figure 19A:
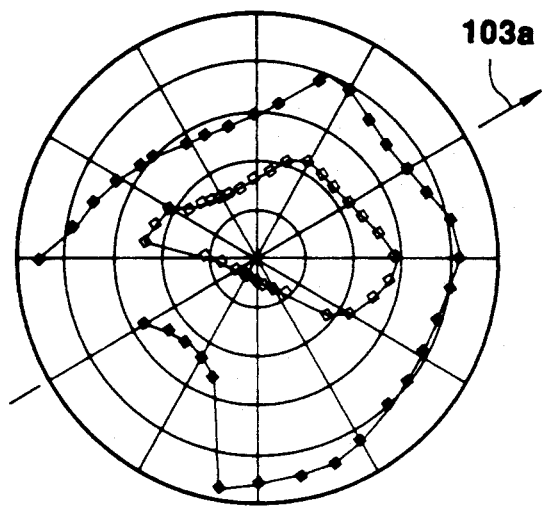
FIGS. 19A and 19B are views showing equi-contrast curves when the directions of the optical axes of retardation plates in the layout of FIG. 15 are different, respectively.
Figure 19B:
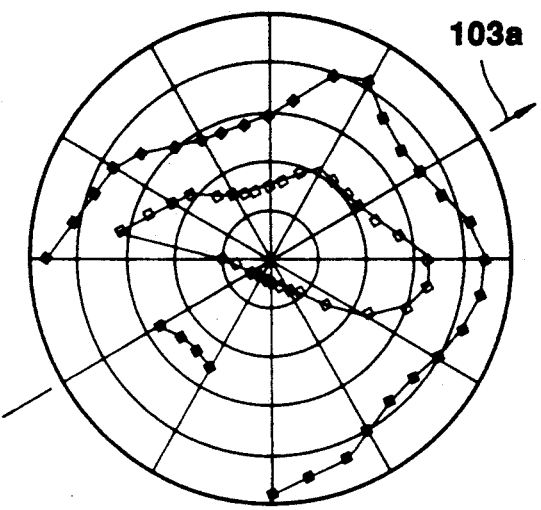
Figure 20A:
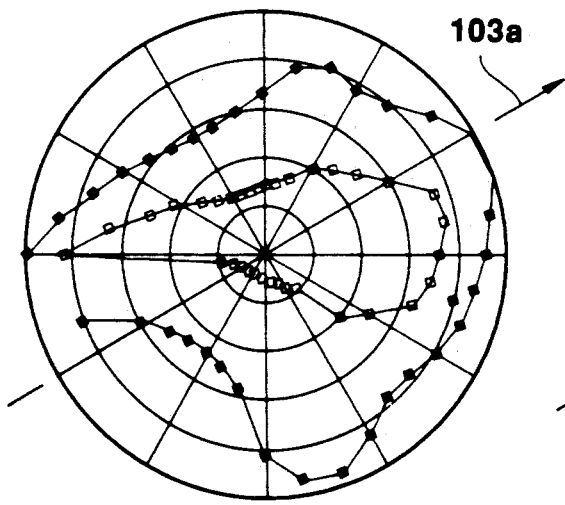
FIGS. 20A and 20B are views showing equi-contrast curves when the directions of the optical axes of retardation plates in the layout of FIG. 16 are different, respectively.
Figure 20B:
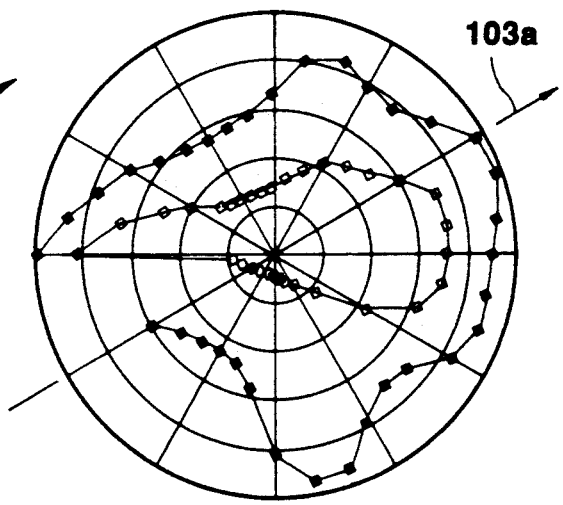

Equi-contrast curves obtained by the same measurement procedures as in the first embodiment for the liquid crystal display devices shown in FIGS. 12, 14, 15, and 16 are shown in FIGS. 17A and 17B, FIGS. 18A and 18B, FIGS. 19A and 19B, and FIGS. 20A and 20B, respectively. More specifically, FIGS. 17A and 17B show equi-contrast curves in the retardation plate arrangement of FIG. 12. FIG. 17A shows a case in which the angle γ of the phase delay axis 113a of the second retardation plate 113 is set to be 60° and the angle δ of the phase delay axis 114a of the third retardation plate 114 is set to be 150°. FIG. 17B shows a case in which the angle γ of the phase delay axis 113a of the second retardation plate 113 is set to be 150° and the angle δ of the phase delay axis 114a of the third retardation plate 114 is set to be 60°. Similarly, FIGS. 18A and 18B show equi-contrast curves in the retardation plate arrangement of FIG. 14. FIG. 18A shows a case in which the angle γ of the phase delay axis 113a of the second retardation plate 113 is set to be 45° and the angle δ of the phase delay axis 114a of the third retardation plate 114 is set to be 135°. FIG. 18B shows a case in which the angle γ of the phase delay axis 113a of the second retardation plate 113 is set to be 135° and the angle δ of the phase delay axis 114a of the third retardation plate 114 is set to be 45°. FIGS. 19A and 19B show equi-contrast curves in the retardation plate arrangement of FIG. 15. FIG. 19A shows a case in which the angle γ of the phase delay axis 113a of the second retardation plate 113 is set to be 75° and the angle δ of the phase delay axis 114a of the third retardation plate 114 is set to be 165°. FIG. 19B shows a case in which the angle γ of the phase delay axis 113a of the second retardation plate 113 is set to be 165° and the angle δ of the phase delay axis 114a of the third retardation plate 114 is set to be 75°. FIGS. 20A and 20B show equi-contrast curves in the retardation plate arrangement of FIG. 16. FIG. 20A shows a case in which the angle γ of the phase delay axis 113a of the second retardation plate 113 is set to be 60° and the angle δ of the phase delay axis 114a of the third retardation plate 114 is set to be 150°. FIG. 20B shows a case in which the angle γ of the phase delay axis 113a of the second retardation plate 113 is set to be 150° and the angle δ of the phase delay axis 114a of the third retardation plate 114 is set to be 60°.

As is apparent from these equi-contrast curves, when the first, second, and third retardation plates 112, 113, and 114 are located, as shown in FIGS. 12, 14, 15, and 16, areas each having a contrast of 10 are larger than that of the conventional STN type liquid crystal display device shown in FIG. 1. In addition, no reverse area is formed. Therefore, the view angle characteristics can be greatly improved.

Note that the first and second retardation plates 112 and 113 comprise retardation plates made of poly-carbonate as in the above embodiment. However, the material of the retardation plate is not limited to this. A retardation plate obtained by sandwiching poly-vinyl alcohol between protective films may be used.

Fourth Embodiment

The fourth embodiment obtained when the third embodiment is applied to a color liquid crystal display device will be described in detail with reference to FIGS. 21 to 26. The color liquid crystal display device of the fourth embodiment has substantially the same retardation plate arrangement as the arrangement (FIG. 12) of the third embodiment, except that a color liquid crystal cell having color filters formed on inner surface of one of the substrates in correspondence with electrodes is used. The same reference numerals as in the third embodiment denote the same parts in the fourth embodiment, and a detailed description thereof will be omitted.

Figure 21:
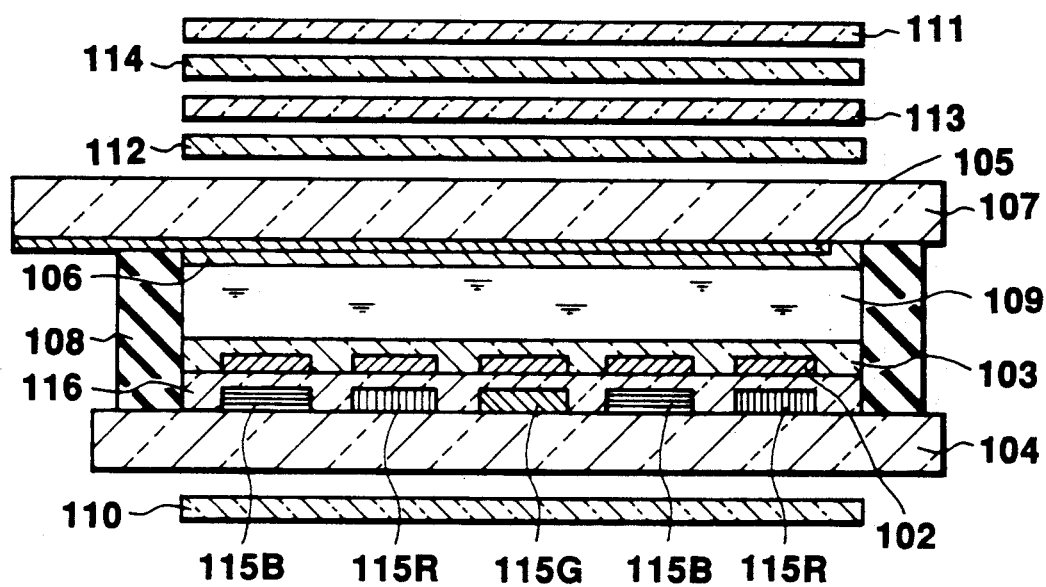
FIG. 21 is a sectional view showing an arrangement of the fourth embodiment.
Figure 22:
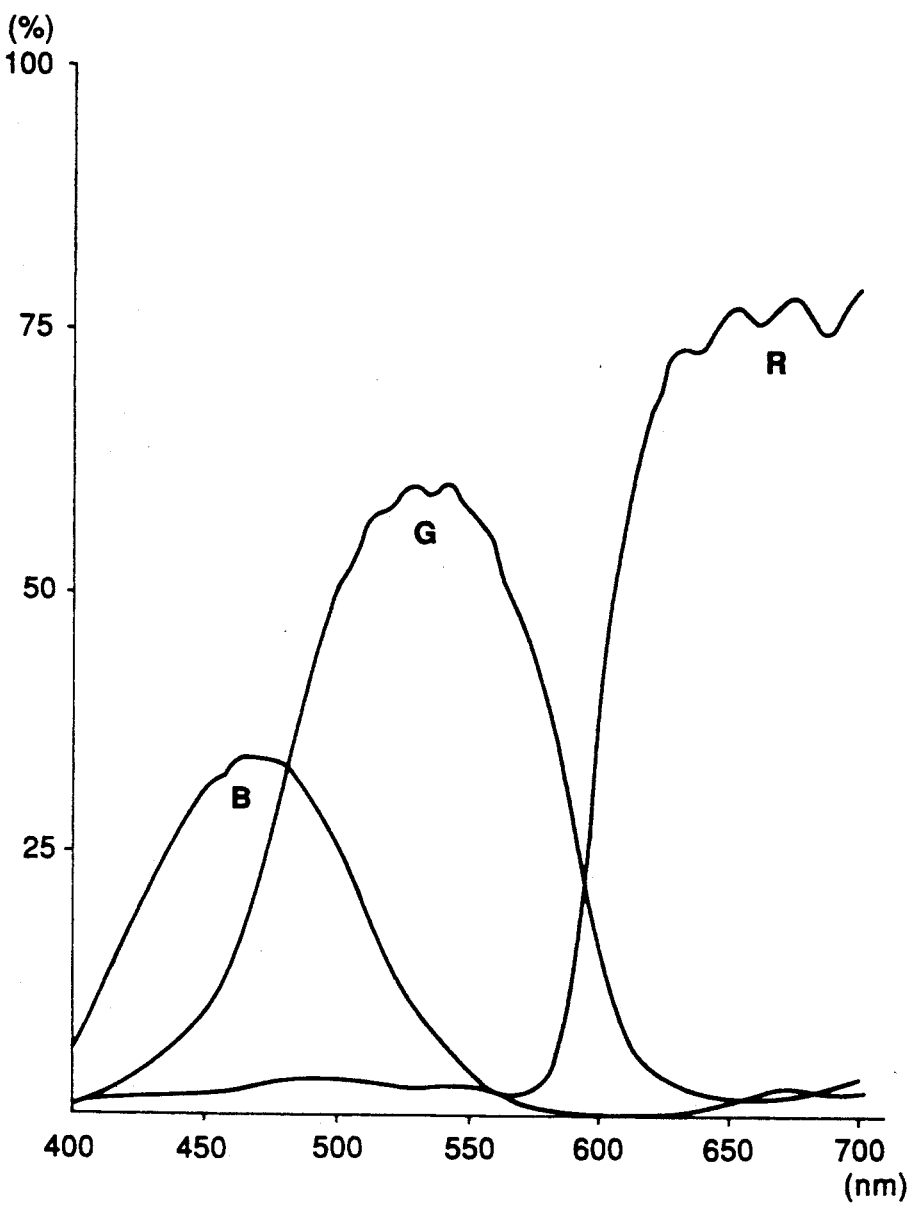
FIG. 22 is a graph showing spectral characteristics of color filters used in the fourth embodiment shown in FIG. 21.
Figure 23B:
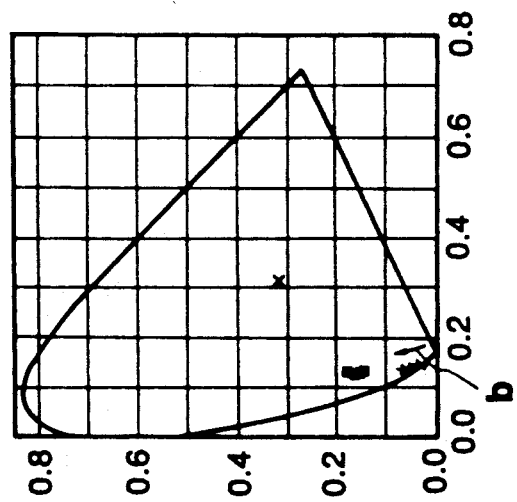
FIGS. 23R, 23G, and 23B are respectively CIE chromaticity diagrams showing changes in hues of light components passing through the R, G, and B color filters at view angles at the upper position in the liquid crystal in the fourth embodiment shown in FIG. 21.
Figure 23G:
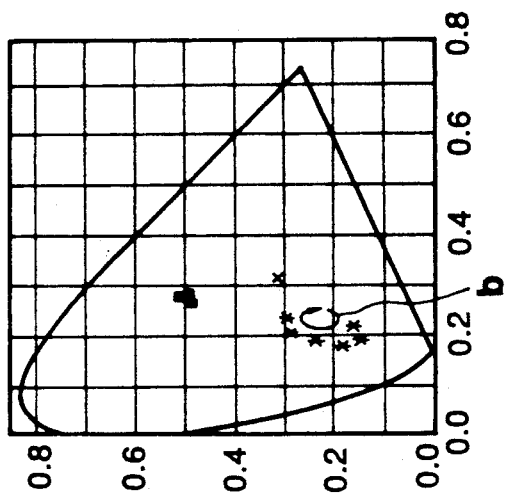
Figure 23R:
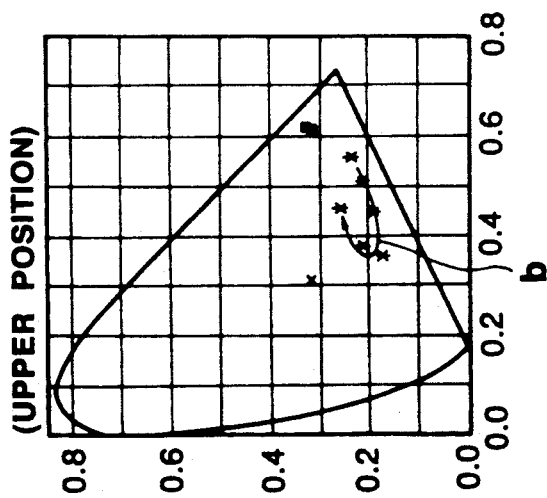
Figure 24B:
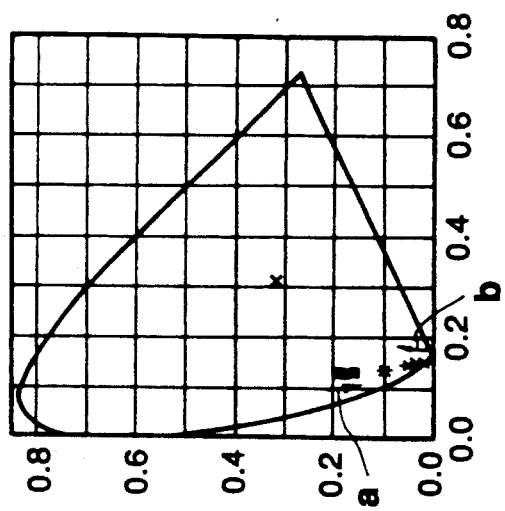
FIGS. 24R, 24G, and 24B are respectively CIE chromaticity diagrams showing changes in hues of light components passing through the R, G, and B color filters at view angles at the left position in the liquid crystal in the fourth embodiment shown in FIG. 21.
Figure 24G:
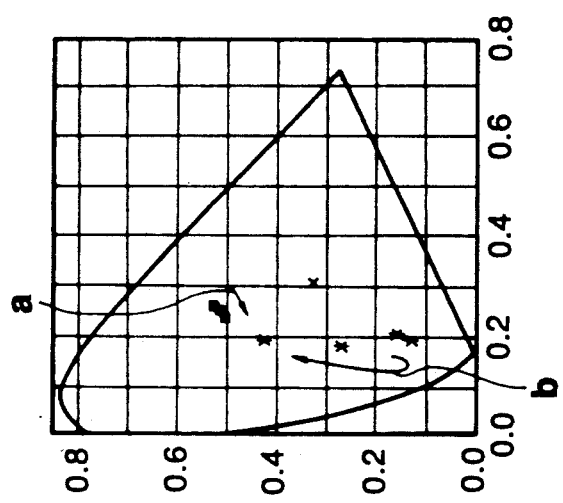
Figure 24R:
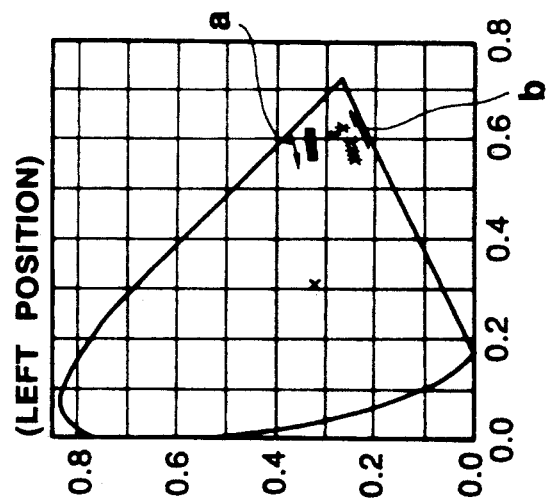
Figure 25B:
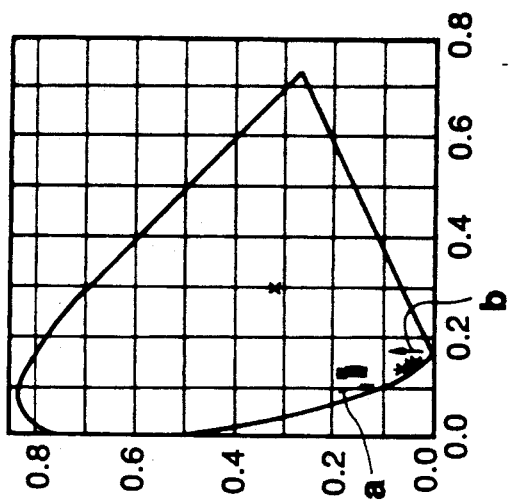
FIGS. 25R, 25G, and 25B are respectively CIE chromaticity diagrams showing changes in hues of light components passing through the R, G, and B color filters at view angles at the lower position in the liquid crystal in the fourth embodiment shown in FIG. 21.
Figure 25G:
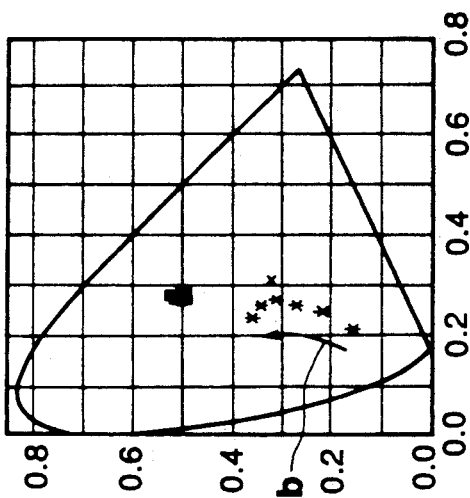
Figure 25R:
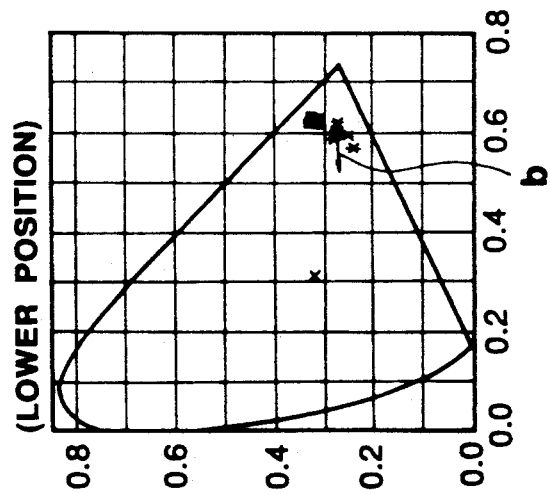

Referring to FIG. 21, three primary color (i.e; red (R), green (G), and blue (B)) filters 115R, 115G, and 115B are formed on an incident-side substrate 104 in correspondence with electrodes 102. The three primary color filters 115R, 115G, and 115B have spectral characteristics shown in FIG. 22 and comprise color filters for transmitting red, green, and blue color components, respectively. The electrodes 102 are respectively formed on the color filters through a filter protective film 116. An aligning film 103 is formed on the electrodes 102. Electrodes 105 as in the third embodiment are formed on the inner surface of an exit-side substrate 107 opposing the incident side substrate 104. An aligning film 106 is formed on the electrodes 105. The exit-side substrate 107 is bonded by a seal member 108 to the incident-side substrate 104 so as to be spaced apart from each other by a predetermined distance. A polarizer 110, an analyzer 111, a first retardation plate 112, a second retardation plate 113, and a third retardation plate 114 are arranged in the same manner as in the third embodiment shown in FIG. 12.

In the fourth embodiment, differences in phase shifts of light components having different wavelengths caused upon passing of the light components through the liquid crystal cell can be minimized by the three retardation plates as in the third embodiment, and coloring of display colors can be eliminated. In addition, changes in display colors, which depend on view points, can be minimized.

FIGS. 23R, 23G, and 23B, FIGS. 24R, 24G, and 24B, FIGS. 25R, 25G, and 25B, and FIGS. 26R, 26G, and 26B are respectively CIE chromaticity diagrams which show changes in hues of light components passing through the color filters in a light-transmitting state (ON: ■) and a light-shielding state (OFF: *) when the view point is sequentially changed to 50° in units of 10° with respect to a direction of a normal to the substrates in an order of upper, left, lower, and right positions of the liquid crystal display device of the fourth embodiment. In order to compare the above results with a conventional case, FIGS. 27R, 27G, and 27B, FIGS. 28R, 28G, and 28B, FIGS. 29R, 29G, and 29B, and FIGS. 30R, 30G, and 30B are respectively CIE chromaticity diagrams which show changes in display colors in a light-transmitting state (ON: ■) and a light-shielding state (OFF: *) when the view point is sequentially changed as in the fourth embodiment in the conventional liquid crystal display device. In this case, an arrow a indicates a change in chromaticity of a transmitted light component in an ON state, and an arrow b indicates a change in chromaticity of a transmitted light component in an OFF state.

FIGS. 23R, 23G, and 23B and FIGS. 27R 27G, and 27B show changes in hues of transmitted light components at different view points at the upper position of the liquid crystal display device. FIGS. 24R, 24G, and 24B and FIGS. 28R, 28G, and 28B show changes in hues of transmitted light components at different view points at the left position of the liquid crystal display device. FIGS. 25R, 25G, and 25B and FIGS. 29R, 29G, and 29B show changes in hues of transmitted light components at different view points at the lower position of the liquid crystal display device. FIGS. 26R, 26G, and 26B and FIGS. 30R, 30G, and 30B show changes in hues of transmitted light components at different view points at the right position of the liquid crystal display device. The drawing numbers affixed with R represent changes in hues of light components passing through the red filter. The drawing numbers affixed with G represent changes in hues of light components passing through the green filter. The drawing numbers affixed with B represent changes in hues of light components passing through the blue filter.

As is apparent from comparison between FIGS. 23R, 23G, and 23B to FIGS. 26R, 26G, and 26B, and FIGS. 27R, 27G, and 27B to FIGS. 30R, 30G, and 30B, in the color liquid crystal display device of this embodiment, changes in hues of transmitted light components at different view points can be minimized, and changes in display colors in different observation directions can be minimized.

When three retardation plates are located on the light exit side of the liquid crystal cell in the third embodiment as shown in FIG. 12, electro-optical characteristics upon changes in directions of phase delay axes of the respective retardation plates and directions of light-transmitting axes of the pair of polarizing plates are measured.

In the first arrangement, the polarizer 110 is located so that its light transmitting axis 110a is rotated through +140° (α) counterclockwise with respect to the incident-side direction 103a of aligning treatment. The analyzer 111 is located so that its light-transmitting axis 111a intersects with the incident-side direction 103a of aligning treatment at an angle of 55° ($\epsilon$).

The first and second retardation plates 112 and 113 are retardation plates obtained by monoaxially stretching polycarbonate and having a $\Delta n \cdot d$ value of 300 nm to 400 nm, and preferably 360 nm or 370 nm (measurement wavelength: 589 nm). The first retardation plate 112 is located so that its phase delay axis 112a is inclined at an angle of about 40° ($\gamma$) with respect to side direction 103a of aligning treatment. The second retardation plate 113 is located so that its phase delay axis 113a is inclined at an angle of about 5° ($\delta$) with respect to the incident-side direction 103a of aligning treatment.

The third retardation plate 114 is located between the second retardation plate 113 and the analyzer 111. The third retardation plate 114 is located so that its phase delay axis 114a is inclined at an angle of about 55° ($\beta$) with respect to the incident-side direction 103a of aligning treatment.

In this embodiment, the direction of the phase delay axis 114a of the third retardation plate 114 may be changed. That is, the third retardation plate 114 may be located such that its phase delay axis 114a is inclined at an angle of about 145° ($\beta$) with respect to the incident-side direction 103a of aligning treatment.

As described above, in this embodiment, the polarizer 110 is located so that the light-transmitting axis 110a of the polarizer 110 intersects with the incident-side direction 103a of aligning treatment of the incident-side substrate 104 at an angle of about 140°. At the same time, the light transmitting axes of the polarizer 110 and the analyzer 111 intersect with each other at an angle of about 85°. The first and second retardation plates 112 and 113 are located between the liquid crystal cell 101 and the exit-side analyzer 111. The first retardation plate 112 is located so that its phase delay axis 112a intersects with the incident-side direction 103a of aligning treatment of the incident-side substrate 104 at an angle of about −40°. The phase delay axes 112a and 113a of the first and second retardation plates 112 and 113 intersect with each other at an angle of about 35°. At the same time, the third retardation plate 114 is located between the second retardation plate 113 and the analyzer 111 to be adjacent to the exit-side analyzer 111 so that the phase delay axis 114a of the third retardation plate 114 is parallel (or perpendicular) to the light-transmitting axis 111a of the adjacent analyzer 111.

Differences in phase shifts of light components having different wavelengths upon passing of the light components through the liquid crystal cell 101 can be minimized by the pair of first and second retardation plates 112 and 113, thereby compensating for coloring of the display colors in the STN type liquid crystal display device. The third retardation plate 114 is located adjacent to the analyzer 111, so that the phase delay axis 114a of the third retardation plate 114 becomes almost parallel (or perpendicular) to the light-transmitting axis 111a of the adjacent analyzer 111. Therefore, the intensity of transmitted light on the front surface of the liquid crystal cell 101 can be increased, and the brightness of the image viewed from the front surface of the liquid crystal display device can be increased. Phase shifts of light components vertically incident on the retardation plates 112, 113, and 114 and light components obliquely incident thereon are canceled by those of the three retardation plates 112, 113, and 114 because phase shifts caused by the retardation plates 112, 113, and 114 are different from each other.

As a result, the area having a high contrast can be increased, and changes in display colors at different view angles an be reduced.

Figure 31:
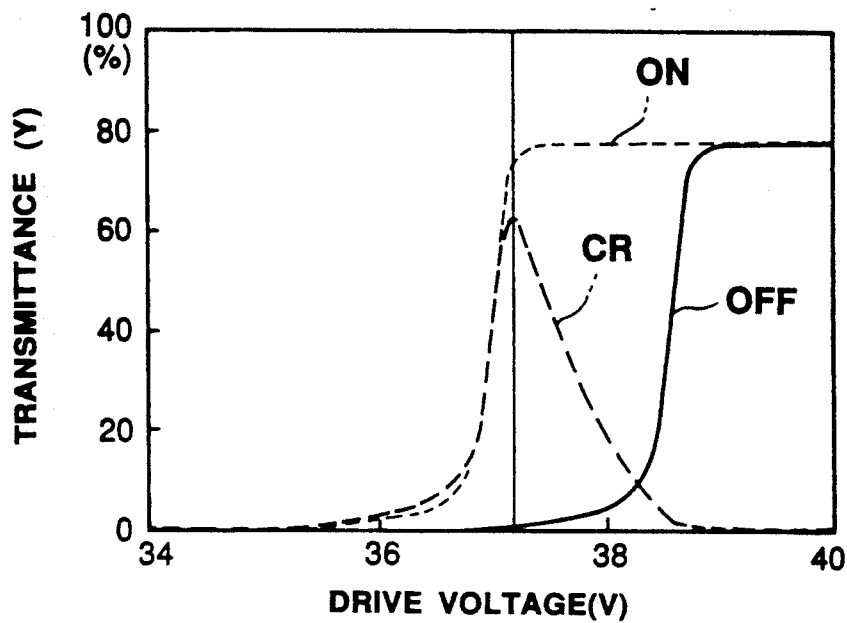
FIG. 31 is a graph showing Y-V characteristics of the first arrangement in the retardation plate layout of the third embodiment shown in FIG. 12 when the 2nd value of each retardation plate is set to be 370 nm.
Figure 32:
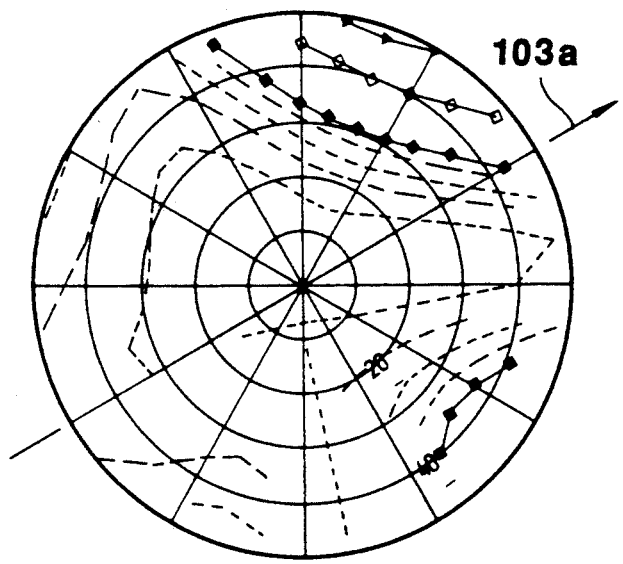
FIG. 32 is a view showing equi-brightness curves in a light-shielding state in the first arrangement having the characteristics shown in FIG. 31.
Figure 33:
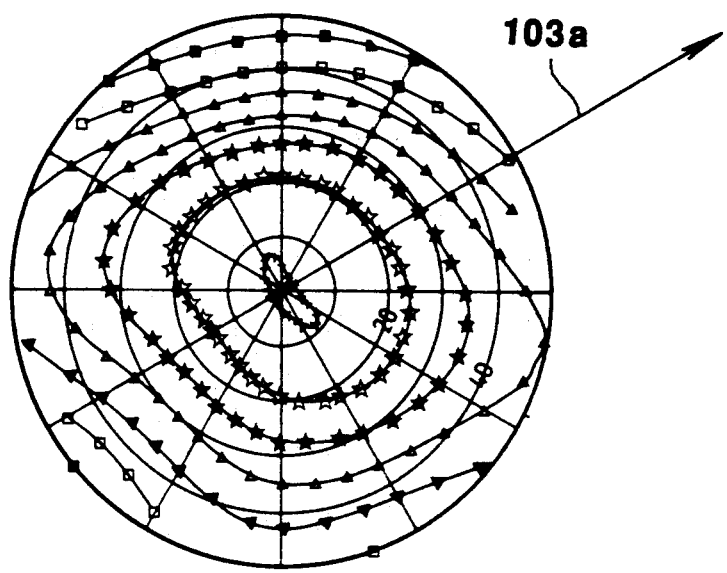
FIG. 33 is a view showing equi-brightness curves in a light-transmitting state in the first arrangement having the characteristics shown in FIG. 31.
Figure 35:
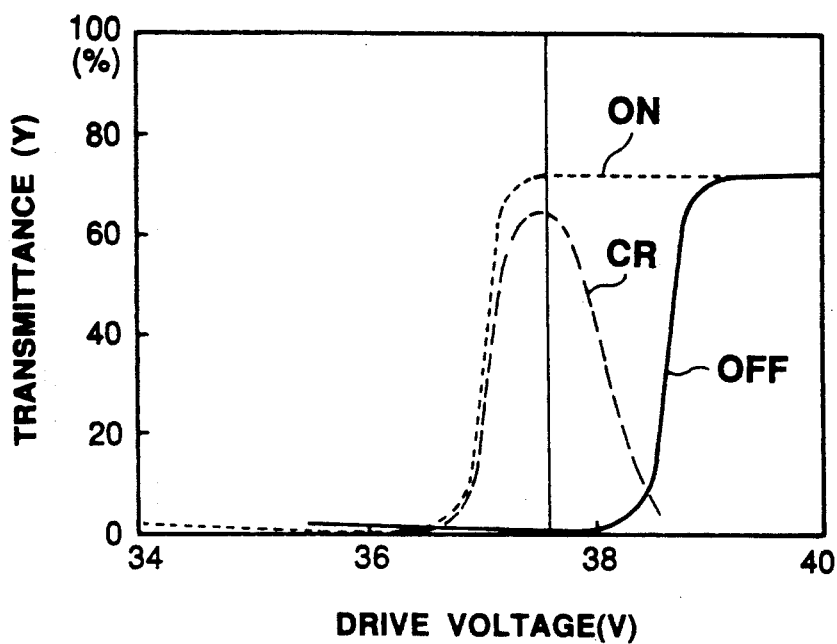
FIG. 35 is a graph showing Y-V characteristics of the first arrangement in the retardation plate layout of the third embodiment shown in FIG. 12 when the $\Delta n \cdot d$ value of each retardation plate is set to be 360 nm.
Figure 36:
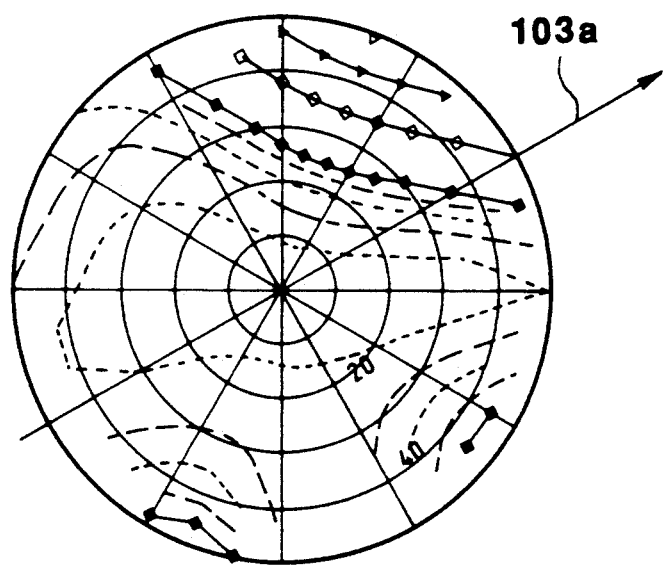
FIG. 36 is a view showing equi-brightness curves in a light-shielding state in the first arrangement having the characteristics shown in FIG. 35.
Figure 37:
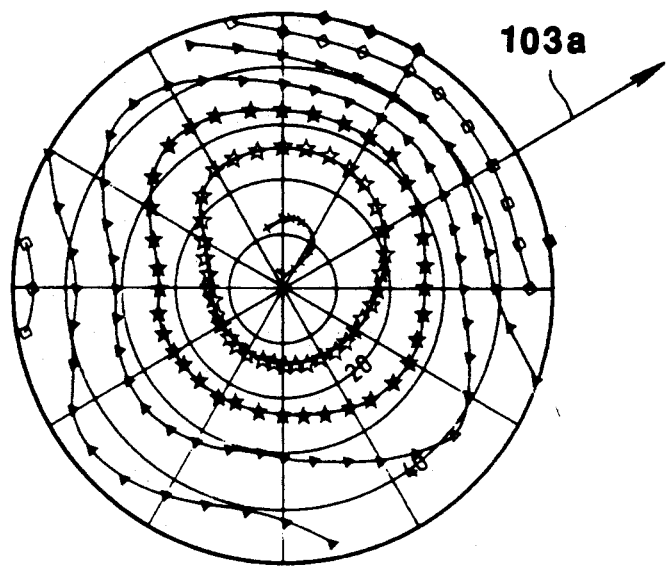
FIG. 37 is a view showing equi-brightness curves in a light-transmitting state in the first arrangement having the characteristics shown in FIG. 35.

Measurement results of electro-optical characteristics of the liquid crystal display device described above are shown in FIGS. 31 to 38. FIGS. 31 to 34 show a case in which the $\Delta n \cdot d$ value of the liquid crystal cell 101 is set to be 864 nm and the $\Delta n \cdot d$ value of each of the retardation plates 112, 113, and 114 is set to be 370 nm FIGS. 35 to 38 show a case in which the $\Delta n \cdot d$ value of the liquid crystal cell 101 is set to be 864 nm and the $\Delta n \cdot d$ value of each of the retardation plates 112, 113, and 114 is set to be 360 nm. FIGS. 31 and 35 represent Y-V characteristics representing a relationship between transmittances (Y values) and drive voltages (V) upon driving of the liquid crystal display device in accordance with time-divisional driving at a 1/480 duty ratio and a 1/15 bias, and contrast values obtained upon this driving. A solid line OFF represents a change in transmittance upon application of an OFF waveform, a dotted line ON represents a change in transmittance upon application of an ON waveform, and a broken line CR represents the contrast. When the $\Delta n \cdot d$ value of the retardation plate shown in FIG. 31 is 370 nm, the contrast is as high as 63 and the transmittance is also as high as 73%. When the $\Delta n \cdot d$ value of the retardation plate shown in FIG. 35 is set to be 360 nm, the contrast is as high as 65, and the transmittance is also as high as 72%. FIGS. 32, 33, 36, and 37 show equi-brightness curves when the screen is observed at respective inclined angles with respect to the direction of a normal to the liquid crystal cell as in the characteristics exhibited in the third embodiment. More specifically, FIGS. 32 and 36 show dark states, whereas FIGS. 33 and 37 represent bright states. Concentric circles respectively represent 10°, 20°, 30°, 40°, and 50° directions inclined from the direction of the normal to the substrates of the liquid crystal display device. A black square (■) represents a transmittance of 10%, a hollow square (□) represents a transmittance of 20%, a black triangle (▲) represents a transmittance of 30%, a hollow triangle (△) represents a transmittance of 40%, a black star (★) represents a transmittance of 50%, a hollow star (☆) represents a transmittance of 60%, and a cross (+) represents a transmittance of 70%. As shown in FIGS. 32, 33, 36, and 37, the area having a transmittance of less than 10% is large in the dark state, and the area having a transmittance of 10% or more is large in the bright state in this embodiment.

Figure 34:
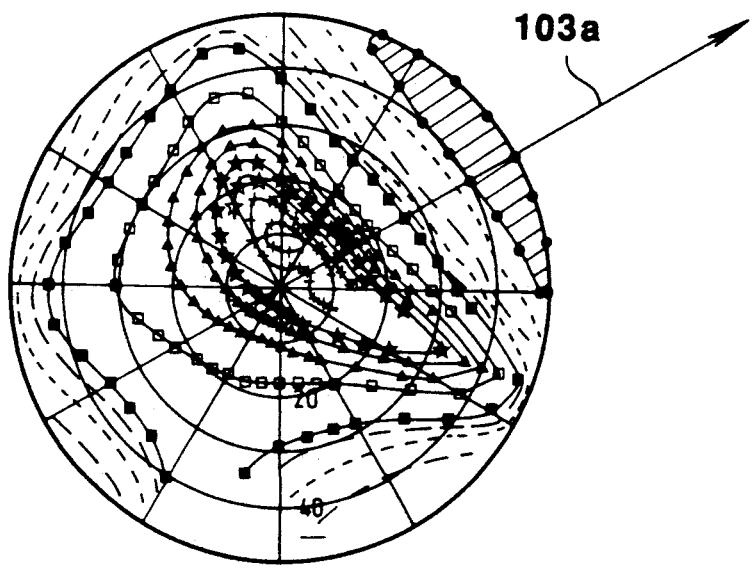
FIG. 34 is a view showing equi-contrast curves in the first arrangement having the characteristics shown in FIG. 31.
Figure 38:
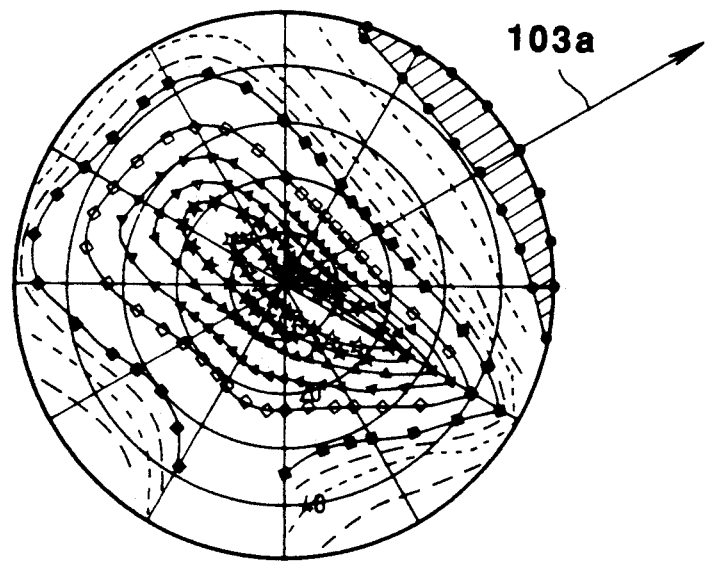
FIG. 38 is a view showing equi-contrast curves in the first arrangement having the characteristics shown in FIG. 35.

FIGS. 34 and 38 show equi contrast curves obtained when the liquid crystal display device is observed from different directions. Concentric circles in FIGS. 34 and 38 represent 10°, 20°, 30°, 40°, and 50° directions inclined from the direction of the normal to the substrates in the liquid crystal display device from the inner to the outer circles. A dot (●) represents a contrast of less than 1, i.e., represents that the bright and dark states are reversed. A black square (■) represents a contrast of 10, a hollow square (□) represents a contrast of 20, a black triangle (▲) represents a contrast of 30, a hollow triangle (△) represents a contrast of 40, a black star (★) represents a contrast of 50, a hollow star (☆) represents a contrast of 60, a cross (+) represents a contrast of 70, a mark x represents a contrast of 80, and a mark * represents a contrast of 90. As shown in FIGS. 34 and 38, the area having a contrast of 10 or more is large in this embodiment. The inverse area which appears at the upper right position of the liquid crystal display device and in which the bright and dark states are reversed is small. Therefore, view angle characteristics are improved.

In the second arrangement, the polarizer 110 is located so that its light-transmitting axis 110a is rotated through +140° (α) with respect to the incident-side direction 103a of aligning treatment. The analyzer 111 is located so that its light transmitting axis 111a intersects with the incident-side direction 103a of aligning treatment at an angle of 55° (ε).

The first and second retardation plates 112 and 113 are retardation plates whose Δn-d value is 370 nm (measurement wavelength: 589 nm). The first retardation plate 112 is located so that its phase delay axis 112a is inclined at an angle of about 40° (γ) with respect to the incident-side direction 103a of aligning treatment. The second retardation plate 113 is located so that its phase delay axis 113a is inclined at an angle of about 5° (δ) with respect to the incident-side direction 103a of aligning treatment.

The third retardation plate 114 is located between the second retardation plate 113 and the analyzer 111. The third retardation plate 114 is located so that its phase delay axis 114a is inclined at an angle of about 55° (β) with respect to the incident-side direction 103a of aligning treatment.

In the second arrangement, the phase delay axis 114a of the third retardation plate 114 may be set at about 145° with respect to the incident-side direction 103a of aligning treatment.

As described above, in the second arrangement, the pair of polarizing plates are located so that the light-transmitting axis of one polarizing plate intersects with the incident-side direction of aligning treatment at an angle of about 140°. At the same time, the light-transmitting axes of the pair of polarizing plates intersect with each other at an angle of about 85°. The first and second retardation plates are located between the pair of polarizing plates so that the phase delay axis of one plate intersects with the incident-side direction of aligning treatment at an angle of about 40°, and the phase delay axes of them intersect with each other at an angle of about 35°. In addition, the third retardation plate is located between the pair of polarizing plates and to be adjacent to one of the polarizing plates so that the phase delay axis of the third retardation plate is parallel or perpendicular to the light-transmitting axis of the adjacent polarizing plate.

Figure 39:
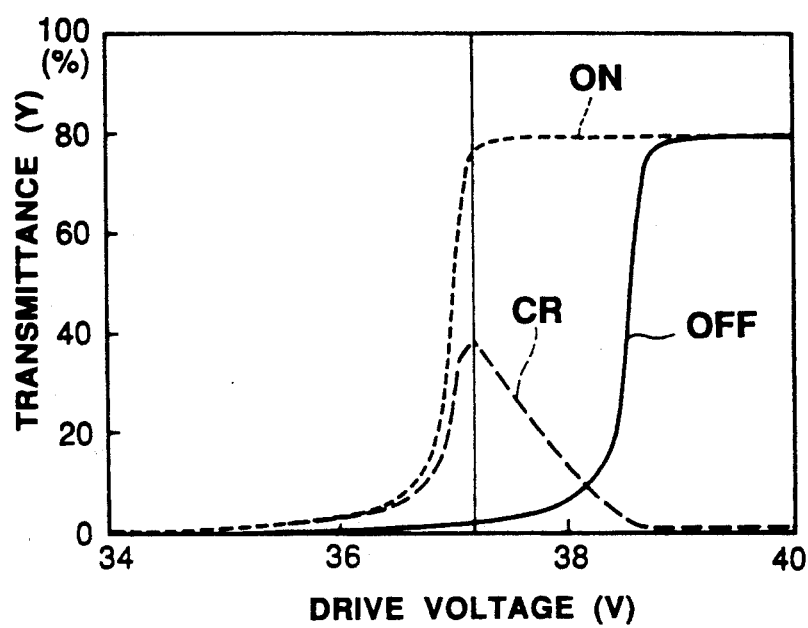
FIG. 39 is a graph showing Y-V characteristics of the second arrangement in the retardation plate layout of FIG. 31 when the direction of the phase delay axis of the third retardation plate is inclined in an almost 145° with respect to the direction of aligning treatment of the aligning film on the light incident-side substrate.
Figure 40:
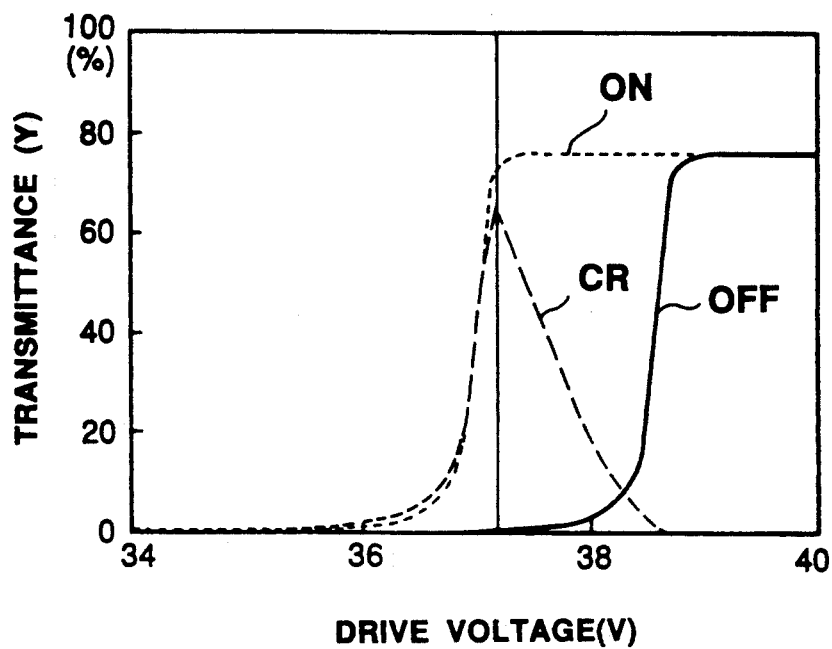
FIG. 40 is a graph showing Y-V characteristics of the third arrangement in the retardation pate layout of the third embodiment shown in FIG. 15 when the directions of the light transmitting axes of the polarizing plates and the directions of the phase delay axes of retardation plates are changed.

Measurement results of electro-optical characteristics of the liquid crystal display device described above are shown in FIGS. 39 and 40. FIGS. 39 and 40 represent Y-V characteristics representing relationship between transmittances (Y values) and drive voltages (V) upon driving of the liquid crystal display device in accordance with time-divisional driving at a 1/480 duty ratio and a 1/15 bias, and contrast obtained upon this driving. A solid line OFF represents a change in transmittance upon application of an OFF waveform, a dotted line ON represents a change in transmittance upon application of an ON waveform, and a broken line CR represents the contrast. As shown in FIG. 39, when the phase delay axis 114a of the third retardation plate 114 is inclined at an angle of 55° with respect to the incident-side direction 103a of aligning treatment, the contrast is as high as 63, and the transmittance is also as high as 72%. As shown in FIG. 40, when the phase delay axis 114a of the third retardation plate 114 is inclined at an angle of 140° with respect to the incident-side direction 103a of aligning treatment, the contrast is relatively low, 39, but the transmittance is as high as 72%. In the second arrangement, even if the view point is changed, the area having a high contrast is large, and changes in display colors are minimized.

As described above, in the second arrangement, the transmittance on the front surface of the liquid crystal display device is very high, and the contrast levels are high in all observation directions. In addition, changes in hues of transmitted light components at different view point can be reduced, and the view angle characteristics are improved.

In the third arrangement of the third embodiment shown in FIG. 15 in which the three retardation plates are located on the light exit side of the liquid crystal cell, electro-optical characteristics upon changes in directions of phase delay axes of the respective retardation plates and directions of light-transmitting axes of the pair of polarizing plates are measured.

In the third arrangement, the polarizer 110 is located so that its light-transmitting axis 110a is rotated through +140° (α) with respect to the incident-side direction 103a of aligning treatment. The analyzer 111 is located so that its light transmitting axis 111a 10 intersects with the incident-side direction 103a of aligning treatment at an angle of 55° (ε).

The first and second retardation plates 112 and 113 are retardation plates obtained by monoaxially stretching polycarbonate and having a Δn-d value of 370 nm measurement wavelength: 589 nm). The first retardation plate 112 is located so that its phase delay axis 112a is inclined at an angle of about 40° (γ) with respect to the incident-side direction 103a of aligning treatment. The second retardation plate 113 is located so that its phase delay axis 113a is inclined at an angle of about 5° (δ) with respect to the incident-side direction 103a of aligning treatment.

The third retardation plate 114 is located so that its phase delay axis 114a is inclined at an angle of about 50° (β) with respect to the incident-side direction 103a of aligning treatment.

In the third arrangement, the phase delay axis 114a may be located to be parallel to a direction of about 140° - with respect to the incident-side direction 103a of aligning treatment.

As described above, in the third arrangement, the pair of polarizing plates are located so that the light-transmitting axis of one polarizing plate intersects with the incident-side direction of aligning treatment at angle of about 140°. At the same time, the light-transmitting axes of the pair of polarizing plates intersect with each other at an angle of about 85°. The first and second retardation plates are located between the pair of polarizing plates so that the phase delay axis of one plate intersects with the incident-side direction of aligning treatment at an angle of about 40°, and the phase delay axes of the respective plates intersect with each other at an angle of about 35°. In addition, the third retardation plate is located between the pair of polarizing plates to be adjacent to one of the polarizing plates so that the phase delay axis of the third retardation plate is parallel or perpendicular to the light-transmitting axis of the adjacent polarizing plate.

Measurement results of electro-optical characteristics of the liquid crystal display device described above are shown in FIGS. 41 to 49. FIGS. 41 to 48B show electro-optical characteristics of the liquid crystal display device of the third arrangement.

Figure 41:
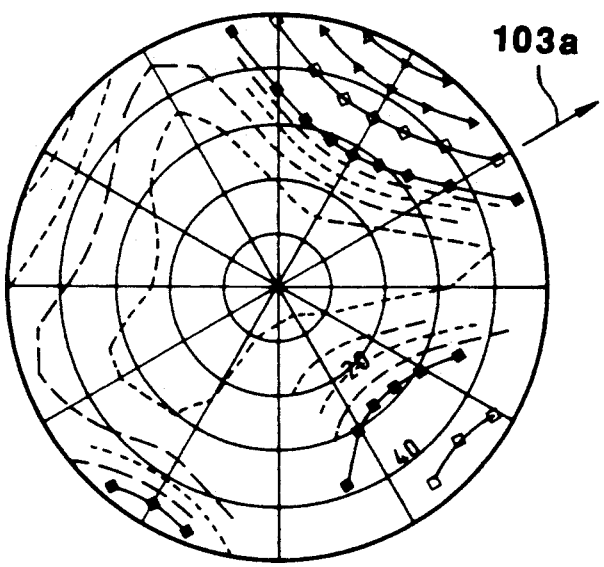
FIG. 41 is a view showing equi-brightness curves in a light-shielding state in the third arrangement having the characteristics shown in FIG. 40.
Figure 42:
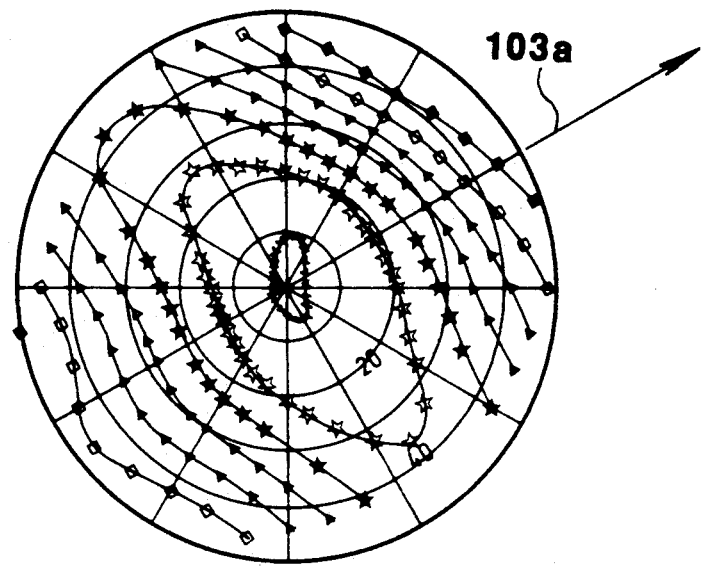
FIG. 42 is a view showing equi-brightness curves in a light-transmitting state in the third arrangement having the characteristics shown in FIG. 40.
Figure 43:
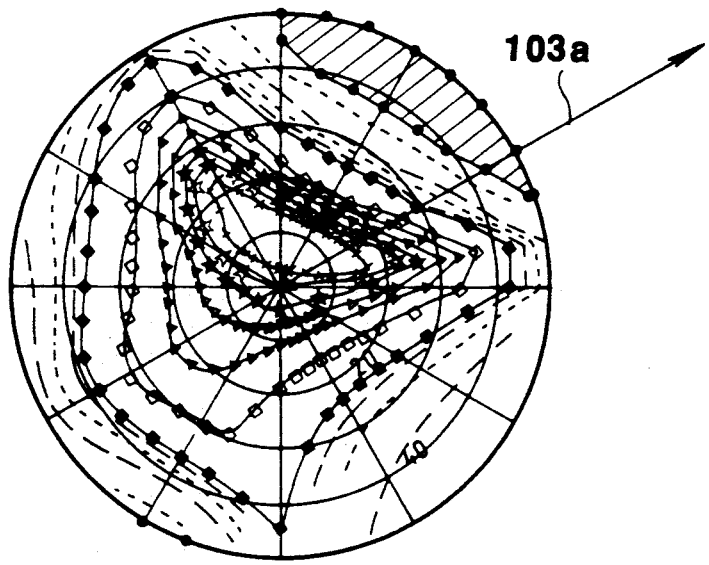
FIG. 43 is a view showing equi-contrast curves in the third arrangement having the characteristics shown in FIG. 40.

FIG. 41 represents Y-V characteristics representing a relationship between transmittances (Y values) and drive voltages (V) upon driving of the liquid crystal display device in accordance with time-divisional driving at a 1/480 duty ratio and a 1/15 bias, and contrast values obtained upon this driving. A solid line OFF represents a change in transmittance upon application of an OFF waveform, a dotted line ON represents a change in transmittance upon application of an ON waveform, and a broken line CR represents the contrast. As shown in FIG. 41, in the third arrangement, the contrast is as high as 66, and the transmittance is also as high as 73%. FIGS. 42 and 43 show equi-brightness curves obtained when the liquid crystal cell is observed from different directions inclined with respect to the direction of the normal to the liquid crystal cell. FIG. 42 shows a case in a dark state, and FIG. 43 shows a case in a bright state.

As shown in FIGS. 42 and 43, in the third arrangement, the area having a transmittance of less than 10% is large in a dark state. In a bright state, the area having a transmittance of 10% or more is large.

Figure 44B:
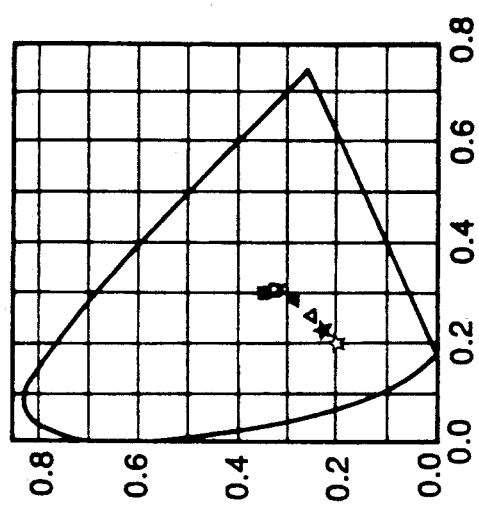
FIGS. 44A and 44B are a graph showing voltage-transmittance characteristics representing visual sense characteristics at the left position in the liquid crystal cell in the retardation plate layout of the third arrangement shown in FIG. 40, and a CIE chromaticity diagram showing the corresponding display colors.
Figure 44A:
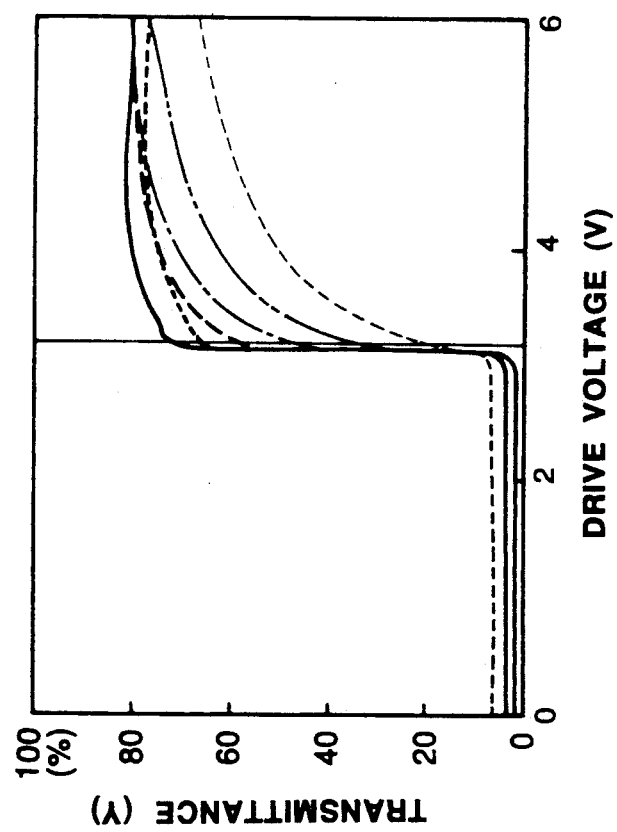

FIG. 44 shows equi-contrast curves obtained when the liquid crystal display device is observed from different directions.

As shown in FIG. 44, in the third arrangement, the area having a contrast of 10 or more is large, and the reverse area which appears at the upper right portion in the liquid crystal display device and in which the bright and dark states are reversed is small. Therefore, the view angle characteristics are improved.

Figure 45B:
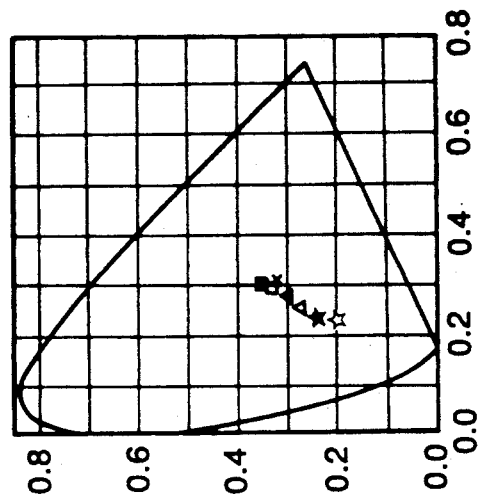
FIGS. 45A and 45B are a graph showing voltage-transmittance characteristics representing visual sense characteristics at the right position in the liquid crystal cell in the retardation plate layout of the third arrangement shown in FIG. 40, and a CIE chromaticity diagram showing the corresponding display colors.
Figure 45A:
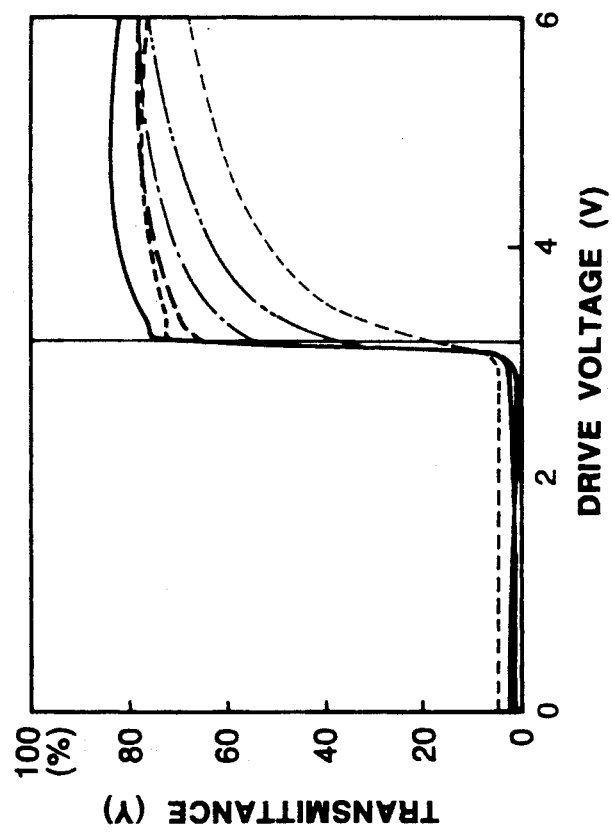
Figure 46B:
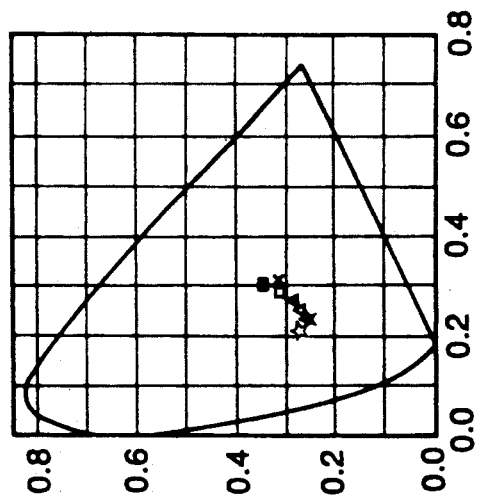
FIGS. 46A and 46B are a graph showing voltage-transmittance characteristics representing visual sense characteristics at the upper position in the liquid crystal cell in the retardation plate layout of the third arrangement shown in FIG. 40, and a CIE chromaticity diagram showing the corresponding display colors.
Figure 46A:
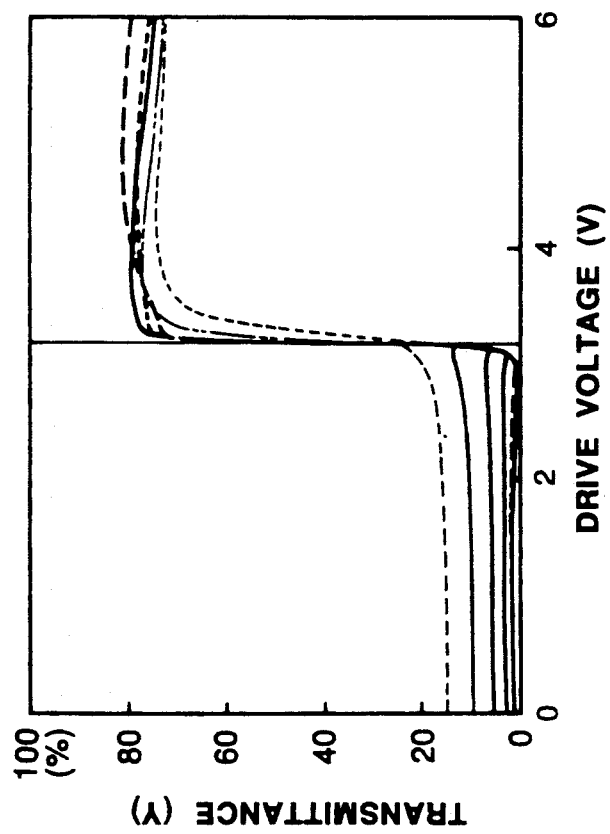
Figures 47A, 47B:
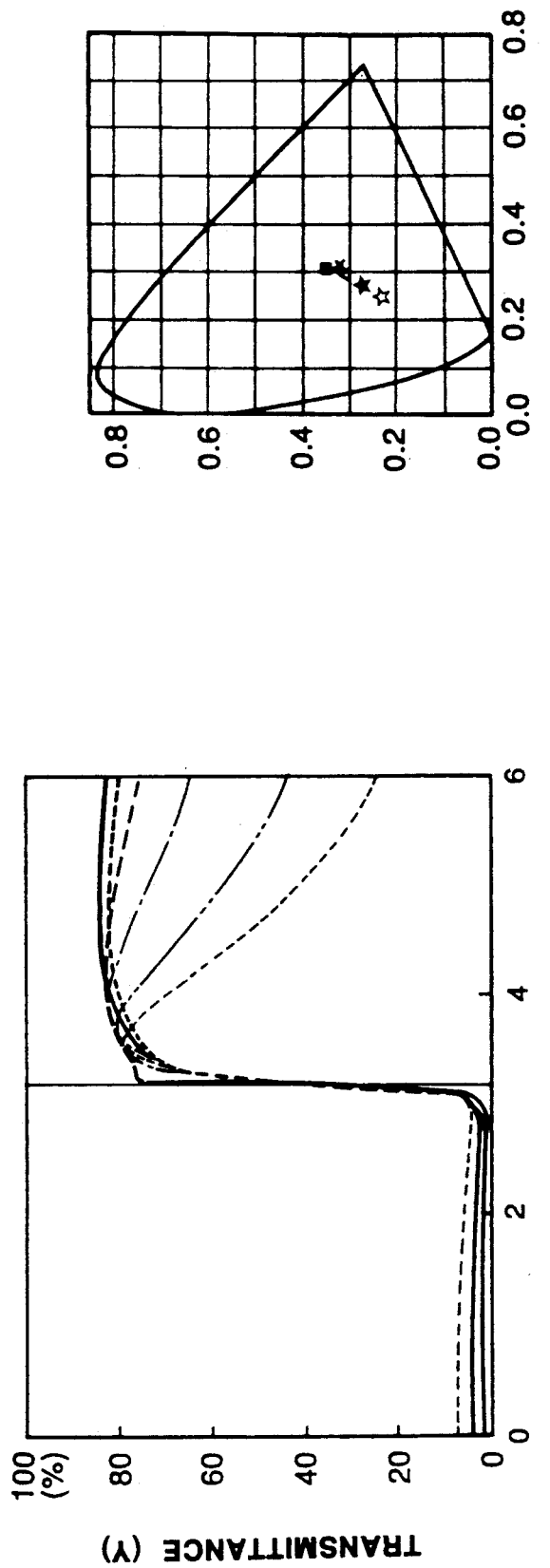
FIGS. 47A and 47B are a graph showing voltage-transmittance characteristics representing visual sense characteristics at the lower position in the liquid crystal cell in the retardation plate layout of the third arrangement shown in FIG. 40, and a CIE chromaticity diagram showing the corresponding display colors.
Figure 48:
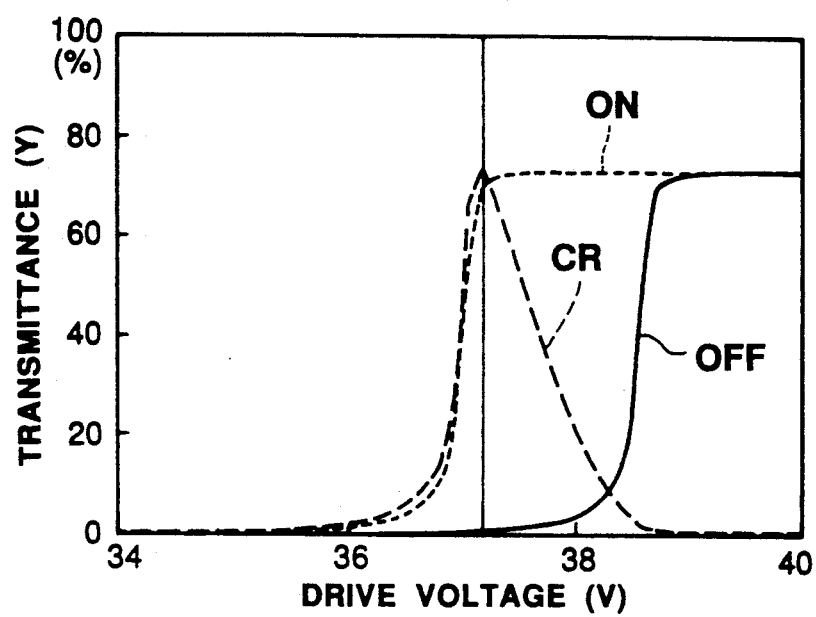
FIG. 48 is a graph showing Y-V characteristics in the third embodiment shown in FIG. 15 when the direction of the phase delay axis of the third retardation plate is changed.

FIGS. 45A and 45B, FIGS. 46A and 46B, FIGS. 47A and 47B, and FIGS. 48A and 48B are CIE chromaticity diagrams showing voltage-transmittance characteristics representing changes in transmittance as a function of the voltage applied when a view direction is changed in units of 10° from the normal to the liquid crystal display device, and changes in display colors upon application of the voltage. More specifically, FIGS. 45A and 45B show the voltage transmittance characteristics obtained when the view direction is changed in units of 10° with respect to the normal to the liquid crystal cell in the left direction, i.e., the +150° direction with respect to the incident side direction 103a of aligning treatment, and the CIE chromaticity diagrams representing the changes in display colors. FIGS. 46A and 46B show the voltage-transmittance characteristics obtained when the view direction is changed in units of 10° with respect to the normal to the liquid crystal cell in the right direction, i.e., the +330° direction with respect to the incident-side direction 103a of aligning treatment, and the CIE chromaticity diagrams representing the changes in display colors. FIGS. 47A and 47B show the voltage-transmittance characteristics obtained when the view direction is changed in units of 10° with respect to the normal to the liquid crystal cell in the upper direction, i.e., the +60° direction with respect to the incident-side direction 103a of aligning treatment, and the CIE chromaticity diagrams representing the changes in display colors. FIGS. 48A and 48B show the voltage-transmittance characteristics obtained when the view direction is changed in units of 10° with respect to the normal to the liquid crystal cell in the lower direction, i.e., the +240° direction with respect to the incident-side direction 103a of aligning treatment, and the CIE chromaticity diagrams representing the changes in display colors. A black square (■) and a solid line represent the data obtained when the view direction is the norma to the liquid crystal cell, a hollow square (□) and a dotted line represent the data obtained when the view direction is at 10° to the direction of the normal to the liquid crystal cell, a blank triangle (▲) and a broken line represent the data obtained when the direction inclines by 20° from the direction of the normal to the liquid crystal cell, a hollow triangle (△) and the alternate long and short dashed line represent data obtained when the view direction is at 30° to the direction of the normal to the liquid crystal cell, a black star (★) and the alternate long and two short dashed line represent the data obtained when the view direction is 40° at the direction of the normal to the liquid crystal cell, and a hollow star (☆) and a thin dotted line represent the data obtained when the view direction is at 50° to the direction of the normal to the liquid crystal cell.

As is apparent from the above drawings, steep voltage-transmittance characteristic curves are obtained.

Figure 49:
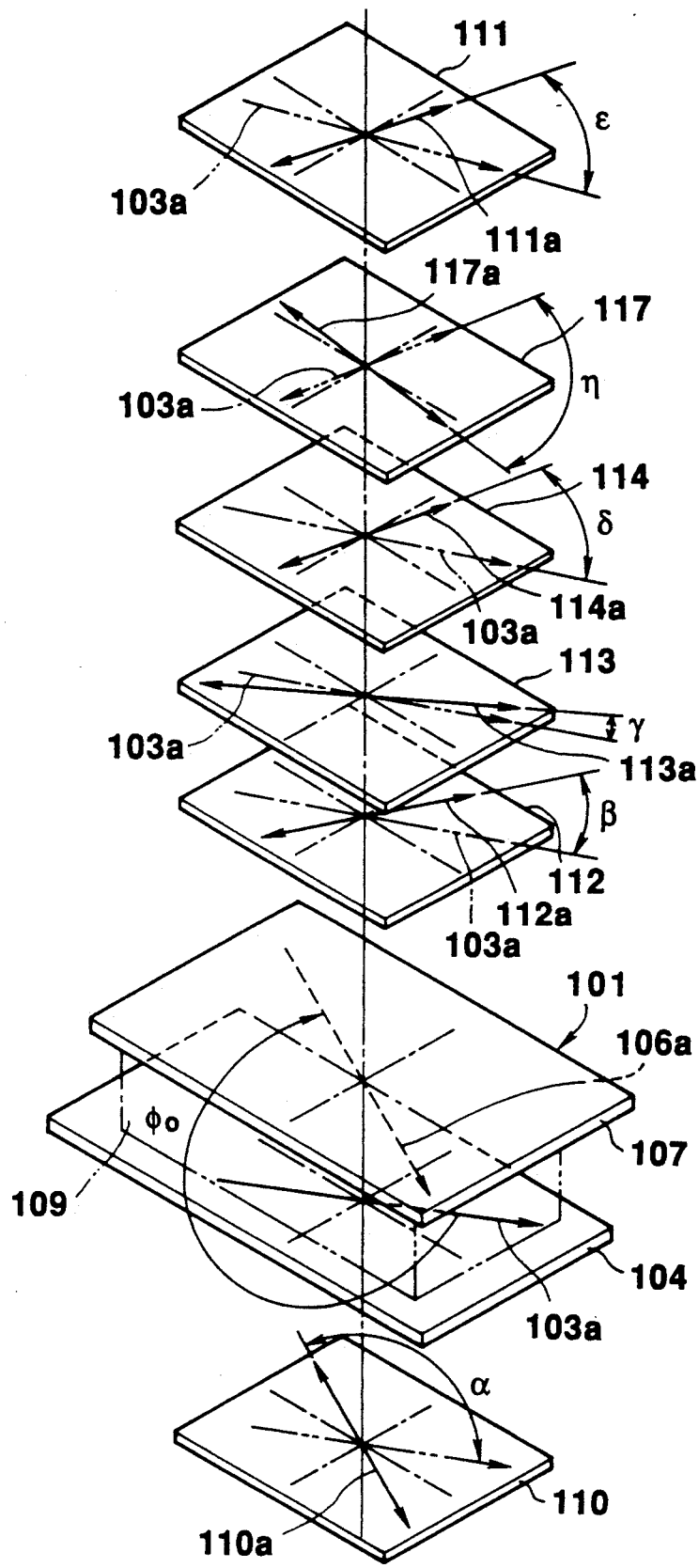
FIG. 49 is an exploded perspective view showing a schematic arrangement of the fifth embodiment of the present invention.

FIG. 49 shows Y-V characteristics representing changes in transmittance as a function of the drive voltage of time divisional driving when the phase delay axis 114a of the third retardation plate 114 is inclined at an angle of 140° with respect to the incident-side direction 103a of aligning treatment. In this case, the transmittance in the bright state is high, and the contrast is also high.

Fifth Embodiment

The fifth embodiment exemplifies an arrangement in which a pair of retardation plates whose phase delay axes are almost perpendicular to each other and two additional retardation pates are located between a polarizer and an analyzer in an STN type liquid crystal display device to correct the display colors and improve the view angle characteristics. The same reference numerals as in the third embodiment denote the same parts in the fifth embodiment.

Figure 50:
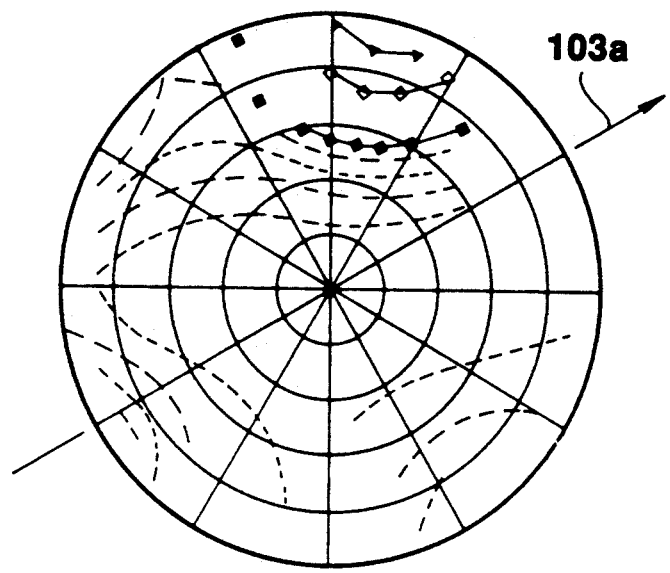
FIG. 50 is a view showing equi-brightness curves in a light-shielding state in the fifth embodiment shown in FIG. 49.

Referring to FIG. 50, a polarizer 110 and an analyzer 111 are respectively arranged on the two sides of a liquid crystal cell 101. First, second, third, and fourth retardation plates 112, 113, 114, and 117 are located between the light exit side substrate of the liquid crystal cell 101 and the analyzer 111.

The polarizer 110 is located so that its light-transmitting axis 110a is rotated through +140° ($\alpha$) counterclockwise with respect to an incident-side direction 103a of aligning treatment. The analyzer 111 is located so that its light-transmitting axis 111a is at 55° ($\epsilon$) to the incident-side direction 103a of aligning treatment.

The first, second, third, and fourth retardation plates 112, 113, 114, and 117 comprise retardation plates obtained by monoaxially stretching polycarbonate. The $\Delta n \cdot d$ value of each of the first and second retardation plates is set to be 400 nm (measurement wavelength: 589 nm), and the $\Delta n \cdot d$ of each of the third and fourth retardation plates is set to be 350 nm to 450 nm (measurement wavelength: 589 nm).

The first retardation plate 112 is located so that its phase delay axis 112a is inclined at an angle of about 40° ($\beta$) with respect to the incident-side direction 103a of aligning treatment. The second retardation plate 113 is located so that its phase delay axis 113a is inclined at an angle of about 5° ($\gamma$) with respect to the incident-side direction 103a of aligning treatment. The third retardation plate 114 is located so that its phase delay axis 114a is inclined at an angle of about 60° ($\delta$) with respect to the incident-side direction 103a of aligning treatment. The fourth retardation plate 117 is located so that its phase delay axis 117a is inclined at an angle of about 150° (η) with respect to the incident-side direction 103a of aligning treatment.

In this embodiment, the directions of the phase delay axes 114a and 117a of the third and fourth retardation plates 114 and 117 may be changed. For example, the phase delay axis 114a of the third retardation plate 114 may be inclined at an angle of 150° with respect to the incident-side direction 103a of aligning treatment, and the phase delay axis 117a of the fourth retardation plate 117 may be inclined at an angle of about 60° with respect to the incident-side direction 103a of aligning treatment.

Differences in amounts of phase shifts of light components having different wavelengths caused when the light components pass through the liquid crystal cell can be almost corrected since the four retardation plates are used, thereby eliminating coloring of the display colors. In addition, since the phase delay axes of the third and fourth retardation plates are almost perpendicular to each other, the differences in phase shifts at different view angles can be canceled by the two pairs of retardation plates, thereby improving the view angle characteristics.

Figure 51:
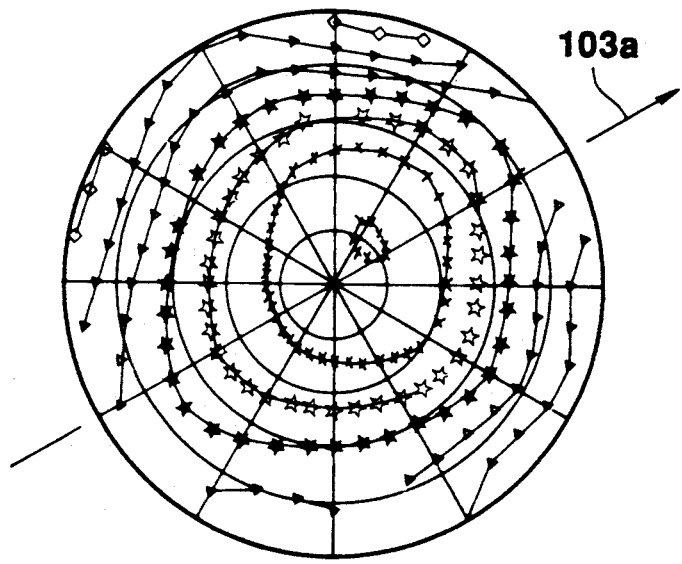
FIG. 51 is a view showing equi-brightness curves in a light-transmitting state in the fifth embodiment shown in FIG. 49.
Figure 52:
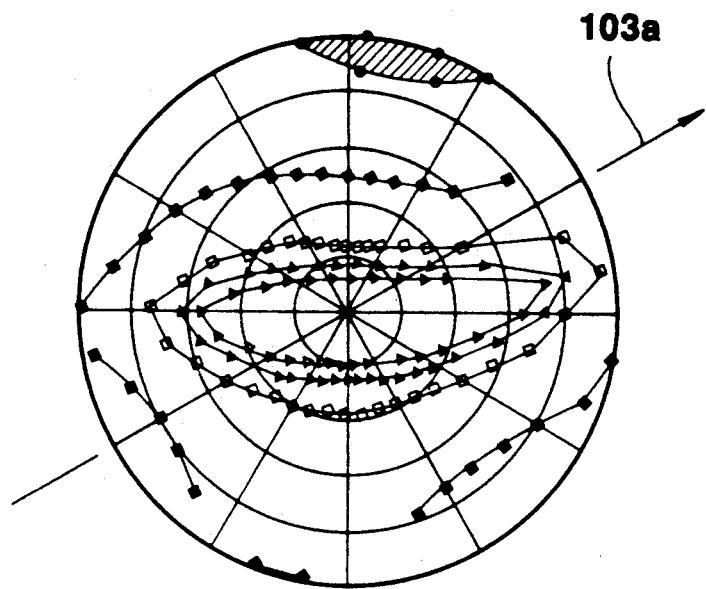
FIG. 52 is a view showing equi-contrast curves in the fifth embodiment shown in FIG. 49.
Figure 53:
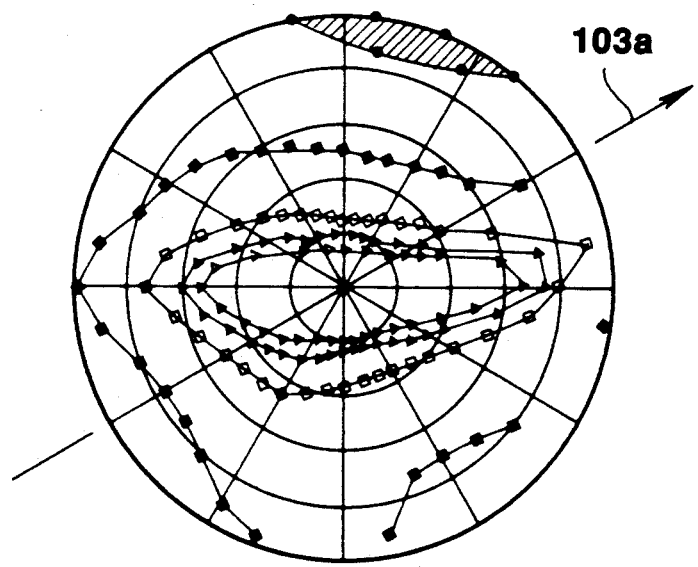
FIG. 53 is a view showing equi-contrast curves in the fifth embodiment shown in FIG. 49 when the directions of the phase delay axes of the third and fourth retardation plates are changed.

A transmittance distribution in an OFF state is shown in FIG. 51, a transmittance distribution in an ON state is shown in FIG. 52, and equi-contrast curves are shown in FIG. 53. As shown in FIG. 51, in the OFF state, leakage of light from the front surface of the liquid crystal display device is small. As shown in FIG. 52, transmittances in the ON state are large in all directions. In addition, as shown in FIG. 53, the area having a contrast of 10 or more is increased, and the inverse area which appears in the upper portion of the liquid crystal display device is reduced. At the same time, the reverse area in the lower right portion of the liquid crystal display device disappears. According to this embodiment, the view angle is increased.

As shown in the fifth embodiment, when four retardation plates are used, the polarizer 110, the analyzer 111, and the four retardation plates 112, 113, 114, and 117 are preferably located as follows. With reference to the incident-side direction 103a of aligning treatment, an angle c of the light-transmitting axis 110a of the polarizer 110 falls within the range of 135° to 145°; an angle ε of the light-transmitting axis 111a of the analyzer 111 falls within the range of 50° to 60°; an angle β of the phase delay axis 112a of the first retardation plate 112 falls within the range of 35° to 45°; an angle γ of the phase delay axis 113a of the second retardation plate 113 falls within the range of 0° to 10°; and an angle k of the phase delay axis 114a of the third retardation plate 114 falls within the range of 55° to 65° or 145° to 155°. Alternatively, the phase advance axis normal to the phase delay axis 114a may be set at 55° to 65° or 145° to 155° to the incident-side direction 103a of aligning treatment. An angle η of the phase delay axis 117a of the fourth retardation plate 117 is set to be about 90° with respect to the phase delay axis 114a of the third retardation plate 114. In addition, in the fifth embodiment, the Δn·d value of the liquid crystal cell 101 preferably falls within the range of 825 nm to 875 nm. When the Δn·d values of the first and second retardation plates 112 and 113 are the same and fall within the range of 375 to 425 nm and the Δn·d values of the third and fourth retardation plates 114 and 117 are the same and fall within the range of 300 nm to 450 nm, almost equal characteristics can be obtained. Therefore, the Δn·d values of these retardation plates preferably fall within the above ranges.

Figure 54:
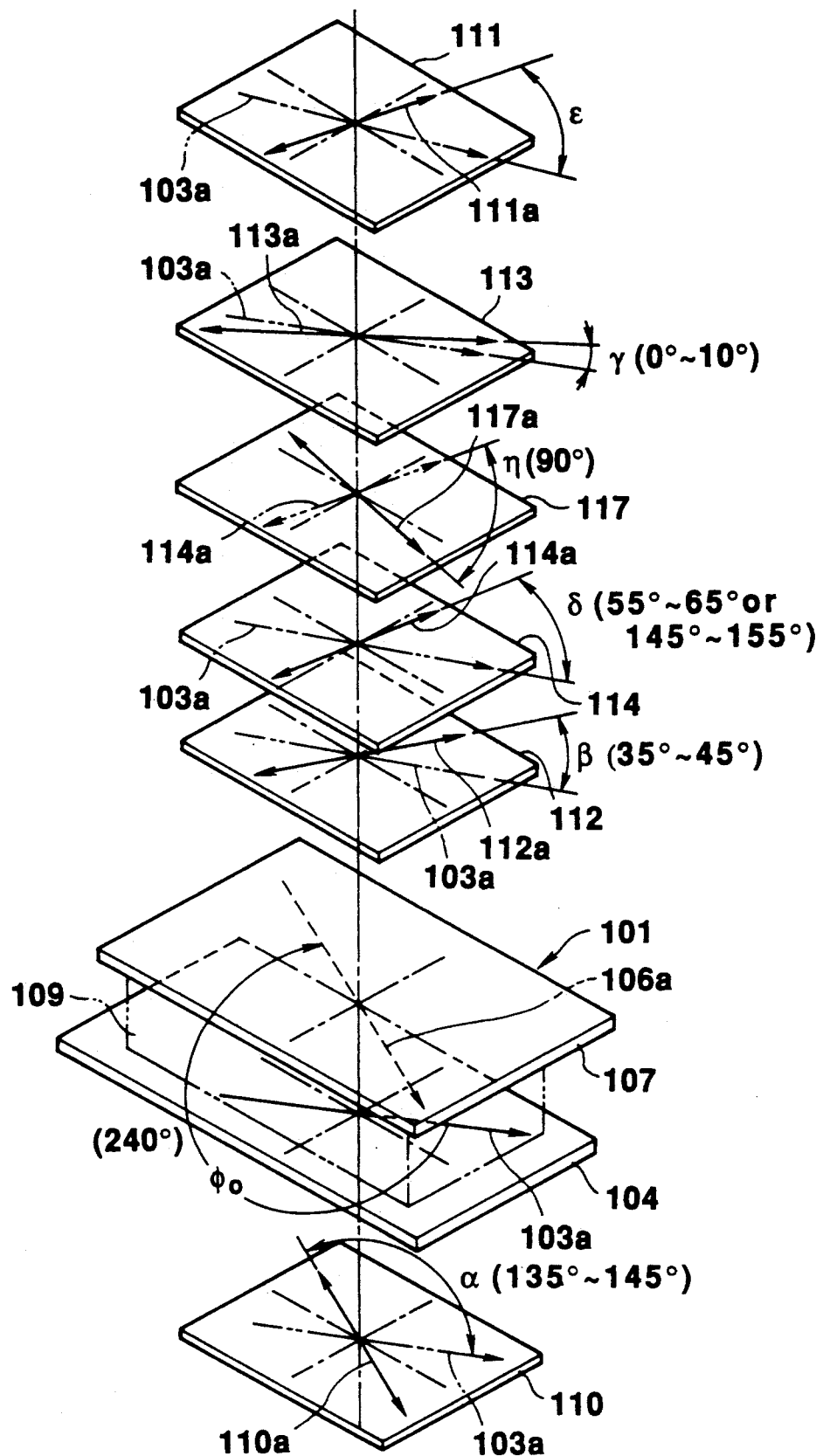
FIG. 54 is an exploded perspective view showing a schematic arrangement of the sixth embodiment of the present invention.

FIGS. 54A and 54B show equi-contrast curves when each of the Δn·d values of the four retardation plates 112, 113, 114, and 117 is set to be 400 nm. FIG. 54A shows a case in which the angle δ of the phase delay axis 114a of the third retardation plate 114 is set to be 60°, and the angle η of the phase delay axis 117a of the fourth retardation plate 117 is set to be 150°. FIG. 54B shows a case in which the angle δ of the phase delay axis 114a of the third retardation plate 114 is set to be 150°, and the angle η of the phase delay axis 117a of the fourth retardation plate 117 is set to be 60°.

As shown in FIGS. 54A and 54B, the area having a contrast of 10 or more is increased, and the reverse area which appears in the upper portion of the liquid crystal display device is reduced. Therefore, the Δn·d values of all the first to fourth retardation plates 112 to 117 can be equal to each other. In this case, if each Δn·d value is set to be 400 nm, identical retardation plates can be used to obtain a manufacturing advantage.

Sixth Embodiment

The sixth embodiment obtained when the layout of the third and fourth retardation plates in the fifth embodiment is changed will be described below. The same reference numerals as in the fifth embodiment denote the same parts in the sixth embodiment.

Figure 55A:
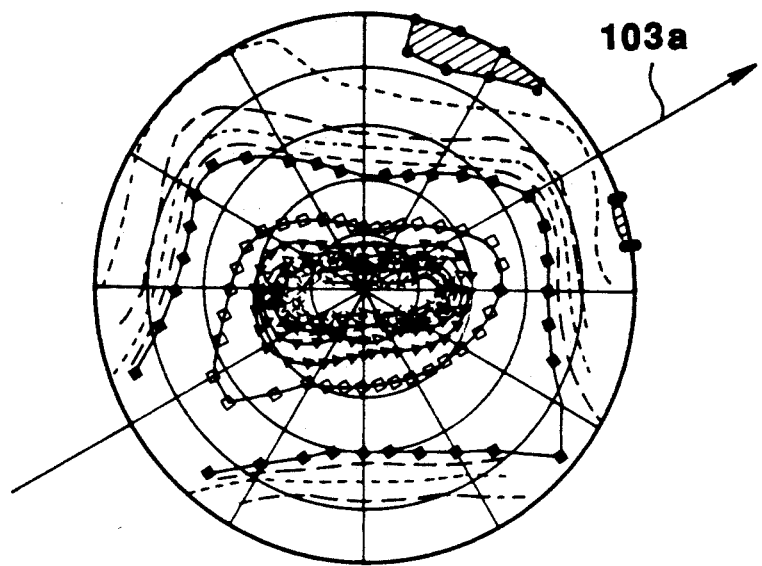
FIGS. 55A and 55B are views showing equi-contrast curves in the sixth embodiment shown in FIG. 54 when the directions of the phase delay axes of the third and fourth retardation plates are changed.
Figure 55B:
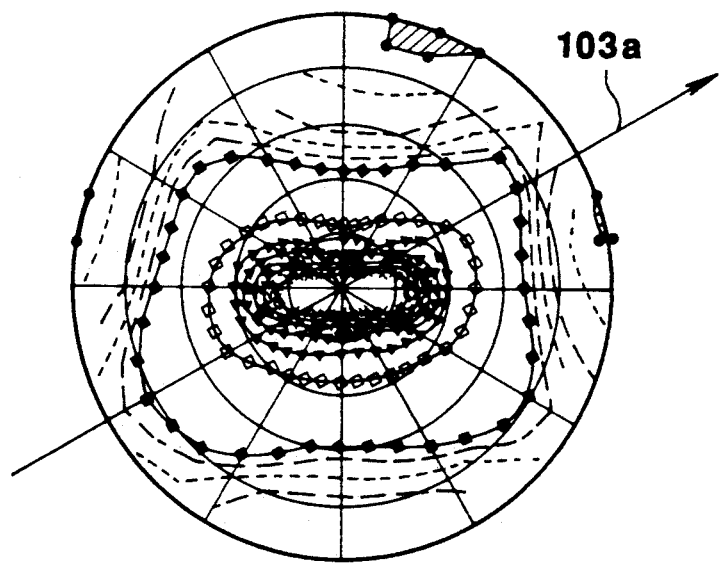

Referring to FIG. 55, a liquid crystal cell 101 is formed as in the liquid crystal cell of the third embodiment. A polarizer 110 comprising a linearly polarizing plate is located outside or below an incident-side substrate 104 of this liquid crystal cell 101. An analyzer 111 similarly comprising a linearly polarizing plate is located above an exit-side substrate 107 of the cell 101. First and second retardation plates 112 and 113 are located between the exit-side substrate 107 of the liquid crystal cell 101 and the analyzer 111, and third and fourth retardation plates 114 and 117 are located between the first and second retardation plates 112 and 113.

The polarizer 110 is located so that its light-transmitting axis 110a is rotated through +140° (α) counterclockwise with respect to an incident-side direction 103a of aligning treatment. The analyzer 111 is located so that its light-transmitting axis 111a intersects with the incident-side direction 103a of aligning treatment at an angle of 55° (ε).

The first, second, third, and fourth retardation plates 112, 113, 114, and 117 comprise retardation plates obtained by monoaxially stretching polycarbonate. The Δn·d value of each of the first and second retardation plates 112 and 113 is set to be 400 nm (measurement wavelength: 589 nm), and the Δn·d of each of the third and fourth retardation plates 114 and 117 is set to be 350 nm to 450 nm (measurement wavelength: 589 nm).

The first retardation plate 112 is located so that its phase delay axis 112a is inclined at an angle of about 40° (β) with respect to the incident-side direction 103a of aligning treatment. The second retardation plate 113 is located so that its phase delay axis 113a is inclined at an angle of about 5° (γ) with respect to the incident-side direction 103a of aligning treatment. The third retardation plate 11 arranged between the first and second retardation plates 112 and 113 is located so that its phase delay axis 114a is inclined at an angle of about 60° (δ) with respect to the incident-side direction 103a of aligning treatment. The fourth retardation plate 117 is located so that its phase delay axis 117a is inclined at an angle of about 150° (90° with respect to the phase delay axis 114a of the third retardation plate 114 in FIG. 55) (η) with respect to the incident-side direction 103a of aligning treatment.

In the sixth embodiment, the phase delay axes 114a and 117a of the third and fourth retardation plates 114 and 117 may also be changed. For example, the phase delay axis 114a of the third retardation plate 114 may be inclined at an angle of 150° (δ) with respect to the incident-side direction 103a of aligning treatment, and the phase delay axis 117a of the fourth retardation plate 117 may be inclined at an angle of about 60° (η) with respect to the incident-side direction 103a of aligning treatment.

In the sixth embodiment, differences in phase shifts of light components having different wavelengths upon passing of the light components through the liquid crystal cell can be almost corrected since the four retardation plates are used, thereby eliminating coloring of the display colors. In addition, since the phase delay axes 114a and 117a of the third and fourth retardation plates 114 and 117 are almost perpendicular to each other, the differences in phase shifts at different view points can be canceled by these retardation plates, thereby improving the view angle characteristics.

Figure 56:
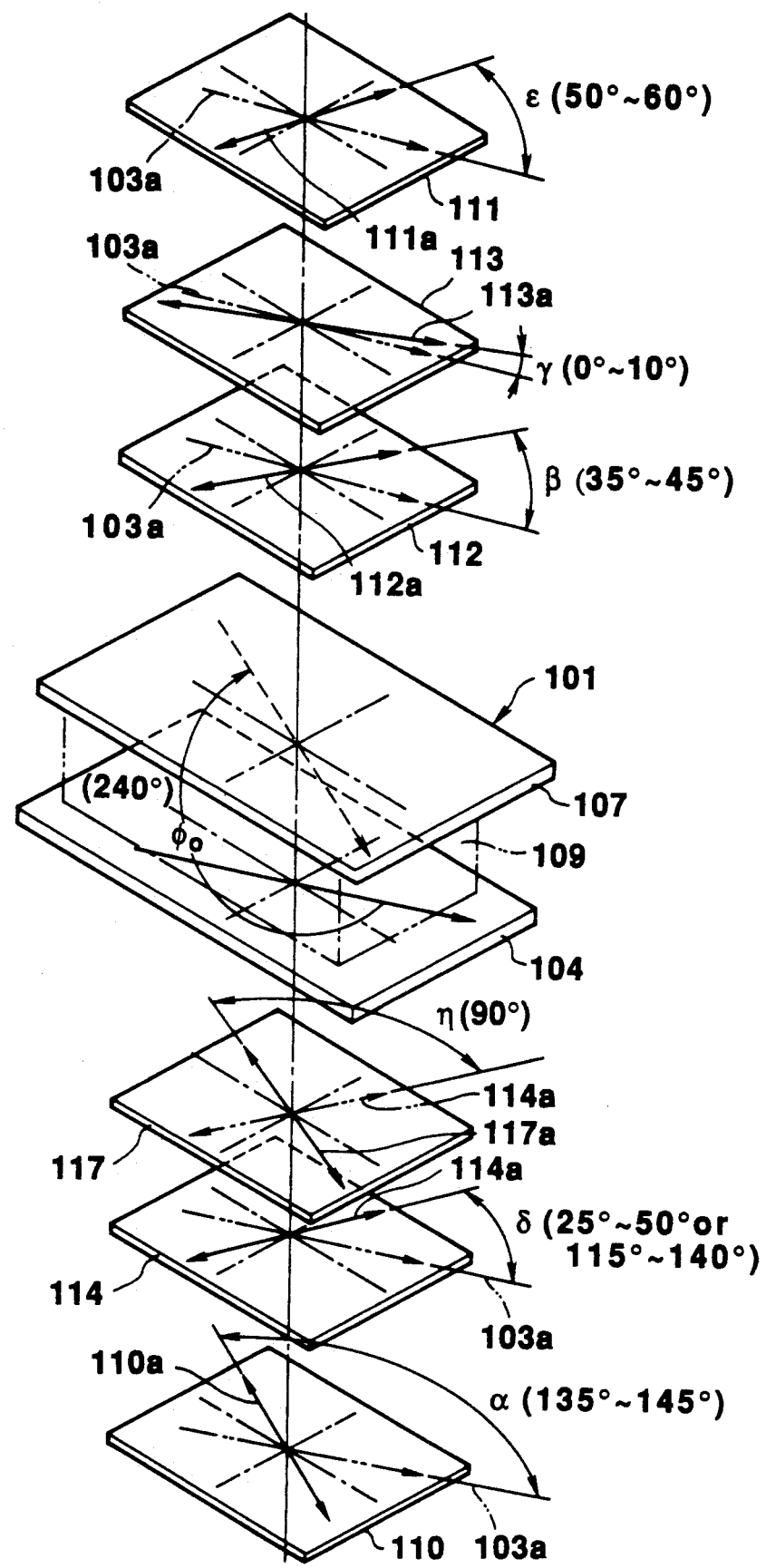
FIG. 56 is an exploded perspective view showing a schematic arrangement of the seventh embodiment of the present invention.

FIGS. 56A and 56B show equi-contrast curves. FIG. 56A shows a case in which the angle δ of the phase delay axis 114a of the third retardation plate 114 is set to be 60° and the angle η of the phase delay axis 117a of the fourth retardation plate 117 is set to be 150° FIG. 56B shows a case in which the angle δ of the phase delay axis 114a of the third retardation plate 114 is set to be 150° and the angle 0 of the phase delay axis 117a of the fourth retardation plate 117 is set to be 60°. As shown in FIGS. 56A and 56B, the area having a contrast of 10 or more is increased, and the reverse area which appears in the upper portion of the liquid crystal display device is reduced.

Seventh Embodiment

The seventh embodiment of the present invention will be described with reference to FIG. 57 and FIGS. 58A to 58D. The same reference numerals as in the fifth embodiment denote the same parts in the seventh embodiment.

Referring to FIG. 57, a liquid crystal cell 101 is formed as in the liquid crystal cell of the fifth embodiment. A polarizer 110 comprising a linearly polarizing plate is located outside or below an incident-side substrate 104 of this liquid crystal cell 101. An analyzer 111 similarly comprising a linearly polarizing plate is located above an exit-side substrate 107 of the cell 101. First and second retardation plates 112 and 113 are located between the exit-side substrate 107 and the analyzer 111, and third and fourth retardation plates 114 and 117 ar located between the incident-side substrate 104 and the polarizer 110.

The polarizer 110 is located so that its light-transmitting axis 110a is rotated through +140° (α) counterclockwise with respect to an incident-side direction 103a of aligning treatment. The analyzer 111 is located so that its light transmitting axis 111a intersects with the incident-side direction 103a of aligning treatment at an angle of 55° (ε).

The first, second, third, and fourth retardation plates 112, 113, 114, and 117 comprise retardation plates obtained by monoaxially stretching polycarbonate. The Δn·d value of each of the first and second retardation plates 112 and 113 is set to be 400 nm (measurement wavelength: 589 nm), and the Δn·d of each of the third and fourth retardation plates 114 and 117 is set to be 350 nm to 450 nm (measurement wavelength: 589 nm).

The first retardation plate 112 is located so that its phase delay axis 112a is inclined at an angle of about 40° (β) with respect to the incident-side direction 103a of aligning treatment. The second retardation plate 113 is located so that its phase delay axis 113a is inclined at an angle of about 5° (γ) with respect to the incident side direction 103a of aligning treatment. The third retardation plate 114 is located so that its phase delay axis 114a is inclined at an angle of about 30° (δ) with respect to the incident-side direction 103a of aligning treatment. The fourth retardation plate 117 is located so that its phase delay axis 117a is inclined at an angle of about 120° (90° with respect to the phase delay axis 114a of the third retardation plate 114 in 15 FIG. 57) (0) with respect to the incident-side direction 103a of aligning treatment.

In the seventh embodiment, the phase delay axes 114a and 117a of the third and fourth retardation plates 114 and 117 may also be changed. For example, the phase delay axis 114a of the third retardation plate 114 may be inclined at an angle of 120° (δ) with respect to the incident-side direction 103a of aligning treatment, and the phase delay axis 117a of the fourth retardation plate 117 may be inclined at an angle of about 30° (η) with respect to the incident-side direction 103a of aligning treatment. Alternatively, the phase delay axis 114a of the third retardation plate 114 may be inclined at an angle of about 45° (δ) with respect to the incident-side direction 103a of aligning treatment and the phase delay axis 117a of the fourth retardation plate 117 may be inclined at an angle of about 135° (η) with respect to the incident-side direction 103a of aligning treatment; or the phase delay axis 114a of the third retardation plate 114 may be inclined at an angle of about 135° (δ) with respect to the incident-side direction 103a of aligning treatment and the phase delay axis 117a of the fourth retardation plate 117 may be inclined at an angle of about 45° (0) with respect to the incident side direction 103a of aligning treatment. Alternatively, the phase advance axis normal to the phase delay axis 114a of the third retardation plate 114 may be set at about 135° to the incident-side direction 103a of aligning treatment and the phase advance axis normal to the phase delay axis 117a of the fourth retardation plate 117 may be set at about 45°, to the incident-side direction 103a of aligning treatment.

In the seventh embodiment, differences in phase shifts of light components having different wavelengths upon passing of the light components through the liquid crystal cell can be almost corrected since the four retardation plates are used, thereby eliminating coloring of the display colors. In addition, since the phase delay axes 114a and 117a of the third and fourth retardation plates 114 and 117 are almost perpendicular to each other, the differences in phase shifts at different view angles can be canceled by these retardation plates, thereby improving the view angle characteristics.

As shown in the seventh embodiment, when four retardation plates are used, the polarizer 110, the analyzer 111, and the four retardation plates 112, 113, 114, and 117 are preferably located as follows. With 10 reference to the incident-side direction 103a of aligning treatment, an angle u of the light-transmitting axis 110a of the polarizer 110 falls within the range of 135° to 145°; an angle z of the light-transmitting axis 111a of the analyzer 111 falls within the range of 50° to 60°; an angle of the phase delay axis 112a of the first retardation plate 112 falls within the range of 35° to −45°; an angle Y of the phase delay axis 113a of the second retardation plate 113 falls within the range of 0° to 10°; and an angle δ of the phase delay axis 114a of the third retardation plate 114 falls within the range of 25° to 50° or 115° to 140°. An angle 0 of the phase delay axis 117a of the fourth retardation plate 117 is set to be about 90° with respect to the phase delay axis 114a of the third retardation plate 114. In addition, in the seventh embodiment, the Δn·d value of the liquid crystal cell 101 preferably falls within the range of 825 nm to 875 nm. When the Δn·d values of the first and second retardation plates 112 and 113 are the same and fall within the range of 375 to 425 nm and the Δn·d values of the third and fourth retardation plates 14 and 117 are the same and fall within the range of 300 nm to 450 nm, almost equal characteristics can be obtained. Therefore, the Δn·d values of these retardation plates 112, 113, 114, and 117 preferably fall within the above ranges.

Figure 58:
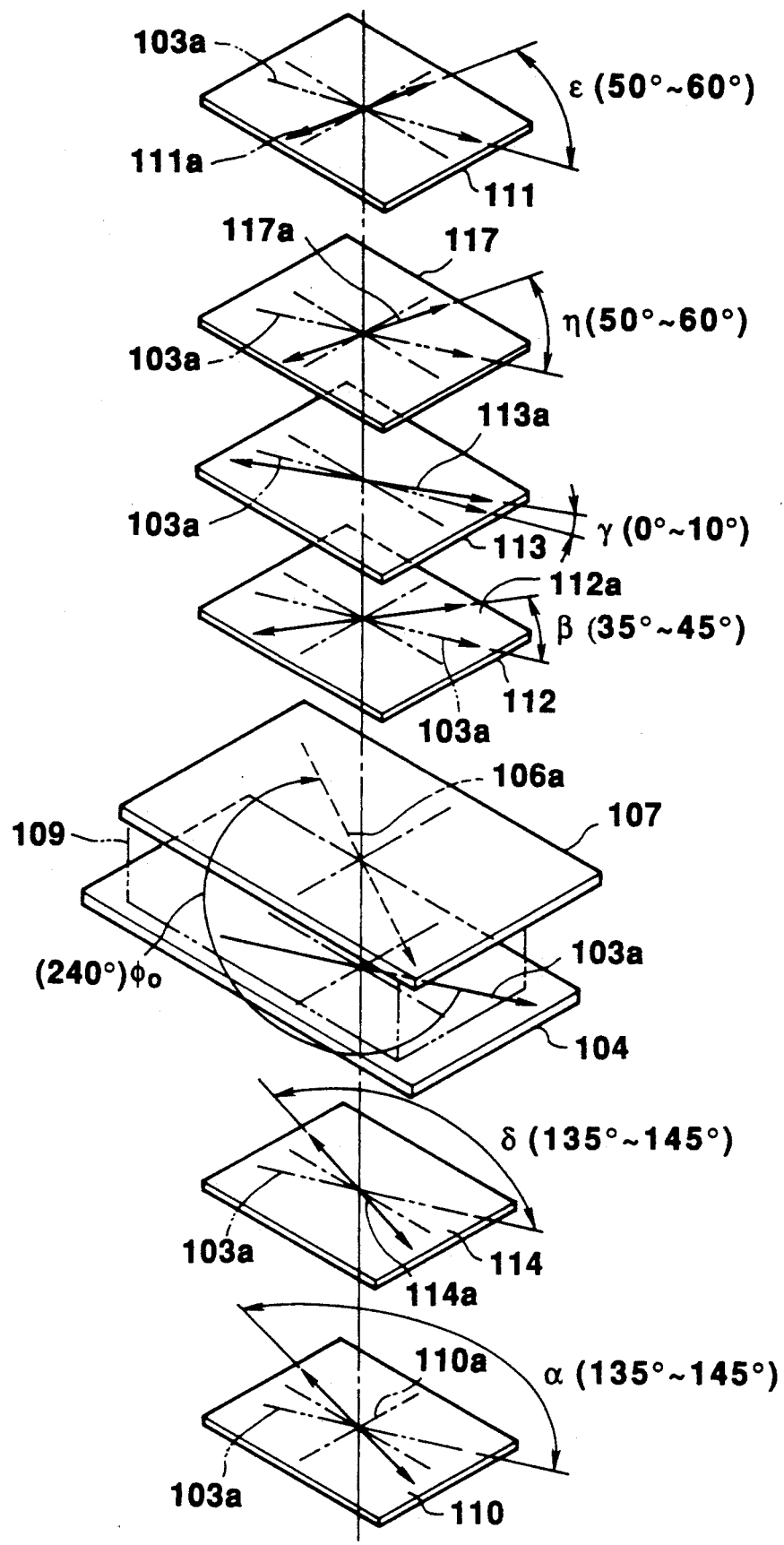
FIG. 58 is an exploded perspective view showing a schematic arrangement of the eighth embodiment of the present invention.

FIGS. 58A to 58D show equi contract curves. FIG. 58A shows a case in which the angle δ of the phase delay axis 114a of the third retardation plate 114 is set to be 30°, and the angle η of the phase delay axis 117a of the fourth retardation plate 117 is set to be 120°. FIG. 58B shows a case in which the angle δ of the phase delay axis 114a of the third retardation plate 114 is set to be 120°, and the angle η of the phase delay axis 117a of the fourth retardation plate 117 is set to be 30°. FIG. 58C shows a case in which the angle δ of the phase delay axis 114a of the third retardation plate 114 is set to be 45°, and the angle η of the phase delay axis 117a of the fourth retardation plate 117 is set to be 135°. FIG. 58D shows a case in which the angle δ of the phase delay axis 114a of the third retardation plate 114 is set to be about 135°, and the angle η of the phase delay axis 117a of the fourth retardation plate 117 is set to be about 45°. Alternatively, the phase advance axis normal to the phase delay axis 114a of the third retardation plate 114 may be set at about 135° and the phase advance axis normal to the phase delay axis 117a of the fourth retardation plate 117 may set at about 45° to the incident-side direction 103a of aligning treatment.

As shown in FIGS. 58A to 58D, according to the seventh embodiment, the area having a contrast of 10 or more is increased, and the reverse area which appears in the upper portion of the liquid crystal display device is reduced.

Eighth Embodiment

The eighth embodiment of the present invention will be described with reference to FIG. 59 to FIGS. 62A and 62B. The same reference numerals as in the fifth embodiment denote the same parts in the eighth embodiment, and a detailed description thereof will be omitted.

Figure 59A:
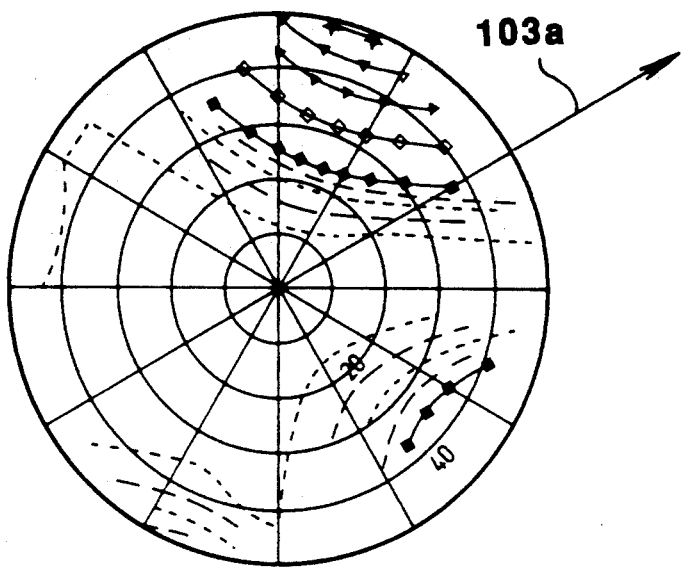
FIGS. 59A and 59B are a view showing equi-brightness curves in a light-shielding state and its CIE chromaticity diagram, respectively, in the eighth embodiment shown in FIG. 58.
Figure 59B:
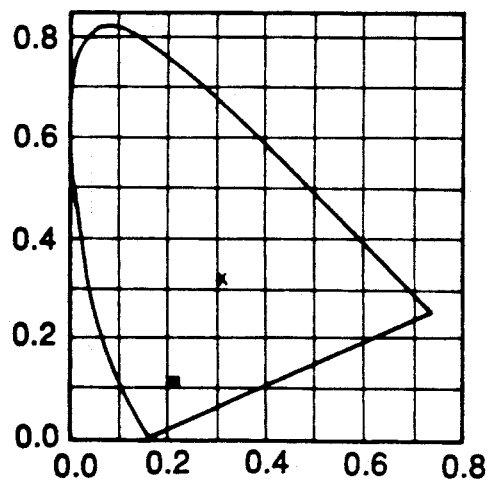

Referring to FIG. 59, a liquid crystal cell 101 is formed as in the liquid crystal cell of the fifth embodiment. A polarizer 110 comprising a linearly polarizing plate is located outside or below a incident-side substrate 104 of this liquid crystal cell 101. An analyzer 111 comprising a linearly polarizing plate is located above an exit-side substrate 107 of the cell 101. First, second, and fourth retardation plates 112, 113, and 117 are located between the exit-side substrate 104 of the liquid crystal cell 101 and the analyzer 111 in the order named. A third retardation plate 114 is located between the incident-side substrate 104 of the cell 101 and the polarizer 110.

The polarizer 110 is located so that its light-transmitting axis 110a is rotated through +140° (α) counterclockwise with respect to an incident-side direction 103a of aligning treatment. The analyzer 111 is located so that its light-transmitting axis 111a intersects with the incident-side direction 103a of aligning treatment at an angle of 55° (ε).

The first, second, third, and fourth retardation plates 112, 113, 114, and 117 comprise retardation plates obtained by monoaxially stretching polycarbonate. The Δn·d values of each of the first and second retardation plates 112 and 113 is set to be 400 nm (measurement wavelength: 589 nm), and the Δn·d of each of the third and fourth retardation plates 114 and 117 is set to be 350 nm to 450 nm (measurement wavelength: 589 nm).

The first retardation plate 112 is located so that its phase delay axis 112a is inclined at an angle of about 40° (β) with respect to the incident-side direction 103a of aligning treatment. The second retardation plate 113 is located so that its phase delay axis 113a is inclined at an angle of about 5° (γ) with respect to the incident-side direction 103a of aligning treatment. The fourth retardation plate 117 is located so that its phase delay axis 117a is inclined at an angle of about 55° (η) with respect to the incident-side direction 103a of aligning treatment. The third retardation plate 114 is located so that its phase delay axis 114a is inclined at an angle of about 140° (δ) with respect to the incident side direction 103a of aligning treatment.

In the eighth embodiment, differences in phase shifts of light components having different wavelengths upon passing of the light components through the liquid crystal cell 101 can be almost corrected since the four retardation plates are used, thereby eliminating coloring of the display colors. In addition, since the phase delay axes 114a and 117a of the third and fourth retardation plates 114 and 117 are almost perpendicular to each other, the differences in phase shifts at different view angles can be canceled by these retardation plates, thereby improving the view angle characteristics.

As shown in the eighth embodiment, when four retardation plates are used, the polarizer 110, the analyzer 11, and the four retardation plates 112, 113, 114, and 17 are preferably located as follows: with reference to the incident-side direction 103a of aligning treatment, an angle α of the light-transmitting axis 110a of the polarizer 110 preferably falls within the range of 135° to 145°; an angle ε of the light-transmitting axis 111a of the analyzer 111 preferably falls within the range of 50° to 60°; an angle β of the phase delay axis 112a of the first retardation plate 112 preferably falls within the range of 35° to 45°; an angle γ of the phase delay axis 113a of the second retardation plate 113 preferably falls within the range of 0° to 10°; an angle δ of the phase delay axis 114a of the third retardation plate 114 preferably falls within the range of 135° to 145°; and an angle η of the phase delay axis 117a of the fourth retardation plate 117 preferably falls within the range of 50° to 60°. The Δn·d value of the liquid crystal cell 101 preferably falls within the range of 825 nm to 875 nm. When the Δn·d values of the first and second retardation plates 112 and 113 are the same and fall within the range of 375 to 425 nm and the Δn·d values of the third and fourth retardation plates 114 and 117 are the same and fall within the range of 300 nm to 450 nm, almost equal characteristics can be obtained.

Therefore, the Δn·d values of these retardation plates 112, 113, 114, and 117 preferably fall within the above ranges.

Figure 60A:
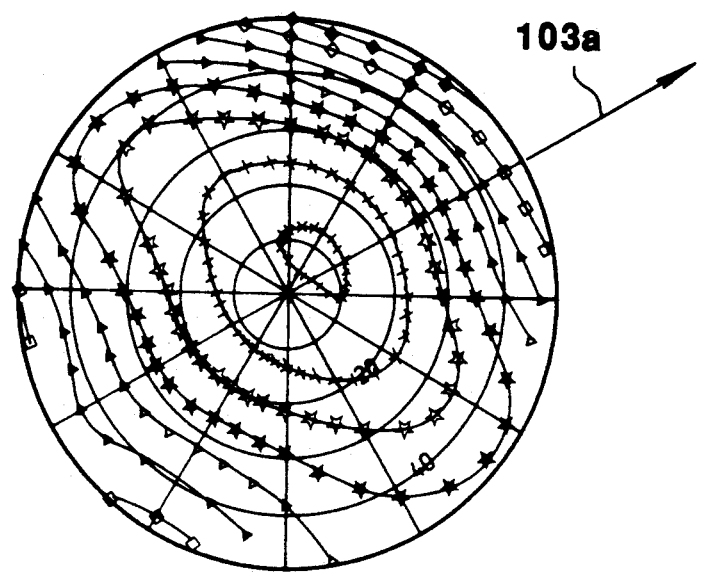
FIGS. 60A and 60B are a view showing equi-brightness curves in a light-transmitting state and its CIE chromaticity diagram, respectively, in the eighth embodiment shown in FIG. 58.
Figure 60B:
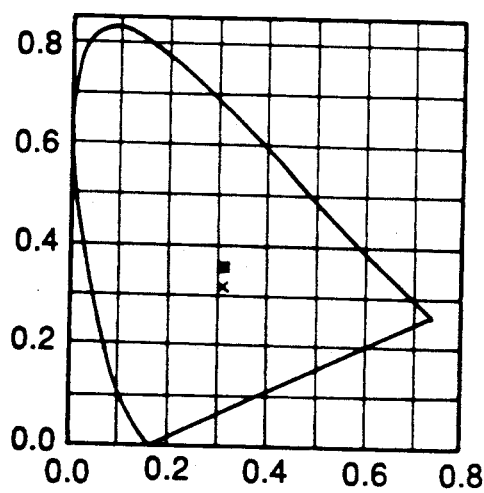

FIG. 57A shows a transmittance distribution in an OFF state, FIG. 57B shows a CIE chromaticity diagram in the OFF state, FIG. 60A shows a transmittance distribution in an ON state, and FIG. 60B shows a CIE chromaticity diagram in the ON state. FIG. 61A shows equi-contrast curves. FIG. 61B shows a CIE chromaticity diagram representing changes in colors during a transition period from the ON state to the OFF state.

As shown in FIG. 59A, light leaking from the front surface of the liquid crystal display device in the OFF state is small. When the view angle is increased, leakage light appears from the upper portion of the liquid crystal display device. As shown in FIG. 60A, the transmittances in the ON state are large in all directions. As shown in FIG. 61A, the area having a contrast of 10 or more is increased, the reverse area which appears in the upper portion of the liquid crystal display device is reduced, and the reverse area in the lower right portion of the device disappears. According to this embodiment, the view angle is increased, and the view angle characteristics are improved.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A liquid crystal display device comprising:
   a pair of substrates having opposite surfaces on which electrodes arranged perpendicular to each other and aligning films subjected to an aligning treatment in a predetermined direction and formed to cover said electrodes are formed;
   a liquid crystal material sealed between said aligning films, twisted in a range of 200° to 240° from one of said pair of substrates to the other of said pair index anisotropy n and a layer thickness d falling within a range of 700 nm to 900 nm;
   a polarizer located outside of a light incident side of said pair of substrates and having a direction of a light-transmitting axis falling within a range of 135° to 180° with respect to a first direction of alignment treatment performed on said aligning film of the incident-side substrate of said pair of substrates;
   an analyzer located outside of a light exit side of said pair of substrates and having a direction of a light-transmitting axis falling within a range of 50° to 105° with respect to the first direction of aligning treatment;
   a first retardation plate which is located between said polarizer and said analyzer, has a product Δn·d of a refractive index anisotropy Δn and a layer thickness d ½ of a value obtained by multiplying the product Δn·d of the liquid crystal material with 0.8 to 0.95, and has a phase delay axis falling within a range of 15° to 110° with respect to the first direction of aligning treatment; and
   a second retardation plate which is located between said polarizer and said analyzer, has a product Δn·d of a refractive index anisotropy Δn and a layer thickness d substantially equal to that of said first retardation plate, and has a phase delay axis falling within a range of 30° to 80° with respect to the incident-side direction of aligning treatment.

2. A liquid crystal display device according to claim 1, wherein said first and second retardation plates are located between said pair of substrates and one of said polarizer and said analyzer.

3. A liquid crystal display device according to claim 2, wherein the light-transmitting axis of said polarizer intersects with the first direction of aligning treatment at an angle of about 140°, the light-transmitting axis of said analyzer intersects with the direction of the light-transmitting axis of said polarizer at an angle of about 55°, the phase delay axis of said first retardation plate intersects with the first direction of aligning treatment at an angle of about 40°, and the phase delay axis of said second retardation plate intersects with the first direction of aligning treatment at an angle of about 5°.

4. A liquid crystal display device according to claim 1, wherein said first and second retardation plates are located to sandwich said pair of substrates.

5. A liquid crystal display device according to claim 4, wherein, when a twist angle of the liquid crystal material is defined as $\phi_0$, said pair of polarizing plates are located so that the light-transmitting axis of said polarizer is inclined at an angle falling within a range of 140° to 180°, the light-transmitting axis of said analyzer is inclined at an angle falling within the range of $(270° - |\phi_0|/2) \pm 10°$, the phase delay axis of said first retardation pate is inclined at an angle falling a range of $(180° - |\phi_0|/2)$ to $(180° - |\phi_0|/2) + 30°$, and the phase delay axis of said second retardation plate is inclined at an angle falling a range of $(180° - |\phi_0|/2)$ to $(180° - |\phi_0|/2) - 30°$, respectively, with respect to the direction of aligning treatment of said incident-side substrate.

6. A liquid crystal display device according to claim 4, wherein
   the direction of the light-transmitting axis of said polarizer intersects with the first direction of aligning treatment at an angle falling within the range of 140° to 180°,
   the direction of the light-transmitting axis of said analyzer intersects with the direction of the light-transmitting axis of said polarizer at an angle falling within a range of about 50° to 105°,
   the phase delay axis of said first retardation plate intersects with the first direction of aligning treatment at an angle falling within a range of 60° to 110°, and
   the phase delay axis of said second retardation plate intersects with the first direction of aligning treatment at an angle falling within a range of 30° to 80°.

7. A liquid crystal display device comprising:
   a pair of substrates having opposite surfaces on which electrodes arranged perpendicular to each other and aligning films subjected to an aligning treatment in a predetermined direction and formed to cover said electrodes are formed;
   a liquid crystal material sealed between said aligning films, twisted in a range of 200° to 240° from one of said pair of substrates to the other of said pair of substrates, and having a product Δn·d of a refractive index anisotropy Δn and a layer thickness d falling within a range of 800 nm to 900 nm;
   a pair of polarizing plates located outside said pair of substrates so as to sandwich said pair of substrates therebetween;

first and second retardation plates located between said pair of polarizing plates and having phase delay axes intersecting with each other at an angle falling within a range of 25° to 45°; ; and third and fourth retardation plates located between said pair of polarizing plates and having phase delay axes substantially perpendicular to each other.

8. A liquid crystal display device according to claim 7, wherein said first to fourth retardation plates are located between said pair of substrates and one of said pair of polarizing plates.

9. A liquid crystal display device according to claim 8, wherein said pair of polarizing plates are located so that a direction of a light-transmitting axis of one plate is inclined at an angle falling within a range of 135° to 145° with respect to a first direction of aligning treatment performed on said aligning film formed on a light incident-side substrate of said pair of substrates, and light-transmitting axes of the respective plates intersect with each other at an angle of about 85°, said first and second retardation plates are located so that a direction of a phase delay or advance axis of one plate is inclined at an angle falling within a range of 25° to 45° with respect to the first direction of aligning treatment, and phase delay axes of the respective plates intersect with each other at an angle falling within a range of about 25° to 45°, and said third and fourth retardation plates are located so that a direction of a phase delay axis of one plate is inclined at an angle falling within a range of 55° to 65° with respect to the first direction of aligning treatment, and phase delay axes of the respective plates are substantially perpendicular to each other.

10. A liquid crystal display device according to claim 7, wherein said first and second retardation plates are located between said pair of substrates and one of said pair of polarizing plates, and said third and fourth retardation plates are located between said pair of substrates and the other of said pair of polarizing plates.

11. A liquid crystal display device according to claim 10, wherein said pair of polarizing plates are located so that a direction of a light-transmitting axis of one plate is inclined at an angle falling within a range of 135° to 145° with respect to a first direction of aligning treatment performed on said aligning film formed on a light incident-side substrate of said pair of substrates, and light-transmitting axes of the respective plates intersect with each other at an angle of about 85°, said first and second retardation plates are located so that a direction of a phase delay or advance axis of one plate is inclined at an angle of about 40° with respect to the first direction of aligning treatment, and phase delay axes of the respective plates intersect with each other at an angle of about 35°, and said third and fourth retardation plates are located so that a direction of a phase delay axis of one plate is inclined at an angle of 30° with respect to the first direction of aligning treatment, and phase delay axes of the respective plates are substantially perpendicular to each other.

12. A liquid crystal display device comprising:

a pair of substrates having opposite surfaces on which electrodes arranged perpendicular to each other and aligning films subjected to an aligning treatment in a predetermined direction and formed to cover said electrodes are formed;

a liquid crystal material sealed between said aligning films, twisted in a range of 200° to 240° from one of said pair of substrates to the other of said pair of substrates, and having a product Δn·d of a refractive index anisotropy Δn and a layer thickness d falling within a range of 800 nm to 950 nm;

a pair of polarizing plates located outside said pair of substrates so as to sandwich said pair of substrates therebetween; and first, second, and third retardation plates located between said pair of polarizing plates, said first, second, and third retardation plates being further located between said pair of substrates and one of said pair of polarizing plates;

wherein:

said pair of polarizing plates are located so that a direction of a light-transmitting axis of one plate is inclined at an angle falling within a range of 35° to 55° with respect to a first direction of aligning treatment performed on said aligning film formed on a light incident-side substrate of said pair of substrates, and light-transmitting axes of the respective plates intersect with each other at an angle of about 30°, a direction of a phase delay or advance axis of said first retardation plate is inclined at an angle falling within a range of 40° to 75° with respect to the first direction of aligning treatment, and said second and third retardation plates are located so that a phase delay axis of one plate is inclined at an angle falling within a range of 45° to 75° with respect to the first direction of aligning treatment, and phase delay axes of the respective plates are substantially perpendicular to each other.

13. A liquid crystal display device comprising:

a pair of substrates having opposite surfaces on which electrodes arranged perpendicular to each other and aligning films subjected to an aligning treatment in a predetermined direction and formed to cover said electrodes are formed;

a liquid crystal material sealed between said aligning films, twisted in a range of 200° to 240° from one of said pair of substrates to the other of said pair of substrates, and having a product Δn·d of a refractive index anisotropy Δn and a layer thickness d falling within a range of 800 nm to 950 nm;

a pair of polarizing plates located outside said pair of substrates so as to sandwich said pair of substrates therebetween; and first, second, and third retardation plates located between said pair of polarizing plates, said first, second, and third retardation plates being further located between said pair of substrates and one of said pair of polarizing plates;

wherein:

said pair of polarizing plates are located so that a direction of a light-transmitting axis of one plate is inclined at an angle of about 140° with respect to a first direction of aligning treatment performed on said aligning film formed on a light incident-side substrate of said third pair of substrates, and light-transmitting axes of the respective plates intersect with each other at an angle of about 85°, a direction of a phase delay or advance axis of said first retardation plate is inclined at an angle falling within a range of 50° to 55° with respect to the first direction of aligning treatment, and said second and third retardation plates are located so that a phase delay axis of one plate is inclined at an angle of about 40° with respect to the first direction of aligning treatment, and phase delay axes of the respective plates intersect with each other at an angle of about 35°.

14. A liquid crystal display device comprising:

a pair of substrates having opposite surfaces on which electrodes arranged perpendicular to each other and aligning films subjected to an aligning treatment in a predetermined direction and formed to cover said electrodes are formed;

a liquid crystal material sealed between said aligning films, twisted in a range of 200° to 240° from one of said pair of substrates to the other of said pair of substrates, and having a product $\Delta n \cdot d$ of a refractive index anisotropy $\Delta n$ and a layer thickness d falling within a range of 800 nm to 950 nm;

a pair of polarizing plates located outside said pair of substrates so as to sandwich said pair of substrates therebetween; and first, second, and third retardation plates located between said pair of polarizing plates, said first, second, and third retardation plates being further located between said pair of substrates and one of said pair of polarizing plates;

wherein:

said pair of polarizing plates are located so that a direction of a light-transmitting axis of one plate is inclined at an angle of about 140° with respect to a first direction of aligning treatment performed on said aligning film formed on a light incident-side substrate of said pair of substrates, and light-transmitting axes of the respective plates intersect with each other at an angle of about 85°, a direction of a phase delay axis of said first retardation plate is parallel or perpendicular to the first direction of aligning treatment, and said second and third retardation plates are located so that a phase delay axis of one plate i s inclined at an angle of about 40° with respect to the first direction of aligning treatment, and phase delay axes of the respective plates intersect with each other at an angle of about 35°.

15. A liquid crystal display device comprising:

a pair of substrates having opposite surfaces on which electrodes arranged perpendicular to each other and aligning films subjected to an aligning treatment in a predetermined direction and formed to cover said electrodes are formed;

a liquid crystal material sealed between said aligning films, twisted in a range of 200° to 240° from one of said pair of substrates to the other of said pair of substrates, and having direction of a light-transmitting a product $\Delta n \cdot d$ of a refractive index anisotropy $\Delta n$ and a layer thickness d falling within a range of 800 nm to 950 nm;

a pair of polarizing plates located outside said pair of substrates so as to sandwich said pair of substrates therebetween; and first, second and third retardation plates located between said pair of polarizing plates;

wherein said first retardation plate is located between said pair of substrates and one of said polarizing plates, and said second and third retardation plates are located between said pair of substrates and the other of said pair of polarizing plates, and wherein a light-transmitting axis of said one of said polarizing plates intersects with the first direction of aligning treatment at an angle of about 55°, the light-transmitting axis of the other of said polarizing plates intersects with the direction of the light-transmitting axis of said one of said polarizing plates at an angle of about 30°, a phase delay axis of said first retardation plate intersects with the first direction of aligning treatment at an angle of about 120°, a phase delay or phase advance axis of said second retardation plate intersects with the first direction of aligning treatment at an angle of about 75°, and phase delay axis of the second and third retardation plates are substantially perpendicular to each other.

16. A liquid crystal display device comprising:

a pair of substrates having opposite surfaces on which electrodes arranged perpendicular to each other and aligning films subjected to an aligning treatment in a predetermined direction and formed to cover said electrodes are formed;

a liquid crystal material sealed between said aligning films, twisted in a range of 200° to 240° form one of said pair of substrates to. the other of said pair of substrates, and having a product $\Delta n \cdot d$ of a refractive index anisotrophy $\Delta n$ and a layer thickness d falling within a range of 800 nm to 950 nm;

a pair of polarizing plates located outside said pair of substrates so as to sandwich said pair of substrates therebetween; and first, second, and third retardation plates located between said pair of polarizing plates;

wherein said first retardation plate is located between said pair of substrates and one of said polarizing plates, and said second and third retardation plates are located between said pair of substrates and the other of said pair of polarizing plates, and wherein a light-transmitting axis of said one of said polarizing plates intersects with the first direction of aligning treatment at an angle of about 135°, the light-transmitting axis of the other of said polarizing plates intersects with the direction of the light-transmitting axis of said one of said polarizing plates at an angle of about 30°a phase delay axis of said first retardation plate intersects with the first direction of aligning treatment at an angle of about 120°, a phase delay or phase advance axis of said second retardation plate intersects with the first direction of aligning treatment at an angle of about 45°, and phase delay axis of the second and third retardation plates are substantially perpendicular to each other.

* * * * *

UNITED STATES PATENT AND TRADEMARK OFFICE
CERTIFICATE OF CORRECTION

PATENT NO. : 5,237,438

DATED : August 17, 1993

INVENTOR(S) : MIYASHITA, Takashi et al

It is certified that error appears in the above-identified patent and that said Letters Patent is hereby corrected as shown below:

Title page, Section [57] ABSTRACT, line 5,

Delete "$\Delta$n.d value of the liquid crystal is set to"

Signed and Sealed this

Thirteenth Day of December, 1994

Attest:

BRUCE LEHMAN

Attesting Officer

Commissioner of Patents and Trademarks